US010494509B2

(12) United States Patent
Kornfield et al.

(10) Patent No.: US 10,494,509 B2
(45) Date of Patent: Dec. 3, 2019

(54) ASSOCIATIVE POLYMERS AND RELATED COMPOSITIONS, METHODS AND SYSTEMS

(71) Applicant: CALIFORNIA INSTITUTE OF TECHNOLOGY, Pasadena, CA (US)

(72) Inventors: Julia A. Kornfield, Pasadena, CA (US); Ming-Hsin Wei, Pasadena, CA (US); Simon Jones, Whittier, CA (US); Virendra Sarohia, Altadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 0 days.

(21) Appl. No.: 16/120,065

(22) Filed: Aug. 31, 2018

(65) Prior Publication Data

US 2019/0100642 A1 Apr. 4, 2019

Related U.S. Application Data

(62) Division of application No. 14/217,142, filed on Mar. 17, 2014, now Pat. No. 10,087,310.

(60) Provisional application No. 61/799,670, filed on Mar. 15, 2013.

(51) Int. Cl.

| | |
|---|---|
| ***C08G 83/00*** | (2006.01) |
| ***C10L 1/198*** | (2006.01) |
| ***C08K 11/00*** | (2006.01) |
| ***C10L 10/02*** | (2006.01) |
| ***C10L 10/00*** | (2006.01) |
| ***C10L 1/236*** | (2006.01) |
| ***C10L 1/197*** | (2006.01) |
| ***C08L 101/02*** | (2006.01) |
| *C10L 10/08* | (2006.01) |

(52) U.S. Cl.

CPC ............ *C08K 11/00* (2013.01); *C08G 83/008* (2013.01); *C08L 101/02* (2013.01); *C10L 1/198* (2013.01); *C10L 1/1973* (2013.01); *C10L 1/1976* (2013.01); *C10L 1/2366* (2013.01); *C10L 1/2368* (2013.01); *C10L 10/00* (2013.01); *C10L 10/02* (2013.01); *C10L 10/08* (2013.01)

(58) Field of Classification Search

CPC combination set(s) only.
See application file for complete search history.

(56) References Cited

U.S. PATENT DOCUMENTS

| | | | |
|---|---|---|---|
| 2,726,942 | A | 12/1955 | Arkis et al. |
| 2,807,597 | A | 9/1957 | Sonnenfeld et al. |
| 2,921,043 | A | 1/1960 | Uraneck et al. |
| 2,936,223 | A | 5/1960 | Lovett et al. |
| 3,091,604 | A | 5/1963 | Lukens et al. |
| 3,395,134 | A | 7/1968 | D'Alelio et al. |
| 3,467,604 | A | 9/1969 | Michaels et al. |
| 3,475,358 | A | 10/1969 | Bixler et al. |
| 3,546,142 | A | 12/1970 | Michaels et al. |
| 3,574,575 | A | 4/1971 | Gee et al. |
| 3,579,613 | A | 5/1971 | Schaper et al. |
| 3,658,492 | A | 4/1972 | Messina et al. |
| 3,687,644 | A | 8/1972 | Delafield et al. |
| 3,792,984 | A | 2/1974 | Cole et al. |
| 3,803,034 | A | 4/1974 | Dasch et al. |
| 3,812,034 | A | 5/1974 | Gaydasch et al. |
| 3,846,090 | A | 11/1974 | Waite et al. |
| 3,846,091 | A | 11/1974 | Osmond et al. |
| 3,867,330 | A | 2/1975 | Frisque et al. |
| 3,920,605 | A | 11/1975 | Sato et al. |
| 4,118,361 | A | 10/1978 | Lundberg et al. |
| 4,118,439 | A | 10/1978 | Marze et al. |
| 4,205,143 | A | 5/1980 | Goodman et al. |
| 4,288,511 | A | 9/1981 | Myers, Jr. |
| 4,292,045 | A | 9/1981 | Brooks et al. |
| 4,334,891 | A | 6/1982 | Brooks et al. |
| 4,396,398 | A | 8/1983 | Knight et al. |
| 4,516,982 | A | 5/1985 | Duvdevani et al. |
| 4,586,937 | A | 5/1986 | Duvdevani et al. |
| 4,731,096 | A | 3/1988 | Hamil et al. |
| 5,062,996 | A | 11/1991 | Kaylor et al. |
| 5,247,023 | A | 9/1993 | Chung et al. |
| 5,504,132 | A | 4/1996 | Smith et al. |
| 5,906,665 | A | 5/1999 | Trippe et al. |
| 7,262,257 | B2 | 8/2007 | Chung et al. |
| 7,727,291 | B2 | 6/2010 | Waters et al. |
| 8,022,118 | B2 | 9/2011 | Milligan et al. |
| 8,034,131 | B2 | 10/2011 | Sutkowski et al. |
| 8,506,288 | B2 | 8/2013 | Epelbaum et al. |
| 8,846,587 | B2 | 9/2014 | Dibiase et al. |
| 8,968,428 | B2 | 3/2015 | Siggelkow et al. |
| 9,150,808 | B2 | 10/2015 | Krull et al. |
| 9,458,399 | B2 | 10/2016 | Wei et al. |
| 10,087,310 | B2 | 10/2018 | Kornfield et al. |
| 10,119,084 | B2 | 11/2018 | Kornfield et al. |
| 2005/0182208 | A1 | 8/2005 | Chung et al. |
| 2010/0287822 | A1* | 11/2010 | Wei ..................... C08G 83/008 44/329 |
| 2011/0132466 | A1 | 6/2011 | Bucher et al. |
| 2011/0313054 | A1 | 12/2011 | Findlay et al. |
| 2013/0000184 | A1 | 1/2013 | Krull et al. |
| 2014/0259887 | A1 | 9/2014 | Kornfield et al. |
| 2015/0184101 | A1 | 7/2015 | Poirier et al. |
| 2016/0145397 | A1 | 5/2016 | Kornfield et al. |
| 2017/0081466 | A1 | 3/2017 | Kornfield et al. |
| 2017/0233668 | A1 | 8/2017 | Kornfield et al. |
| 2019/0016859 | A1 | 1/2019 | Kornfield et al. |

FOREIGN PATENT DOCUMENTS

| | | |
|---|---|---|
| JP | S5641223 A | 4/1981 |
| JP | H09503797 A | 4/1997 |

(Continued)

OTHER PUBLICATIONS

Aida, T., et al. "Functional supramolecular polymers" *Science*, vol. 335, Feb. 2012, pp. 813-817, 6 pages.

(Continued)

*Primary Examiner* — Ellen M McAvoy
*Assistant Examiner* — Chantel L Graham
(74) *Attorney, Agent, or Firm* — Steinfl + Bruno LLP

(57) ABSTRACT

Described herein are associative polymers capable of controlling one or more physical and/or chemical properties of non-polar compositions and related compositions, methods and systems.

23 Claims, 46 Drawing Sheets

(56) References Cited

FOREIGN PATENT DOCUMENTS

| | | | |
|---|---|---|---|
| JP | H11514043 | A | 11/1999 |
| JP | 2004035735 | A | 2/2004 |
| JP | 2009506179 | A | 2/2009 |
| JP | 2011523641 | A | 8/2011 |
| JP | 2013507517 | A | 3/2013 |
| WO | 2014/145920 | A1 | 9/2014 |
| WO | 2016/044803 | A1 | 3/2016 |
| WO | 2016/044810 | A1 | 3/2016 |
| WO | 2017/049316 | A1 | 3/2017 |
| WO | 2017/049319 | A1 | 3/2017 |

OTHER PUBLICATIONS

Altintas, O., et al. "Bioinspired dual self-folding of single polymer chains via reversible hydrogen bonding."*Polymer Chemistry*. 2012. 3(3): pp. 640-651.

Altintas, O., et al. "Star and miktoarm star block (co)polymers via self-assembly of ATRP generated polymer segments featuring Hamilton wedge and cyanuric acid binding motifs." *Polymer Chemistry* 2011. 2(5): pp. 1146-1155.

Anna, S.L. et al. "Elasto-capillary thinning and breakup of model elastic liquids". *Journal of Rheology*, 2001. 45(1): p. 115-138. 26 pages.

Annable, T., et al. "The Rheology of Solutions of Associating Polymers—Comparison of Experimental Behavior with Transient Network Theory". *Journal of Rheology*, 37(4), Jul. 1993, pp. 695-726.

Arienti, M. "Simulation of Primary Fuel Atomization Processes at Subcritical Pressures" *Sandia National Laboratories*, 1-51, (Jun. 2013). 51 pages.

Arnolds, O., et al., "Capillary Breakup Extensional Rheometry (CaBER) on Semi-Dilute and Concentrated Polyethyleneoxide (PEO) Solutions". *Rheologica Acta*, 49(11-12), pp. 1207-1217, (2010).

Aviation Fuels with Improved Fire Safety: A Proceedings, in *NRC Proceedings* 1997: Washington D.C. 158 pages.

Beijer, F.H., et al. "Hydrogen-bonded complexes of diaminopyridines and diaminotriazines: Opposite effect of acylation on complex stabilities." *Journal of Organic Chemistry* . 1996 61 (18): pp. 6371-6380.

Berl, V., et al. "Supramolecular polymers generated from heterocomplementary monomers linked through multiple hydrogen-bonding arrays Formation, characterization, and properties." *Chemistry-a European Journal* 2002 8(5): pp. 1227-1244.

Boal, A.K., et al., Self-assembly of nanoparticles into structured spherical and network aggregates. *Nature*, 2000. 404(6779): p. 746-748. 5 pages.

Brostow, W., Drag Reduction and Mechanical Degradation in Polymer-Solutions in Flow. *Polymer*, May 1983. 24(5): p. 631-638. 8 pages.

Burd, C., et al. "Self-sorting in polymers." *Macromolecules*. 2005. 38(17): pp. 7225-7230.

Burd, C., et al., "Solvent influence on the orthogonality of noncovalently functionalized terpolymers." *Journal of Polymer Science Part A—Polymer Chemistry*. 2008. 46(6): pp. 1936-1944.

Chakrabarty, K., et al. "Chapter 4: Solution Properties" in Tant, M.R., *Ionomers: synthesis, structure, properties and applications*. 1997: Blackie Academic and Professional, London. pp. 158-207.

Chang, S.K., et al. "Molecular Recognition of Biologically Interesting Substrates—Synthesis of an Artificial Receptor for Barbiturates Employing 6 Hydrogen-Bonds." *Journal of the American Chemical Society*. 1988. 110(4): pp. 1318-1319.

Chao, K.K., et al., Antimisting Action of Polymeric Additives in Jet Fuels. *AlChE Journal*, Jan. 1984. 30(1): p. 111-120. 12 pages.

Chassenieux, C., et al., "Rheology of associative polymer solutions. "*Current Opinion in Colloid & Interface Science*. 2011 . 16(1): pp. 18-26.

Chen, Z.-R., et al., Modeling ring-chain equilibria in ring-opening polymerization of cycloolefins. *Macromolecules*, 1995. 28(7): p. 2147-2154. 8 pages.

Cheng, C.C., et al. "New self-assembled supramolecular polymers formed by self-complementary sextuple hydrogen bond motifs." *RSC Advances*. 2012. 2(26): pp. 9952-9957.

Chinese Office Action for Chinese Application No. 2016800674088 filed May 17, 2018 on behalf of California Institute of Technology. dated Jul. 25, 2018. 3 pages (English Translation + Chinese Original).

Christanti, Y. et al. "Effect of fluid relaxation time of dilute polymer solutions on jet breakup due to a forced disturbance" *Journal of Rheology*, 2002. 46(3): p. 733-748. 17 pages.

Church, D.C., et al., "Comparison of Mechanochemical Chain Scission Rates for Linear versus Three-Arm Star Polymers in Strong Acoustic Fields". *ACS Macro Letters*, 3(7), pp. 648-651, (2014).

Colby, R.H., et al. The melt viscosity-molecular weight relationship for linear polymers. *Macromolecules*, 1987. 20(9): p. 2226-2237. 12 pages.

Colby, R.H., et al. "Two-parameter scaling for polymers in theta solvents." *Macromolecules*. 1990. 23(10): pp. 2753-2757.

Corrected Notice of Allowability for U.S. Appl. No. 15/269,911, filed Sep. 19, 2016, on behalf of California Institute of Technology. dated Sep. 17, 2018. 5 pgs.

David, R. L. et al. "Associative polymers as antimisting agents and other functional materials via thiol-ene coupling", Abstract only. Dissertation, California Institute of Technology. Jun. 2008.

David, R.L.A., et al., Effects of pairwise, donor-acceptor functional groups on polymer solubility, solution viscosity and mist control. *Polymer*, 2009. 50(26): p. 6323-6330. 8 pages.

David, R.L.A., et al., Effects of Pairwise, Self-Associating Functional Side Groups on Polymer Solubility, Solution Viscosity, and Mist Control. *Macromolecules*, 2009. 42(4): p. 1380-1391. 12 pages.

de Greef, T.F., et al., Influence of selectivity on the supramolecular polymerization of AB-type polymers capable of both A• A and A• B interactions. *J Am Chem Soc*, 2008. 130(41): p. 13755-13764. 10 pages.

DeTar, D.F. et al. Carboxylic acid-amine equilibria in nonaqueous solvents. *J Am Chem Soc*, 1970. 92(5): p. 1361-1365. 6 pages.

"Binding Constant" Binding Constant https://web.archive.org/web/20111224070935/http://en.wikipedia.org/wiki/Binding_constant. Aug. 24, 2011. 1 Page.

Density-Encyclopedia Britannica online publication dated Jun. 23, 2015. 2 pages. https://www.britannica.com/science/density.

Dontula, P., et al., "Can Extensional Viscosity be Measured with Opposed Nozzle Devices?" *Rheologica Acta*, 36(4), pp. 429-448, (1997).

Eagar, T.W. et al. Why did the World Trade Center collapse? Science, engineering, and speculation. *Journal of the Minerals Metals & Materials Society*, 2001. 53(12): p. 8-11. 4 pages.

EP Summons to attend oral proceedings for EP Application No. 14764716.8 filed on Mar. 17, 2014 on behalf of California Institute of Technology dated Feb. 15, 2019 7 pages.

European Patent Office Communication pursuant to Article 94(3) EPC in relation to Application No. 14764716.8. on behalf of California Institute of Technology. dated Jul. 31, 2017. 6 pages.

European Patent Office Communication pursuant to Rules 161(2) and 162 EPC in relation to Application No. 15842258.4 on behalf of California Institute of Technology. dated May 2, 2017. 2 pages.

Examination report issued for Japanese Patent Application No. 2016-503459 filed Mar. 7, 2014 on behalf of California Institute of Technology. dated Nov. 14, 2017. 4 pages. (English Translation + Japanese Original).

Extended European Search Report for International Application No. PCT/US2016052554 filed on Mar. 19, 2018 on behalf of California Institute of Technology. dated Mar. 13, 2019. 8 pages.

Extended European Search Report issued for European Patent Application No. 14764716.8 filed Mar. 17, 2014 on behalf of California Institute of Technology. dated Jul. 26, 2016. 9 pages.

(56) References Cited

OTHER PUBLICATIONS

Fang, Y., et al., Charge-assisted hydrogen bond-directed self-assembly of an amphiphilic zwitterionic quinonemonoimine at the liquid-solid interface. *Chemical Communications*, 2011. 47(40): p. 11255-11257. 3 pages.
Fetters, L., et al., "Chain dimensions and entanglement spacings" *Physical Properties of Polymers Handbook*. 2007, Springer. p. 447-454. 8 pages.
Fetters, L., et al., "Molecular Weight Dependence of Hydrodynamic and Thermodynamic Properties for Well-Defined Linear Polymers in Solution." *Journal of Physical and Chemical Reference Data*. 1994. 23(4): pp. 619-640.
Final Office Action for U.S. Appl. No. 15/269,937, filed Sep. 19, 2016 on behalf of California Institute of Technology. dated Jun. 26, 2018. 20 pages.
First Office Action for Chinese Patent Application No. 201480028390.1 filed Mar. 17, 2017 on behalf of California Institute of Technology. dated Oct. 10, 2016. 16 pages. (English + Chinese).
Flagan, Richard C. and Seinfeld, John H. "Particle Formation in Combustion", (1988) Fundamentals of air pollution engineering. Prentice-Hall, Inc., Englewood Cliffs, New Jersey. ISBN 0-13-332537-7. Ch. 6, 358-390, 33 pages.
Freed, K.F., Influence of small rings on the thermodynamics of equilibrium self-assembly. *The Journal of Chemical Physics*, 2012. 136(24): 6 pages.
Gilli, G. And P. Gilli, The nature of the hydrogen bond : outline of a comprehensive hydrogen bond theory. *IUCr Monographs on Crystallography*. 2009, Oxford ; New York: Oxford University Press. 147-192. 28 pages.
Goethals, E., "Book Review: Telechelic polymers: Synthesis and applications." *British Polymer Journal22*, 261-262 (1990).
Goldin, M., et al., Breakup of a Laminar Capillary Jet of a Viscoelastic Fluid. *Journal of Fluid Mechanics*, 1969. 38: p. 689-711. 23 pages.
Goldstein, R.E., Model for phase equilibria in micellar solutions of nonionic surfactants. *The Journal of Chemical Physics*, 1986. 84(6): p. 3367-3378. 13 pages.
Goodman, I. "Book Reviews: Telechelic polymers: Synthesis and applications". 1990: *British Polymer Journal*, vol. 22, p. 261.
Gotro, J. et al. Model hydrocarbon polymers: rheological properties of linear polyisoprenes and hydrogenated polyisoprenes. *Macromolecules*, 1984. 17(12): p. 2767-2775. 9 pages.
Grandbois, M., et al., "How Strong is a Covalent Bond?" *Science*, Mar. 1999. 283(5408): p. 1727-1730.
Gupta, R.K., et al., "Extensional Viscosity of Dilute Polystyrene Solutions: Effect of Concentration and Molecular Weight". *Physics of Fluids*, 12(6), pp. 1296-1318, (2000).
Herbst et al. "Aggregation and Chain Dynamics in Supramolecular Polymers by Dynamic Rheology: Cluster Formation and Self-Aggregation" *Macromolecules*, 2010, vol. 43, pp. 10006-10016.
Hietala, S., et al. "Rheological Properties of Associative Star Polymers in Aqueous Solutions: Effect of Hydrophobe Length and Polymer Topology." *Macromolecules*. 2009 42(5): pp. 1726-1732.
Higley, M.N., et al. "A modular approach toward block copolymers." *Chemistry-A European Journal*. 2005. 11 (10): pp. 2946-2953.
Hill, T., An Introduction to Statistical Thermodynamics. NY: Dover, 1986: p. 401-410.
Hillmyer, M.A., et al. Utility of a ruthenium metathesis catalyst for the preparation of end-functionalized polybutadiene. *Macromolecules*, 1997. 30(4): p. 718-721. 4 pages.
Hong, L. et al., "Scaling Law for the Radius of Gyration of Proteins and Its Dependence on Hydrophobicity". 2009. *Journal of Polymer Science: Part B: Polymer Physics*, vol. 47, p. 207-214.
Hunston, et al. Flow-Assisted Degradation in Dilute Polystyrene Solutions. *Polymer Engineering and Science*, 1980. 20(7): p. 517-523. 8 pages.
Ikkala, et al. Functional materials based on self-assembly of polymeric supramolecules. *Science*, 2002. 295(5564): p. 2407-2409. 4 pages.
International Preliminary Report on Patentability for International Application No. PCT/US2015/051079 filed on Sep. 18, 2015 on behalf of California Institute of Technology. dated Mar. 21, 2017. 7 pages.
International Preliminary Report on Patentability for International Application No. PCT/US2015/051088 filed Sep. 18, 2015 on behalf of California Institute of Technology. dated Mar. 21, 2017. 7 pages.
International Preliminary Report on Patentability for PCT/US2014/030772 filed on Mar. 17, 2014 on behalf of California Institute of Technology. dated Sep. 24, 2015. 8 pages.
International Preliminary Report on Patentability for PCT/US2016/052547 filed on Sep. 19, 2014 on behalf of California Institute of Technology. dated Mar. 20, 2018. 13 pages.
International Preliminary Report on Patentability for PCT/US2016/052554 filed on Sep. 19, 2016 on behalf of California Institute of Technology. dated Mar. 20, 2018. 12 pages.
International Search Report for International Application No. PCT/US2014/030772 filed on Mar. 17, 2014 on behalf of California Institute of Technology. dated Aug. 18, 2014. 4 pages.
International Search Report for International Application No. PCT/US2016/052547 filed Sep. 19, 2016 on behalf of California Institute of Technology. dated Jan. 3, 2017. 5 pages.
International Search Report for International Application No. PCT/US2016/052554 filed Sep. 19, 2016 in the name of California Institute of Technology. dated Jan. 3, 2017. 5 pages.
International Search Report for PCT/US2015/051079 filed on Sep. 18, 2015 on behalf of California Institute of Technology. dated Dec. 31, 2015. 4 pages.
International Search Report for PCT/US2015/051088 filed Sep. 18, 2015 on behalf of California Institute of Technology. dated Dec. 31, 2015. 4 pages.
Iwao, T., "Polymer solutions: An Introduction to Physical Properties", 2002, New York: John Wiley & Sons.
Izunobi, J.U., et al. "Polymer Molecular Weight Analysis by 1H NMR Spectroscopy." *Journal of Chemical Education*. 2011 88(8): pp. 1098-1104.
Jacobson, et al. Intramolecular reaction in polycondensations. I. The theory of linear systems. *The Journal of Chemical Physics*, 1950. 18(12): p. 1600-1606. 8 pages.
James, D.F., et al., "Measurement of the Extensional Viscosity of M1 in a Converging Channel Rheometer". *Journal of Non-Newtonian Fluid Mechanics*, 35 (2-3), pp. 445-458, (1990).
Ji, et al. Controlled synthesis of high molecular weight telechelic polybutadienes by ring-opening metathesis polymerization. *Macromolecules*, 2004. 37(15): p. 5485-5489. 5 pages.
Joseph, et al. Rayleigh-Taylor instability of viscoelastic drops at high Weber numbers. *Journal of Fluid Mechanics*, 2002. 453: p. 109-132. 24 pages.
Ke, F. et al. "Effect of Overlap Concentration and Persistence Length on DNA Separation in Polymer Solutions by Electrophoresis." *Chinese Journal of Polymer Science*. 2009. 27(5): pp. 601-610.
Kolomiets, E., et al. "Structure and properties of supramolecular polymers generated from heterocomplementary monomers linked through sextuple hydrogen-bonding arrays." *Macromolecules*2006, 39(3): pp. 1173-1181.
Kowalik, R.M., et al., Enhanced Drag Reduction Via Interpolymer Associations. *Journal of Non-Newtonian Fluid Mechanics*, 1987. 24(1): p. 1-10. 10 pages.
Krishnamoorti, R., et al., Melt-state polymer chain dimensions as a function of temperature. *Journal of Polymer Science Part B: Polymer Physics*, 2002. 40(16): p. 1768-1776. 9 pages.
Larson, R.G., "3.6 the Rheology of Dilute Polymer Solutions" in *The Structure and Rheology of Complex Fluids*. 1999: Oxford University Press New York. 132-148. 18 pages.
Lehn, J.-M., Toward self-organization and complex matter. *Science*, 2002. 295(5564): p. 2400-2403. 5 pages.
Lerum, et al. Surface-Initiated Ring-Opening Metathesis Polymerization in the Vapor Phase: An Efficient Method for Grafting Cyclic Olefins with Low Strain Energies. *Langmuir*, 2011. 27(9): p. 5403-5409. 7 pages.
Li, et al., Advanced supramolecular polymers constructed by orthogonal self-assembly. *Chemical Society Reviews*, 2012. 41(18): p. 5950-5968. 19 pages.

(56) References Cited

OTHER PUBLICATIONS

Li, H.K., et al. "Metal-free click polymerization of propiolates and azides: facile synthesis of functional poly(aroxycarbonyltriazole)s." *Polymer Chemistry*2012 3(4): pp. 1075-1083.
Lumley, J.L. "Drag Reduction in Turbulent Flow by Polymer Additives" *Journal of Polymer Science: Macromolecular Reviews*, vol. 7, 1973, pp. 263-290.
Matthys, E. F. "Heat-Transfer, Drag Reduction, and Fluid Characterization for Turbulent-Flow of Polymer-Solutions—Recent Results and Research Needs", *Journal of Non-Newtonian Fluid Mechanics*, 38, 1991, pp. 313-342.
Maurer-Chronakis, K. "Synthesis of cyanuric acid and Hamilton receptor functionalized tetraphenylporphyrins: investigation on the chiroptical and photophysical properties of their self-assembled superstructures with depsipeptide and fullerene dendrimers." Ph.D. Dissertation, *Erlangen, Niimberg*, Univ., 2010, pp. 1-157.
McKinley et al. Filament-stretching rheometry of complex fluids. *Annual Review of Fluid Mechanics*, 2002. 34(1): p. 375-415. 41 pages.
Michel, E., et al. "Unstable flow and nonmonotonic flow curves of transient networks". *Journal of Rheology*, 45(6), Nov. 2001, pp. 1465-1477.
Morita, T., et al. "A ring-opening metathesis polymerization (ROMP) approach to carboxyl- and amino-terminated telechelic poly(butadiene)s." *Macromolecules*2000 33(17): 6621-6623.
Nese, A., et al., "Synthesis of Poly (vinyl acetate) Molecular Brushes by a Combination of Atom Transfer Radical Polymerization (ATRP) and Reversible Addition Fragmentation Chain Transfer (RAFT) Polymerization." *Macromolecules*. 2010, 43(9): pp. 4016-4019.
Nickel, A., et al., A highly efficient olefin metathesis process for the synthesis of terminal alkenes from fatty acid esters. *Topics in Catalysis*, 2012. 55(7-10): p. 518-523. 6 pages.
Nielen, M.W.F. "Maldi time-of-flight mass spectrometry of synthetic polymers." *Mass Spectrometry Reviews*. 1999 18(5): pp. 309-344.
Non-Final Office Action for U.S. Appl. No. 15/269,911, filed Sep. 19, 2016 on behalf of California Institute of Technology. dated Nov. 2, 2017. 9 pages.
Non-Final Office Action for U.S. Appl. No. 15/913,828, filed Mar. 6, 2018, on behalf of California Institute of Technology, dated Jan. 7, 2019. 11 pages.
Non-Final Office Action for U.S. Appl. No. 14/217,142, filed Mar. 17, 2014 behalf of California Institute of Technology, dated Apr. 26, 2017. 16 pages.
Non-Final Office Action for U.S. Appl. No. 14/859,181, filed Sep. 18, 2015 on behalf of California Institute of Technology. dated Oct. 14, 2016, 13 pages.
Non-Final Office Action for U.S. Appl. No. 15/269,937, filed Sep. 19, 2016 on behalf of California Institute of Technology. dated Nov. 2, 2017, 10 pages.
Notice of Allowance for Application No. 2016-503459 dated Feb. 6, 2018 (Japanese only). 3 pages.
Notice of Allowance for Chinese Application No. 201480028390.1 filed Mar. 17, 2014 on behalf of California Institute of Technology. dated May 25, 2018. 2 pages. (English Translation + Chinese Original).
Notice of Allowance for U.S. Appl. No. 15/269,911, filed Sep. 19, 2016 on behalf of California Institute of Technology. dated Jun. 28, 2018. 20 pages.
Notice of Allowance for U.S. Appl. No. 15/269,937, filed Sep. 19, 2016, on behalf of California Institute of Technology. dated Jan. 18, 2019. 10 pages.
Notice of Allowance for U.S. Appl. No. 15/269,937, filed Sep. 19, 2016 on behalf of California Institute of Technology dated May 2, 2019 12 pages.
Notice of Allowance for U.S. Appl. No. 14/217,142, filed Mar. 17, 2014 on behalf of California Institute of Technology. dated Jan. 30, 2018. 12 pages.
Notice of Allowance for U.S. Appl. No. 14/217,142, filed Mar. 17, 2014 on behalf of California Institute of Technology. dated Jun. 19, 2018. 14 pages.
Notice of Allowance for U.S. Appl. No. 14/859,181, filed Sep. 18, 2015 on behalf of California Institute of Technology. dated Dec. 7, 2017. 8 pages.
Notice of Allowance for U.S. Appl. No. 14/859,181, filed Sep. 18, 2015 on behalf of California Institute of Technology. dated Feb. 15, 2017. 5 pages.
Notice of Allowance for U.S. Appl. No. 14/859,181, filed Sep. 18, 2015 on behalf of California Institute of Technology. dated Jul. 19, 2017. 10 pages.
Notification of Reasons for Refusal for Application No. 2018-074672. Jan. 15, 2019 (Japanese Orig + Engl Transl). 12 pages.
Nyden, M.R., et al. "Applications of reactive molecular dynamics to the study of the thermal decomposition of polymers and nanoscale structures" *Materials Science and Engineering: A*, 2004. 365(1-2): p. 114-121. 8 pages.
Park, T., et al., "A highly stable quadruply hydrogen-bonded heterocomplex useful for supramolecular polymer blends." *Journal of the American Chemical Society*. 2005. 127(18): pp. 6520-6521.
Park, T. et al., "A supramolecular multi-block copolymer with a high propensity for alternation." *Journal of the American Chemical Society*. 2006. 128(43): pp. 13986-13987.
Paterson, et al. Turbulent flow drag reduction and degradation with dilute polymer solutions. *Journal of Fluid Mechanics*, 1970. 43(04): p. 689-710. 22 pages.
Pedley, A., et al., Thermodynamics of the aggregation phenomenon in associating polymer solutions. *Macromolecules*, 1990. 23(9): p. 2494-2500. 8 pages.
Peng, et al. Rheological Behavior of Fm-9 Solutions and Correlation with Flammability Test-Results and Interpretations. *Journal of Non-Newtonian Fluid Mechanics*, 1983. 12(1): p. 95-111. 17 pages.
Petschek, et al. Equilibrium polymerization of chains and rings: A bicritical phenomenon. *Physical Review A*, 1986. 34(3): p. 2391-2421. 31 pages.
Pitet, L.M., et al. "Carboxy-Telechelic Polyolefins by ROMP Using Maleic Acid as a Chain Transfer Agent." *Macromolecules*. 2011, 44(7): pp. 2378-2381.
"Polymer Solutions: Solvents and Solubility Parameters." [Accessed Jan. 25, 2012]; Available from: http://www.sigmaaldrich.com/etc/medialib/docs/Aldrich/General_Information/polymer_solutions.Par.0001.File.tmp/polymer_solutions.pdf. 5 pages.
Ratner "Improving freight fire safety: Assessment of the effectiveness of mistcontrolling additives in mitigating crash-induced diesel fires" *Final Reports and Technical Briefs from Mid-America Transportation Center*, 2010, paper 88, pp. 1-33.
Restriction Requirement for U.S. Appl. No. 14/217,142, filed Mar. 17, 2014 on behalf of California Institute of Technology. dated Aug. 9, 2016. 8 pages.
Rozanska, S., et al., "Extensional Viscosity Measurements of Concentrated Emulsions with the Use of the Opposed Nozzles Device". *Brazilian Journal of Chemical Engineering*, 31(1), pp. 47-55, (2014).
Rubinstein, M., et al., "Ch. 2: Ideal Chains", *Polymer physics*, 2003, Oxford; New York: Oxford University Press. xi, pp. 49-196.
Ruymbeke et al. "Rheology and Structure of Entangled Telechelic Linear and Star Polyisoprene Melts" *Macromolecules*, 2010, vol. 43, pp. 4401-4411.
Sartorius, J. et al. "A general scheme based on empirical increments for the prediction of hydrogen-bond associations of nucleobases and of synthetic host-guest complexes", *Chemistry-A European Journal*, vol. 2, No. 11, 1996, pp. 1446-1452.
Schmidt, S.W., et al., "Dynamic Strength of the Silicon-Carbon Bond Observed over Three Decades of Force-Loading Rates", *Journal of the American Chemical Society*, 130(11), pp. 3664-3668, (2008).
Schulz, D.N., et al., Hydrocarbon-Soluble Associating Polymers as Antimisting and Drag-Reducing Agents. *ACS Symposium Series*, 1991. 462: p. 176-189. 14 pages.
Search Report issued for European Patent Application No. 15842258.4, filed on behalf of California Institute of Technology. dated May 2, 2018. 8 pages.

(56) References Cited

OTHER PUBLICATIONS

Second Office Action for Chinese Patent Application No. 201480028390.1 filed in the name of California Institute of Technology. dated Sep. 5, 2017. (English + Chinese) 14 pages.
Sijbesma, R.P., et al., Reversible polymers formed from self-complementary monomers using quadruple hydrogen bonding. *Science*, 1997. 278(5343): p. 1601-1604.
Skeen S., et al., "Extinction-based Imaging of Soot Processes over a Range of Diesel Operating Conditions," *8th US National Combustion Meeting*, 1-13, (May 2013). 13 pages.
http://en.wikipedia.org/wiki/Radius_of_gyration, Aug. 28, 2010. 3 pages.
Ambade, A.V. et al., "Orthogonally Self-Assembled Multifunctional Block Copolymers." Chemistry-a European Journal 2009 15(44): 11904-11911.
Ambade, A.V. et al., "Supramolecular ABC Triblock Copolymers." Angewandte Chemie International Edition 2009 48(16): 2894-2898.
Binder, W.H. et al., "Tunable materials from hydrogen-bonded pseudo block copolymers." Advanced Materials 2005 17(23): 2824-2828.
Boulanger J., et al., "An Improved Soot Formation Model for 3D Diesel Engine Simulations" *Journal of Engineering for Gas Turbines and Power*vol. 129 877-887 (Jul. 2007) 8 pages.
Gedde, U.W., "Polymer Physics." 1995: Chapman & Hall, London, (Publisher's summary, pp. 21-22 pp. 65-66).
Keiji Hirose, "A Practical Guide for the Determination of Binding Constants", Journal of inclusion phenomena and macrocyclic chemistry, Apr. 2001, vol. 39, Issue 3, pp. 193-209).
Physical Chemistry 6th Edition, Ira N. Levine, ISBN-13: 978-0072538625, Chapter 11. (May 9, 2008) 21 pages.
Principles of Physical Biochemistry 2nd Edition, Kensal E. van Holde, W. Curtis Johnson and P. Shing Ho, ISBN-13: 978-0130464279, Chapter 14. 2005. 55 pages.
Rudin, A. "The Elements of Polymer Science and Engineering, Second Edition." 1999: Academic Press, San Diego. pp. 80-95.
Viscosity-Wikipedia definition, dated Apr. 29, 2015. 19 pages.
Wei, M-H. Thesis: "Synthesis and Potency of Long End-Associative Polymers for Mist Control" Chapters 1-5, California Institute of Technology, Pasadena, California. 2014. 227 pages.
Sprakel, J. et al. "Shear banding and rheochaos in associative polymer networks", *Soft Matter*, Jun. 4, 2008, pp. 1696-1705.
Stavrouli, N., et al. "Rheological properties of ABA telechelic polyelectrolyte and ABA polyampholyte reversible hydro gels: A comparative study." *Polymer*. 2008. 49(5): pp. 1249-1256.
Stubbs, L.P., et al., "Towards a universal polymer backbone: Design and synthesis of polymeric scaffolds containing terminal hydrogen-bonding recognition motifs at each repeating unit." *Chemistry-A European Journal*2003. 9(4): pp. 992-999.
Supplemental Notice of Allowability for U.S. Appl. No. 14/859,181, filed Sep. 18, 2015 on behalf of California Institute of Technology. dated May 10, 2017. 4 pages.
Supplementary Search for Chinese Patent Application No. 2014800283901 filed in the name of California Institute of Technology. dated Aug. 28, 2017. 1 page.
Suzuki, S., et al., "Nonlinear Rheology of Telechelic Associative Polymer Networks: Shear Thickening and Thinning Behavior of Hydrophobically Modified Ethoxylated Urethane (HEUR) in Aqueous Solution." *Macromolecules* 2012. 45(2): pp. 888-898.
Tasdelen, M.A., et al. "Telechelic polymers by living and controlled/living polymerization methods." *Progress in Polymer Science*. 2011. 36(4): pp. 455-567.
Tayi, A.S., et al., Room-temperature ferroelectricity in supramolecular networks of charge-transfer complexes. *Nature*, 2012. 488(7412): p. 485-489.
Thordarson, P. "Determining association constants from titration experiments in supramolecular chemistry." *Chemical Society Reviews*. 2011. 40(3): pp. 1305-1323.
van Lint, J.H. And R.M. Wilson, A course in combinatorics. 2001: Cambridge University Press. pp. 522-525.
Wei et al. "Megasupramolecules for safer, cleaner fuel by end-association of long telechelic polymers" *Science*, Oct. 2015, vol. 350, No. 6256, pp. 72-75.
Willauer, H.D., et al., Flammability of aerosols generated by a rotary atomizer. *Combustion Science and Technology*, 2007. 179(7): p. 1303-1326.
Winnik, et al. "Associative polymers in aqueous solution." *Current Opinion in Colloid & Interface Science*, 1997. 2(4): p. 424-436.
Wright, B., et al. "Assessment of Concepts and Research for Commercial Aviation Fire-Safe Fuel", 2000, *NASA Lewis Research Center*.
Wright, B.R., Hydrocarbon Fuels as a Terrorist Weapon: Safety, Flammability, Testing, and Protecting Ourselves. *The Forensic Examiner*, 2004. 13(2): p. 14-19.
Written Opinion for International Application No. PCT/US2014/030772 filed on Mar. 17, 2014 on behalf of California Institute of Technology. dated Aug. 18, 2014. 6 pages.
Written Opinion for International Application No. PCT/US2016/052547 filed Sep. 19, 2016 in the name of California Institute of Technology. dated Jan. 3, 2017. 12 pages.
Written Opinion for International Application No. PCT/US2016/052554 filed Sep. 19, 2016 in the name of California Institute of Technology. dated Jan. 3, 2017. 11 pages.
Written Opinion for PCT/US2015/051079 filed on Sep. 18, 2015 on behalf of California Institute of Technology. dated Dec. 31, 2015. 6 pages.
Written Opinion for PCT/US2015/051088 filed Sep. 18, 2015 on behalf of California Institute of Technology. dated Dec. 31, 2015. 6 pages.
Wuts, P.G. And T.W. Greene, "Greene's protective groups in organic synthesis". Fourth Edition, John Wiley & Sons, (2007).
Xue, L. et al., "Shear Degradation Resistance of Star Polymers During Elongational Flow". *Macromolecules*, 38(21), pp. 8825-8832, (2005).
Yaffee, M.L., Antimisting Research and Development for Commercial Aircraft—Final Summary Report, in FAA report DOT/FAA/CT-86/71986, Federal Aviation Administration Technical Center: Atlantic City Airport, NJ.
Yalcin, T., et al. "Matrix-assisted laser desorption ionization time-of-flight mass spectrometry for the analysis of polydienes." *Journal of the American Society for Mass Spectrometry*1997 8(12): pp. 1220-1229.
Yang, S.K., et al. Main-chain supramolecular block copolymers. *Chemical Society Reviews*, 2011. 40(1): p. 129-137.
Yang, S.K., et al., "Supramolecular ABC Triblock Copolymers via One-Pot, Orthogonal Self-Assembly." *Journal of the American Chemical Society*. 2010. 132(5): pp. 1637-1645.
Ying, Q., et al. "Overlap concentration of macromolecules in solution." *Macromolecules*. 1987. 20(2): pp. 362-366.
Yu, et al. Mechanical Degradation of High Molecular-Weight Polymers in Dilute-Solution. *Journal of Applied Polymer Science*, 1979. 23(8): p. 2493-2512.
Yu, et al. The role of elasticity in the formation of electrospun fibers. *Polymer*, 2006. 47(13): p. 4789-4797.

* cited by examiner

Examples of Suitable Associative Functional Groups

Carboxylic acid

Carboxylic acid

Carboxylic acid

Tertiary amine

Exemplary Architectures

Linear, difunctional

Partially cross-linked variants, functional at the chain ends

Branched, trifunctional (tetra, penta, etc.. possible)

Hyperbranched, functional at the chain ends where represents a generic polymer backbone soluble in fuel

Exemplary Block Architectures

Associative groups at the ends and clustered in the middle

Associative groups at the ends and several clusters along the chain length where n represents a generic polymer backbone soluble in fuel ROMP with Chain-transfer agent (CTA) → Telechelic

A

B $$R_g = M^{\nu} \qquad M >> M^{\ddagger}$$

$\nu = 0.5$ theta ; $\nu = 0.59$ good

FIG. 17

**Synthesis of Octa-Funcationl *tert*-Butyl Ester CTA**

Synthesis of Octa-Funcationl Chloro CTA

ASSOCIATIVE POLYMERS AND RELATED COMPOSITIONS, METHODS AND SYSTEMS

CROSS-REFERENCE TO RELATED APPLICATIONS

This application is a divisional application of U.S. application Ser. No. 14/217,142 filed on Mar. 17, 2014 which claims priority to provisional application 61/799,670 entitled "Associative Polymers and related Compositions Methods and Systems" filed on Mar. 15, 2013 the contents of each of which is incorporated herein by reference.

FIELD

The present disclosure relates to associative polymers and related compositions methods and systems. In particular, the present disclosure relates to associative polymers suitable to be used in connection with control of physical and/or chemical properties of non-polar compositions.

BACKGROUND

Several non-polar compositions are known in the art for which control of the related physical and/or chemical properties is desired. For example, in hydrocarbon compositions which can be used for combustion and energy production, control of properties such as mist, drag, and combustion can be desirable.

Also in non-polar liquid hydrocarbon compositions suitable to be used as ink, pesticide or fuel, control of properties such as mist and drop breakup can be desirable.

However, despite development of several approaches, control of those properties is still challenging.

SUMMARY

Provided herein are associative polymers which in several embodiments can be used as additives in a non-polar composition, and related compositions, methods, and systems. In particular associative polymers herein described in several embodiments allows control of physical and/or chemical properties, such as drag reduction, mist control, lubrication, fuel efficiency, combustion emissions, spreading and/or viscoelastic properties of the composition.

According to a first aspect, a linear or branched associative polymer is described, which comprises a linear, branched, or hyperbranched polymer backbone having at least two ends and functional groups presented at two or more ends of the at least two ends of the backbone. In the associative polymer the linear or branched backbone is substantially soluble in a non-polar composition, and the functional groups are capable of undergoing an associative interaction with another with an the association constant (k) of from $0.1<\log_{10}k<18$, so that the strength of each associative interaction is less than that of a covalent bond between atoms and in particular backbone atoms. In some embodiments the linear or branched associative polymer has an overall weight average molecular weight, $M_w$, equal to or lower than about 2,000,000 g/mol, and/or a Mw equal to or higher than about 100,000 g/mol.

According to a second aspect a modified non-polar composition is described, the modified non-polar composition comprising a host composition having a dielectric constant equal to or less than about 5 and at least one associative polymer herein described soluble in the host composition. In particular, in the modified non polar composition the at least one associative polymer herein described can be comprised in the host non polar composition at a concentration from about 0.1 c* to about 10 c** with respect to an overlap concentration c * for the at least one associative polymer relative to the host composition.

According to a third aspect a method to control a physical and/or chemical property in a non-polar composition is described. The method comprises providing a host composition having a dielectric constant equal to or less than about 5; providing at least one associative polymer herein described soluble in the host composition; determining an overlap concentration c* for the at least one associative polymer relative to the host composition; determining a concentration c of the at least one associative polymer in the host composition, the concentration c selected between from about 0.1 c* to about 10 c* depending on the physical and/or chemical property to be controlled; and combining the host composition and the at least one associative polymer herein described at the selected concentration c.

According to a fourth aspect a method to provide an associative polymer is described. The method comprises providing a linear, branched or hyperbranched polymer backbone substantially soluble in a non-polar composition and having at least two ends; and attaching at two or more ends of the at least two ends of the a linear, branched or hyperbranched backbone a functional group capable of undergoing an associative interaction with another with an association constant (k) in the range of from $0.1<\log_{10}k<18$, so that the strength of each associative interaction is less than that of a covalent bond between backbone atoms.

According to a fifth aspect a system is described for controlling a physical and/or chemical property in an non-polar composition, the system comprising at least two between at least one associative polymer herein described and at least one host composition having a dielectric constant equal to or less than 5.

The associative polymers, and related material compositions, methods and systems herein described can be used in connection with applications wherein control of physical and/or chemical properties of non-polar compositions is desired. Exemplary applications comprise fuels, inks, paints, cutting fluids, lubricants, pesticides and herbicides as well as synthetic blood, adhesive processing aids, personal care products (e.g. massage oils or other non-aqueous compositions) and additional applications which are identifiable by a skilled person. Additional applications comprise industrial processes in which reduction of flow resistance, mist control, lubrication, and/or control of viscoelastic properties of a non-polar composition and in particular a liquid non polar composition is desired.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this specification, illustrate one or more embodiments of the present disclosure and, together with the detailed description and the examples, serve to explain the principles and implementations of the disclosure.

FIG. 1A shows schematics of telechelic donor/acceptor interaction. FIG. 1B shows schematics of telechelic self-associating interactions.

FIG. 2A describes an exemplary donor acceptor association FIG. 2B describes an exemplary self-association.

FIG. 11, shows a diagram illustrating the GPC traces of a telechelic 1,4-PB with a backbone length of 430,000 g/mol ($M_w$) and end groups having 4 tert-butyl ester groups on each (denoted TE groups hereinafter; the polymer is denoted 430K di-TE PB hereinafter) and the resulting polymer of its hydrolysis reaction (in THF).The resulting end-groups with 4 acid groups and the polymer are hereinafter denoted TA groups and 430K di-TA PB (di-TA PB also called octa acid PB herein), respectively.

FIG. 13, shows a diagram illustrating the GPC traces of telechelic 1,4-PB with a backbone length of 430,000 g/mol and end-groups with 4 chloro groups on each and the corresponding tertiary amine-terminated polymer (the end groups with 4 tertiary amines are denoted TB groups, and the corresponding polymer is denoted 430K di-TB PB hereinafter).

FIG. 16 shows an exemplary relationship between the radius of gyration $R_g$ of a backbone polymer as a function of its weight average molecular weight ($M_w$ in g/mol)

FIG. 17 shows a schematic representation of exemplary interactions between conventional linear polymers of the disclosure, in situation when the polymer concentration is equal to the overlap concentration c *. The dotted lines represent the radius of the single polymers (functional not shown). In particular the schematic of FIG. 17, show an exemplary way polymer molecules can pervade the entire solution when provided at their overlap concentration c *.

FIG. 23, Panel (a) shows the effect of end functionality N=1, 2, 4, 8 for polymers with Mw ~220,000g/mol (Table 3.1). Data are not available for octa-carboxyl end groups (N=8) due to insolubility of the material in both in CDD and TL. FIG. 23, Panel (b) shows results of N=4 at Mw=76, 230 and 430,000 g/mol. Graphs are on different scales.

FIG. 24, Panel (a) shows the effect in 1-chlorododecane (CDD). FIG. 24, Panel (b) shows the effect in tetralin (TL). Graphs are on different scales.

FIG. 26A shows CDD solutions of di-TA 1,4-PBs at three concentrations (0.4, 0.7 and 1.0 wt %) as a function of Mw: (a) 76,000 g/mol, (b) Mw=230,000 g/mol, and (c) 430,000 g/mol. FIG. 26B shows TL solutions of di-TA 1,4-PBs at three concentrations (0.4, 0.7 and 1.0 wt %) as a function of Mw: (a) 76,000 g/mol, (b) Mw=230,000 g/mol, and (c) 430,000 g/mol.

FIG. 27, Panel (a) shows the THY (thymine) spectrum. FIG. 27, Panel (b) shows DAAP (diacetamidopyridine). FIG. 27, Panel (c) shows the spectrum of a mixture of the two polymers with a mass ratio of 1:2, which represents a stoichiometric ratio of approximately 1:2. The concentration of polymer in solution is approximate 1 wt %.

FIG. 28, Panel (a) shows the spectrum of 1,4-PB of $M_w$=50,000 g/mol with CA (cyanic acid) end groups. FIG. 28, Panel (b) shows the spectrum of 1,4-PB of $M_w$=24,000 g/mol with HR (Hamilton receptor) end groups. FIG. 28, Panel (c) shows a mixture of the two polymers with a mass ratio of 1:1.4, which represents a stoichiometric ratio of CA:HR of approximately 1:2. The concentration of polymer in solution is approximate 1 wt %.

FIG. 29, Panel (a) shows the spectrum of 1,4-PB of $M_w$=22,000 g/mol with TB end groups. FIG. 29, Panel (b) shows the spectrum of a mixture of 1,4-PB of $M_w$=22,000 g/mol with TB end groups and 1,4-PB of $M_w$=22,000 g/mol with TA end groups two polymers with a mass ratio of 1:1. The concentration of polymer in solution is approximate 1 wt %.

FIG. 30, Panel (a) shows the spectrum of 1,4-PB of $M_w$=288,000 g/mol with THY end groups. FIG. 30, Panel (b) shows the spectrum of 1,4-PB of $M_w$=219,000 g/mol with DAAP end groups. FIG. 30, Panel (c) shows the spectrum of a mixture of the two polymers with a mass ratio of 1:2. The concentration of polymer in solution is approximate 1 wt %.

FIG. 31, Panel (a) shows the spectrum of 1,4-PB of $M_w$=200,000 g/mol with CA end groups. FIG. 31, Panel (b) shows the spectrum of 1,4-PB of $M_w$=240,000 g/mol with HR end groups. FIG. 31, Panel (c) shows the spectrum of a mixture of the two polymers with a mass ratio of 1:2. The concentration of polymer in solution is approximate 1 wt %.

FIG. 32A shows the spectrum of 1,4-PB of $M_w$=250,000 g/mol with TB end groups. FIG. 32B shows the spectrum of a mixture of 1,4-PB of $M_w$=250,000 g/mol with TB end groups and 1,4-PB of $M_w$=230,000 g/mol with TA end groups two polymers with a mass ratio of 1:1. The concentration of polymer in solution is approximate 1 wt %.

FIG. 46A shows a synthesis of a CTA with only one tent-butyl ester on each side (compound 3). FIG. 46B shows a synthesis of a CTA with only one tent-butyl ester on each side (compound 10), with the conditions being: (a) 2.2 eq. of 2 or 2', $K_2CO_3$, N,N-dimethylformamide (DMF), 80° C., 5 h; (b) 4 eq. of $LiAlH_4$, THF, R.T., overnight; (c) 6 eq. of 2 or 2', 6 eq. of $PPh_3$, 6 eq. of DIAD, THF, 0° C. then 40° C., overnight; (d) 8 eq. of $LiAlH_4$, THF, R.T., overnight; (c) 12 eq. of 3, 12 eq. of $PPh_3$, 12 eq. of DIAD, THF, 0° C. then 40° C., overnight.

DETAILED DESCRIPTION

Figure 1A:
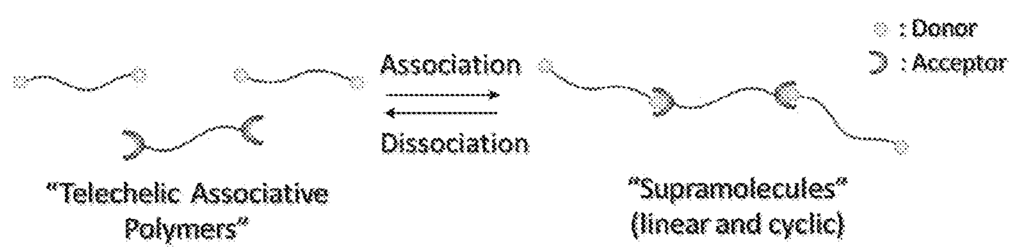
FIG. 1A and FIG. 1B show a schematic illustration of supramolecular structures of associative polymers according to embodiments herein described. In particular.
Figure 1B:
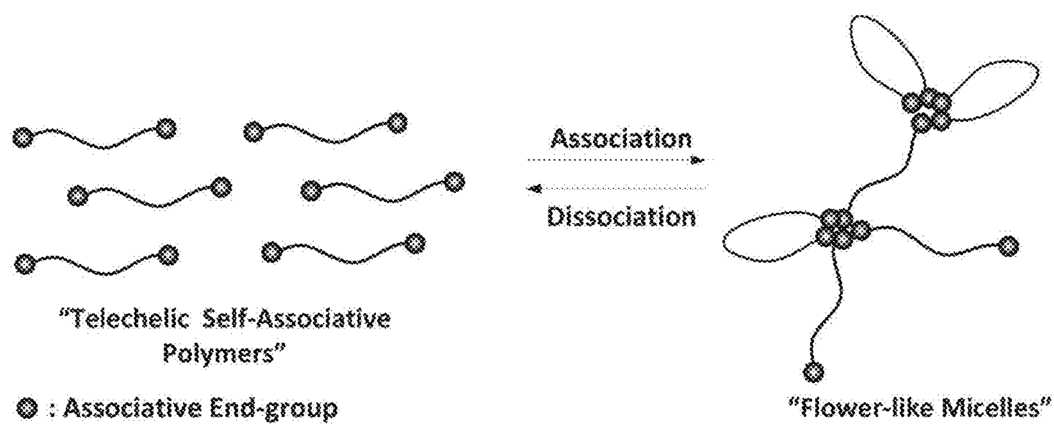
Figure 2A:
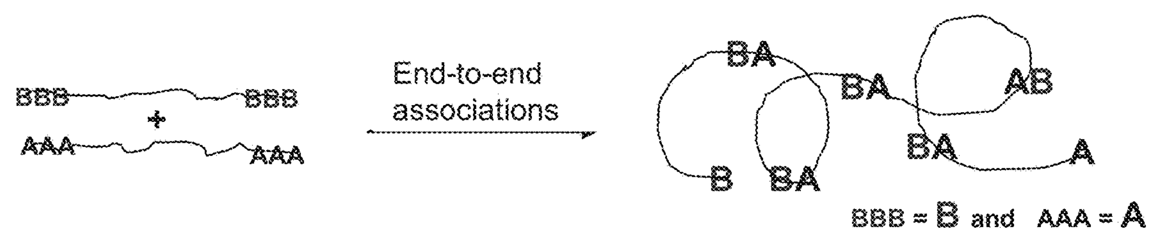
FIG. 2A and FIG. 2B show a schematic illustration of end to end association in associative polymers herein described.
Figure 2B:
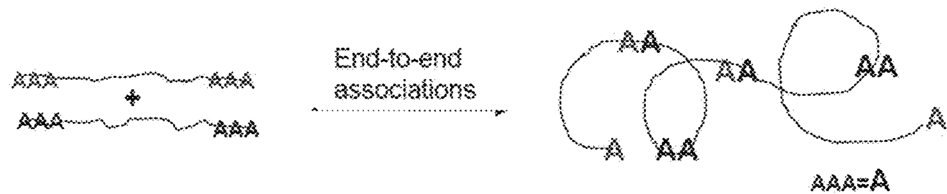

Associative polymers, and related materials, compositions, methods, and systems are described, which based in several embodiments, allow control of physical and/or chemical properties, of a non-polar composition.

"Chemical and/or physical properties" in the sense of the present disclosure comprise properties that are measurable whose value describes a state of a physical system and any quality that can be established only by changing a substance's chemical identity.

The term "non-polar compositions" in the sense of the present disclosure indicate compositions having a dielectric constant equal to or lower than 5 which can comprise compositions of varying chemical nature. In particular, a non-polar composition can comprise hydrocarbon compositions, fluorocarbon compositions or silicone compositions. A hydrocarbon composition is a composition in which the majority component is formed by one or more hydrocarbons. A fluorocarbon composition is a composition in which the majority component is formed by one or more fluorocarbons. A silicone composition is a composition in which the majority component is formed by one or more silicones.

In embodiments herein described, associative polymers are provided which can be added to a non-polar composition to control at least one physical and/or chemical property of the composition as illustrated in the present disclosure. In particular, chemical and/or physical properties that can be controlled by associative polymers herein described include drag reduction, mist control, lubrication, fuel efficiency and/or viscoelastic properties of a non-polar composition.

In particular, the term "drag reduction" as used herein refers to the reduction of the resistance to flow in turbulent flow of a fluid in a conduit (e.g. a pipe) or pipeline thereby allowing the fluid to flow more efficiently. A skilled person would realize that drag reduction can be described in terms that include, for example, a reduction in the friction factor at high Reynolds number, a reduction in the pressure drop required to achieve a given volumetric flow rate, or a reduction in hydraulic resistance. In particular, drag reduction can be measured by methods identifiable to a skilled person, for example measurement of the flow rate of a fluid though a conduit and/or by measurement of the change in pressure of a fluid flowing through a conduit.

In particular, the term "mist control" as used herein refers to the control of the properties of a fluid mist. In particular, the properties that can be controlled can include the sizes, and/or distribution of sizes, of the droplets of fluid comprising the fluid mist. In some embodiments, control of the sizes, and/or distribution of sizes, of the droplets can control the flammability of the mist of a fluid (e.g., to reduce the propagation of a flame through the fuel mist in the event of an accident). In other embodiments, control of the sizes, and/or distribution of sizes, of the droplets can increase the deposition of a fluid on an intended surface (e.g., to reduce pesticide wasted by convection away from the field to which it is being applied). In particular, mist control can be measured by techniques identifiable to a skilled person, such as measurement of the sizes and size distribution of droplets when a fluid is converted to a mist.

In particular, the term "lubrication" as used herein refers to the reduction of wear and/or inhibition of movement between two surfaces separated by a non-polar composition as herein described. In particular, in some embodiments, the lubrication properties of a non-polar composition can be controlled to improve the wear-resistance and/or movement of the surfaces with respect to each other when the non-polar composition is introduced as a lubricant between the two surfaces (e.g. improving the wear-resistance and/or movement of ball bearings in a ball bearing structure, or improving the wear resistance and/or movement of a piston in an engine). In particular, lubrication of a fluid can be measured by techniques identifiable to a skilled person, such as rheological measurements (e.g. measuring the coefficient of friction when two surfaces with the fluid between them are slid past each other).

In particular, the term "fuel efficiency" as used herein, refers to the thermal efficiency with which the potential energy of a fuel is converted to kinetic energy and/or work in the chemical transformation undergone by the fuel (e.g. combustion of the fuel in an engine). In particular, fuel efficiency can be measured by techniques identifiable to a skilled person, such as measurement of the amount of work performed by the chemical transformation of the fuel (e.g. measuring the number of miles of travel an engine can provide when combusting a given volume of fuel).

In particular, the term "viscoelastic properties" as used herein refers to the manner in which a non-polar composition reacts to external stresses such as deformation, in which the non-polar fluid exhibits a combination of viscous response (e.g. production of a permanent strain of the non-polar composition once it has been distorted by the applied stress) and elastic response (deformation of the non-polar composition during application of the stress, and return to the original shape upon removal of the stress). In particular, viscoelastic properties can be measured by methods identifiable to a skilled person, such as rheological measurements (e.g. measurement of the storage and loss moduli of the non-polar composition).

In the associative polymer the linear or branched backbone is substantially soluble in the non-polar composition. The term "substantially soluble" as used herein with reference to a polymer and a nonpolar composition indicates the ability of the polymer backbone to dissolve in the non-polar liquid. Accordingly, the backbone of the associative polymers as herein described can be substantially soluble in a nonpolar composition when the polymer backbone and nonpolar composition have similar Hildebrand solubility parameters (δ) which is the square root of the cohesive energy density:

$$\delta = \sqrt{\frac{\Delta H_v - RT}{V_m}}$$

wherein $\Delta H_v$ is equal to the heat of vaporization, R is the ideal gas constant, T is the temperature, and $V_m$ is the molar volume. In particular, similar solubility parameters between a polymer and a nonpolar composition can be found when the absolute value of the difference between their solubility parameters is less than about 1 $(\text{cal/cm}^3)^{1/2}$ (see also Tables 3-5 herein). A skilled person will realize that the ability of the backbone to dissolve in the non-polar composition can be verified, for example, by placing an amount of the homopolymer or copolymer to be used as the backbone of the associative polymer in a host liquid as herein described, and observing whether or not it dissolves under appropriate conditions of temperature and agitation that are identifiable to a skilled person.

In some embodiments, the backbone of associative polymers as herein described can be substantially soluble in a nonpolar composition when the difference in solubility parameters gives rise to a Flory-Huggins interaction parameter (χ) of about 0.5 or less. In particular, x can be determined by the following empirical relationship:

$$\chi = \chi_s + \chi_H \approx 0.34 + \frac{v_0}{RT}(\delta_1 - \delta_2)^2$$

where $\chi_s$ is the entropic part of the interaction between the associative polymer and nonpolar composition (generally assigned an empirical value of 0.34, as would be apparent to a skilled person), $\chi_H$ is the enthalpic part of the interaction, $v_0$ is the molar volume of the nonpolar composition, $\delta_1$ is the solubility parameter of the polymer, and $\delta_2$ is the solubility parameter of the host. Additional exemplary empirical solubility parameters are identifiable by a skilled person (see, e.g., [Ref 1] and other available references known or identifiable by one skilled in the art) An exemplary solubility determination of the backbone of an associative polymer according to the disclosure with an exemplary non-polar composition is reported in Example 12. Similarly, a skilled person can determine if other associative polymer backbones would be substantially soluble in other non-polar compositions by applying the same calculations using the particular solubility parameters for the particular non-polar composition.

In embodiments herein described, associative polymers are polymers having a non-polar backbone and functional groups presented at ends of the non-polar backbone and in particular at two or more ends of the non-polar backbone.

In the associative polymer, the functional groups able to associate with each other and/or corresponding functional groups in other associative polymers to be added to a same non-polar composition can associate with an association constant (k) of from $0.1<\log_{10}k<18$, so that the strength of each associative interaction is less than that of a covalent bond between backbone atoms.

The term "functional group" as used herein indicates specific groups of atoms within a molecular structure that are responsible for the characteristic physical and/or chemical reactions of that structure and in particular to physical and/or chemical associative interactions of that structure. As used herein, the term "corresponding functional group" or "complementary functional group" refers to a functional group that can react, and in particular physically or chemically associate, to another functional group. Thus, functional groups that can react, and in particular physically or chemically associate, with each other can be referred to as corresponding functional groups. In some embodiments herein described functional end groups of polymers to be added to a same non-polar compositions are corresponding functional groups in the sense of the present disclosure.

In particular, exemplary functional groups can include such groups as carboxylic acids, amines, and alcohols, and also molecules such as, for example, diacetamidopyridine, thymine, the Hamilton Receptor (see, e.g. [Ref 2]), cyanuric acid, and others identifiable to a skilled person. In particular, some of the exemplary functional groups can form pairs of complementary functional groups, for example, carboxylic acids with other carboxylic acids, carboxylic acids with amines, alcohols with amines, alcohols with carboxylic acids, diacetamidopyridine with thymine, the Hamilton Receptor with cyanuric acid, and others identifiable to a skilled person (see, e.g., FIG. 4).

In particular, in some embodiments, functional groups as herein described can be synthesized by installation of other functional groups onto the backbone of the associative polymers at a plurality of appropriate ends as herein described and transformed according to methods identifiable to a skilled person (see, e.g. [Ref 3]). In particular, in some of those embodiments the installation can be performed in at least two ends of the associative polymers. More particularly, installation at an end of the polymer can be performed by installation of the functional group on the terminal monomer of the polymer backbone, or on an internal monomer within a range of approximately 1 to 100 monomers from the terminal monomer.

In particular, in some embodiments, the at least two ends of the associative polymers herein described identify at least two positions in the linear branched or hyperbranched polymer backbone of the associative polymer that are separated by an internal span that has a length of at least 2,000 backbone bonds, or an internal span between functional groups with a weight average molar mass not less than 100,000 g/mol. In embodiments herein described installation is performed so that the functional groups are presented on the polymer.

The terms "present" and "presented" as used herein with reference to a compound or functional group indicates attachment performed to maintain the chemical reactivity of the compound or functional group as attached. The term "attach" or "attached" as used herein, refers to connecting or uniting by a bond, link, force or tie in order to keep two or more components together, which encompasses either direct or indirect attachment where, for example, a first molecule is directly bound to a second molecule or material, or one or more intermediate molecules are disposed between the first molecule and the second molecule or material.

In particular, groups presented "at an end" of the polymer backbone can comprise groups attached to the terminal monomer of a polymer or to a monomer less than 100 monomers from a terminal monomer of the polymer.

In various embodiments, functional end groups of associative polymers herein described are able to associate in a donor/acceptor association and/or in a self-to-self association (FIG. 1A, FIG. 1B and FIG. 2A, FIG. 2B). In the donor/acceptor association the donor and acceptor can be stoichiometric (e.g. equal numbers of donor and acceptor functional groups) or non-stoichiometric (e.g. more donor groups than acceptor groups or vice versa).

In various embodiments, the self-associative polymers, the backbone can be linear or branched and following association of the functional end groups the self-associating polymer can form various supramolecular architectures (see Example 1). In particular in some embodiments the backbone length can be such that the backbone has a weight-averaged molecular weight of 250,000 g/mol and more for individual chains.

More particularly, in various embodiments, the backbone can be a nonpolar linear, branched or hyperbranched polymer or copolymer (e.g. substituted or unsubstituted polydienes such as poly(butadiene) (PB) and poly(isoprene), and substituted or unsubstituted polyolefins such as polyisobutylene (PIB) and ethylene-butene copolymers, poly(norbornene), poly(octene), polystyrene (PS), poly(siloxanes), polyacrylates with alkyl side chains, polyesters, and/or polyurethanes) providing a number of flexible repeat units between associative functional end groups. In some embodiments, the weight average molar mass ($M_w$) of the associative polymer can be equal to or lower than about 2,000,000 g/mol and in particular can be between about 100,000 g/mol and about 1,000,000 g/mol.

In particular, in some embodiments, the backbone and functional end groups can be selected to have a ratio of carbon atoms to heteroatoms greater than about 1000:1 in the associative polymers. For example, in some embodiments, a skilled person can ensure that the heteroatom content is so low (e.g. greater than 10,000:1) as to not affect burning (e.g. the emissions produced by burning a fuel composition that contains some associative polymers). In some embodiments, the associative polymer can comprise functional groups within the backbone as shown schematically in FIG. 6 and, therefore, in a location not limited to the functional groups at one or more end of the polymer backbone while still maintaining a ratio of carbon atoms to heteroatoms greater than about 1000:1.

In particular embodiments, associative polymers herein described can have structural unit of formula [[FG-chain [node] (I) and optionally the structural unit of formula node chain] (II)

wherein:

FG is a functional group, which can comprise one or more associative moieties such that the functional group are capable of undergoing an associative interaction with each other with an the association constant (k) in a range from $0.1<\log_{10}k<18$, so that the strength of each associative interaction is less than that of a covalent bond between backbone atoms;

chain is a non-polar polymer substantially soluble in a non-polar composition, the polymer having formula:

$R_1-[A]_nR_2$ (III)

wherein:

A is a chemical and in particular an organic moiety;

$R_1$ and $R_2$ are independently selected from any carbon based or organic group; and n is an integer≥1;

node is a covalently linked moiety linking one of $R_1$ and $R_2$ of at least one first chain with one of the $R_1$ and $R_2$ of at least one second chain;

and wherein the FG, chain and node of different structural units of the polymer can be the same or different.

In some embodiments herein described, FG indicates a functional group that is capable of undergoing an associative interaction with another suitable functional group whereby the association constant (k) for an interaction between associating functional groups is in the range $0.1<\log_{10}k<18$, and in particular in the range $4<\log_{10}k<14$ so that the strength of each individual interaction is less than that of a covalent bond between backbone atoms. In particular, in some embodiments, the FG can be chosen to have an association constant that is suitable for a given concentration of the associative polymer in the non-polar composition relative c*, as described herein. For example, a skilled person will realize that if the concentration of the associative polymer is high (e.g. greater than 3 c *), a lower logiok value (e.g. about 4 to about 6) can be suitable, as can a higher $\log_{10}k$ value (e.g. about 6 to about 14). Additionally, a skilled person will also realize that if the concentration of associative polymer is low (e.g. less than 0.5 c*) a higher $\log_{10}k$ value (e.g. about 6 to about 14) can be suitable.

Exemplary FGs comprise those that can associate through homonuclear hydrogen bonding (e.g. carboxylic acids, alcohols), heteronuclear hydrogen bond donor-acceptor pairing (e.g. carboxylic acids-amines), Lewis-type acid-base pairing (e.g. transition metal center-electron pair donor ligand such as palladium (II) and pyridine, or iron and tetraaceticacid, or others identifiable to a skilled person as moieties that participate in metal-ligand interactions or metal-chelate interactions), electrostatic interactions between charged species (e.g. tetraalkylammonium-tetraalkylborate), pi-acid/pi-base or quadrupole interactions (e.g. arene-perfluoroarene), charge-transfer complex formation (e.g. carbazole-nitroarene), and combinations of these interactions (e.g. proteins, biotin-avidin). More than one type of FG may be present in a given polymer structure.

In some embodiments, FG can selected among a diacetamidopyridine group, thymine group, Hamilton Receptor group (see, e.g. [Ref 2]), cyanuric acid group, carboxylic acid group, primary secondary or tertiary amine group, primary secondary and tertiary alcohol group, and others identifiable to a skilled person.

In the structural unit of Formulas (I) and (II) a chain can be a polymer backbone that is substantially soluble in a liquid host that has a dielectric constant equal to or less than 5. Such chains can comprise for example polydienes such as poly(butadiene), poly(isoprene), polyolefins such as polyisobutylene, polyethylene, polypropylene and polymers of other alpha olefins identifiable to a skilled person, poly(styrene), poly(acrylonitrile), poly(vinyl acetate), poly(siloxanes), substituted derivatives thereof, and copolymers of these.

In the structural unit of Formulas (I) and (II) a node can be a connecting unit between one or more and in particular two or more [FG-chain] units such that the total molecular structure is substantially terminated by FG species (e.g., a plurality of the chain ends have a FG less than 100 repeat units from the chain end). In some embodiments, the simplest such polymer is a linear telechelic: two [FG-chain] units with their chains connected end-to-end at a node: [FG-chain]-node-[chain-FG] or FG-chain-FG. Alternative branched, hyperbranched, star, brush, partially-cross linked or other multi-armed polymer structures can also be used, provided that ends and/or other regions of the polymer chain are functionalized according to the present disclosure. In particular, a skilled person will understand from a reading of the present disclosure the term "functionalized" according to the present disclosure can be understood to mean that the functional groups can be at the end of the polymer chains or other polymer structures, or at different regions within the polymer chain (see, e.g., FIGS. 5-6).

In particular, in certain cases, the nodes can comprise one or more FG units such that some degree of associative functionality is present in the internal polymer structure. A node is formed by any covalently bound group such as organic, siloxane, and additional group identifiable by a skilled person. In particular, a node can link two or more chains through suitable covalent bonds and more particularly form branched polymers wherein a node can link two to 10 chain node chain](II) (see e.g. FIG. 5). More than one type of nodes may be present in a given polymer structure.

In particular in some embodiments, the chain can have a formula $R_1[A]_n-R_2$ (III) in which A is a chemical moiety suitable to be used as monomer and n can be an integer equal to or greater than 200 and, in particular, equal to or greater than 800. In some embodiments particular A can be a diene, olefin, styrene, acrylonitrile, methyl methacrylate, vinyl acetate, dichlorodimethylsilane, tetrafluoroethylene, acids, esters, amides, amines, glycidyl ethers, isocyanates and additional monomers identifiable by a skilled person. In particular, a skilled person will realize that the particular moieties used as monomers can give rise to polymer backbones that are suitable for combination with particular types of nonpolar compositions. For example, styrene monomers, olefin monomers, and in particular diene monomers can form polymers for very non-polar compositions (e.g. compositions with a dielectric constant of 1.5-2.5); amide, ester, epoxy, and urethanes can form polymers for nonpolar compositions that have somewhat greater dielectric constants (e.g., in the range 2.5-5); and fluorocarbon monomers and silicone monomers can form polymers for fluorous media. A skilled person will understand that additional types of monomers would be suitable for other types of nonpolar compositions.

In some embodiments, Ain Formula (III) can be a moiety of formula (IV):

(IV)

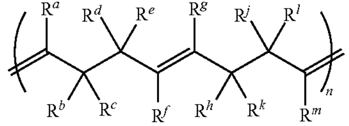

wherein $R^a$-$R^m$ are independently selected from hydrogen, $C_1$-$C_{12}$ substituted or unsubstituted alkyl, cycloalkyl, alkeneyl, cycloalkenyl, alkynyl, cycloakynyl, and aryl groups and n is in the range 200-20,000 and, in particular, in the range from 1000-10,000.

In some embodiments, A in formula (III) can be a moiety of formula (V)-(VIII):

(V)

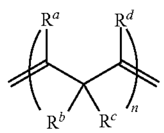

(VI)

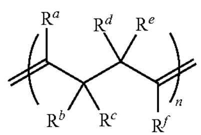

(VII)

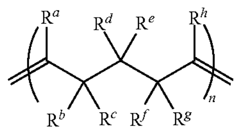

(VIII)

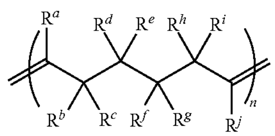

wherein $R^a$-$R^j$ are independently selected from the group consisting of hydrogen, $C_1$-$C_{12}$ substituted or unsubstituted alkyl, cycloalkyl, alkenyl, cycloalkenyl, alkynyl, cycloakynyl, and aryl groups and n is 1000-20,000.

In some embodiments, A in formula (III) can be a moiety of formula (IX):

(IX)

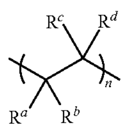

wherein $R^a$-$R^d$ are independently selected from the group consisting of hydrogen, $C_1$-$C_{12}$ substituted or unsubstituted alkyl, cycloalkyl, alkenyl, cycloalkenyl, alkynyl, cycloakynyl, and aryl groups and n is 1000-40,000.

In some embodiments, A in formula (III) can be a moiety of formula (X):

(X)

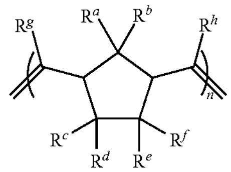

wherein $R^a$-$R^h$ are independently selected from the group consisting of hydrogen, $C_1$-$C_{12}$ substituted or unsubstituted alkyl, cycloalkyl, alkenyl, cycloalkenyl, alkynyl, cycloakynyl, and aryl groups and n is 1000-20,000.

In some embodiments, A in formula (III) can be a moiety of formula (XI):

(XI)

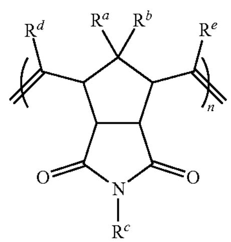

wherein $R^a$-$R^e$ are independently selected from the group consisting of hydrogen, $C_1$-$C_{12}$ substituted or unsubstituted alkyl, cycloalkyl, alkenyl, cycloalkenyl, alkynyl, cycloakynyl, and aryl groups and n is 1000-20,000.

In embodiments of the nodes of Formula (III) $R_1$ and $R_2$ can be chemical moieties independently selected and capable of forming a covalent bond. In some embodiments, a node can comprise functional groups such as arenes, perfluoroarenes, groups containing oxygen, groups containing nitrogen and groups containing phosphorus and sulfur all identifiable by a skilled person. In particular, functional groups suitable for nodes can comprise a carboxylic acid, amine, triarylphosphine, azide, acetylene, sulfonyl azide, thio acid and aldehyde. In particular, for example, in forming covalent links between node and chain and possibly between node and functional group a first chemical moiety and a second corresponding chemical moiety can be selected to comprise the following binding partners: carboxylic acid group and amine group, sulfonyl azide and thio acid, and aldehyde and primary amine. Additional chemical moieties can be identified by a skilled person upon reading of the present disclosure. Reference is also made to the exemplary nodes of Example 11.

In some embodiments, $R_1$ and/or $R_2$ can be independently a substituted or unsubstituted methine or methylene group.

In some embodiments where A is a moiety of formula (IV)-(VIII), (X), or (XI), $R_1$ and/or $R_2$ can be a moiety of formula (XII):

(XII)

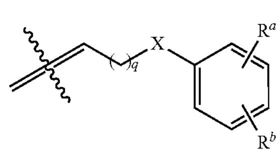

wherein:

q is 1 to 18;

X is selected from the group consisting of $CH_2$, O, and S; and $R^a$ and $R^b$ are independently hydrogen and/or a moiety of formula XIII-XVIII:

(XIII)

(XIV)

(XV)

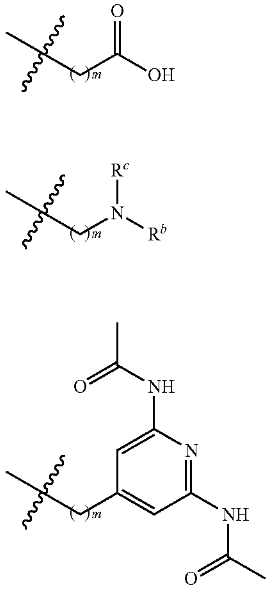

(XVI)

(XVII)

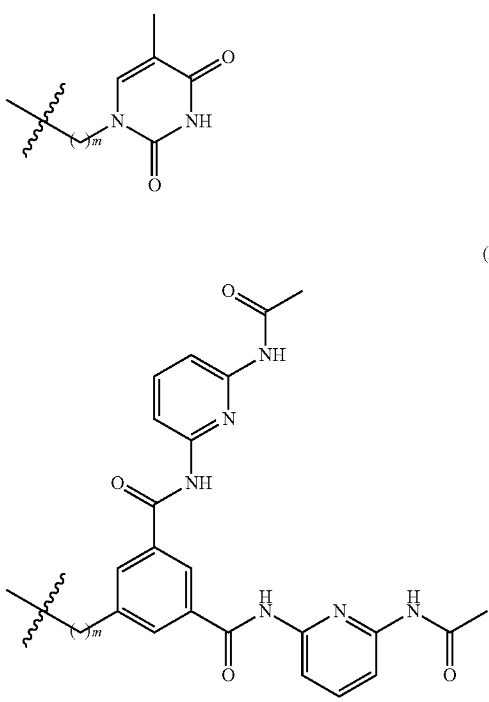

(XVIII)

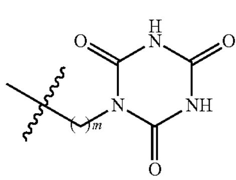

provided that at least one of $R^a$ and/or $R^b$ is not hydrogen.

In some embodiments where A is a moiety of formula (IV)-(VIII), (X), or (XI), $R_1$ and/or $R_2$ can be a moiety of formula (XX):

(XX)

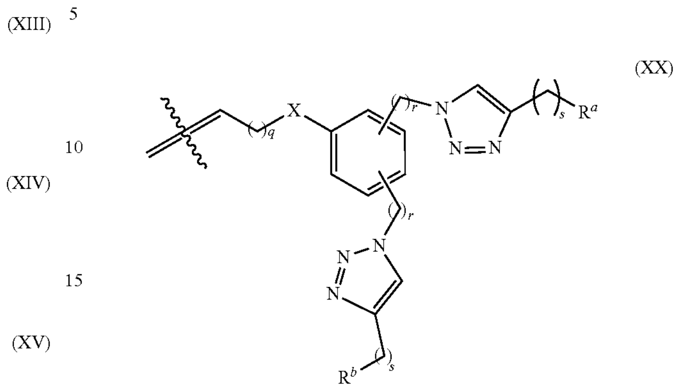

wherein:

q is 1 to 18;

X is selected from the group consisting of $CH_2$, O, and S; and $R^a$ and $R^b$ are independently a moiety of formula (XIII)-(XVIII) as described herein.

In some other embodiments where A is a moiety of formula (IV)-(VIII), (X), or (XI), $R_1$ and/or $R_2$ can be a moiety of formula (XX):

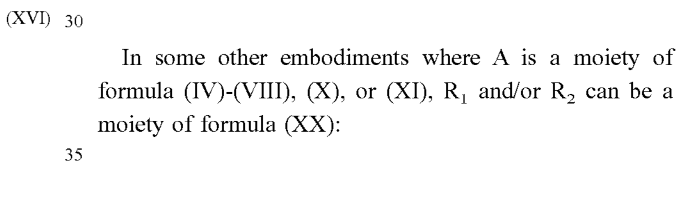

(XX)

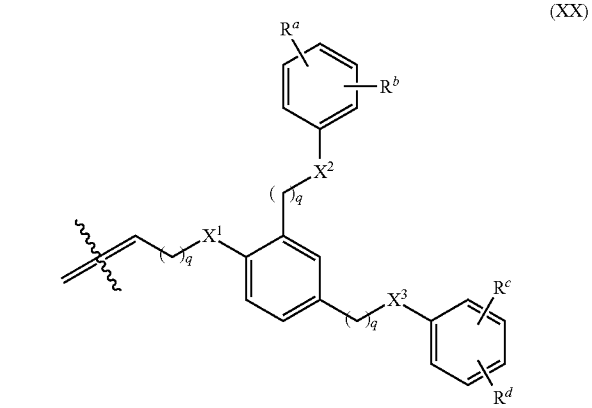

wherein:

q is 1 to 18;

$X^1$, $X^2$, and $X^3$ are independently selected from the group consisting of $CH_2$, O, and S; and $R^a$-$R^d$ are independently hydrogen and/or a moiety of formula (XIII)-(XVIII) as described herein; provided that at least one of $R^a$, $R^d$, $R^c$, and/or Rb is not hydrogen.

In some other embodiments where A is a moiety of formula (IV)-(VIII), (X), or (XI), $R_1$ and/or $R_2$ can be a moiety of formula (XXI):

(XXI)

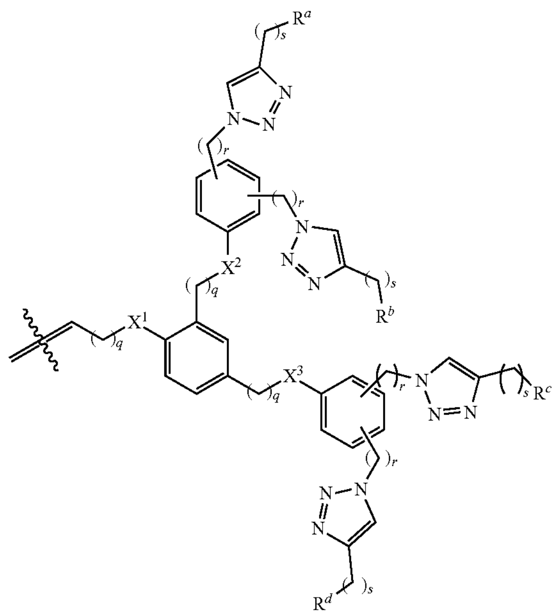

wherein:

q, r and s are independently 1 to 18;

$X^1$, $X^2$, and $X^3$ are independently selected from the group consisting of $CH_2$, O, and S; and $R^a$-$R^d$ are independently hydrogen and/or a moiety of formula (XIII)-(XVIII) as described herein; provided that at least one of $R^a$, $R^b$, $R^c$, and/or $R^d$ is not hydrogen.

In some embodiments nodes can also present additional groups for binding with FG which can be introduced at the node according to some embodiments. In some embodiments nodes comprise an organic moiety, in some embodiments nodes comprise non organic moieties such as Si—O and additional moieties identifiable by a skilled person.

In some embodiments where A is a moiety of formula (IX) $R_1$ and/or $R_2$ can be a moiety of formula (XXII):

(XXII)

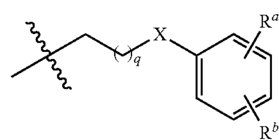

wherein:

q is 1 to 18;

X is selected from the group consisting of $CH_2$, O, and S; and $R^a$ and $R^b$ are independently H and/or a moiety of formula (XIII)-(XVIII) as described herein, provided that at least one of $R^a$ and/or $R^b$ is not H.

In some embodiments where A is a moiety of formula (IX) $R_1$ and/or $R_2$ can be a moiety of formula (XXIII):

(XXIII)

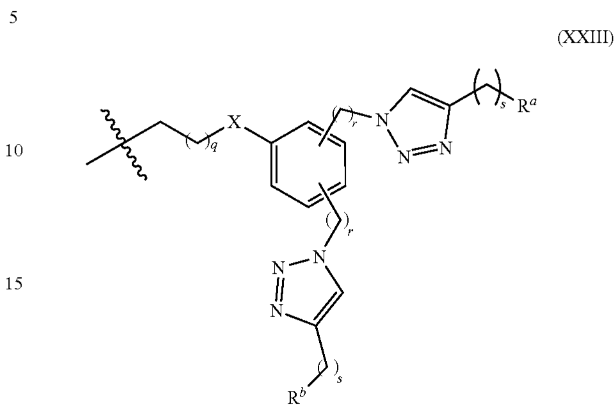

wherein:

q is 1 to 18;

X is selected from the group consisting of $CH_2$, O, and S; and $R^a$ and $R^b$ are independently a moiety of formula (XIII)-(XVIII) as described herein.

In some other embodiments where A is a moiety of formula (IX) $R_1$ and/or $R_2$ can be a moiety of formula (XXIV):

(XXIV)

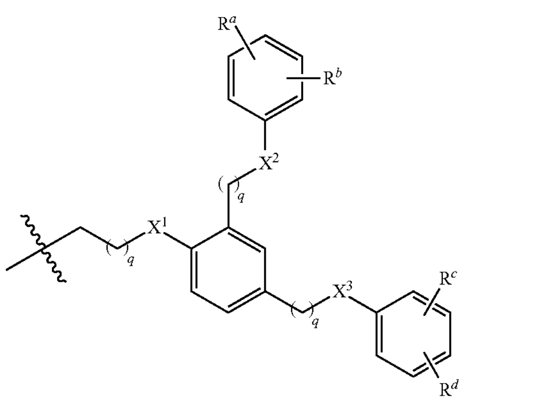

wherein:

q is 1 to 18;

$X^1$, $X^2$, and $X^3$ are independently selected from the group consisting of $CH_2$, O, and S; and $R^a$-$R^d$ are independently H and/or a moiety of formula (XIII)-(XVIII) as described herein; provided that at least one of $R^a$, $R^b$, $R^c$, and/or $R^d$ is not H.

In some other embodiments where A is a moiety of formula (IX) $R_1$ and/or $R_2$ can be a moiety of formula (XXV):

(XXV)

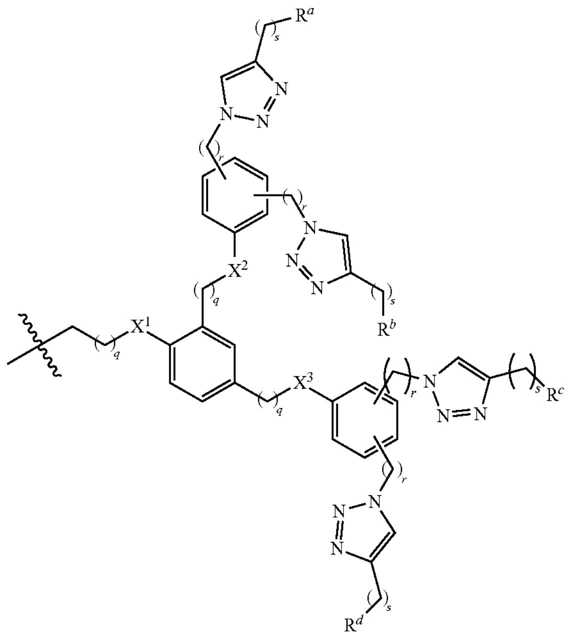

wherein:

q, r and s are independently 1 to 18;

$X^1$, $X^2$, and $X^3$ are independently selected from the group consisting of $CH_2$, O, and S; and $R^a$-$R^d$ are independently H and/or a moiety of formula (XIII)-(XVIII) as described herein; provided that at least one of $R^a$, $R^b$, $R^c$, and/or $R^d$ is not H.

In some other embodiments where A is a moiety of formula (IX) $R_1$ and/or $R_2$ can be a moiety of formula (XXVI):

(XXVI)

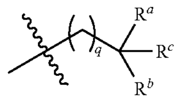

wherein:

q is 1-18;

$R^a$-$R^b$ are independently H and/or a moiety of formula (XIII)-(XVIII) as described herein; and $R^c$ is hydrogen or $C_1$-$C_{12}$ substituted or unsubstituted alkyl; provided that at least one of $R^a$, $R^b$, and/or $R^c$ is not H.

In some other embodiments where A is a moiety of formula (IX) $R_1$ and/or $R_2$ can be a moiety of formula (XXVII):

(XXVII)

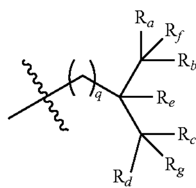

wherein:

q is 1 to 18;

$R^a$-$R^d$ are independently H and/or a moiety of formula (XIII)-(XVIII) as described herein; and $R^f$-$R^g$ are independently hydrogen or $C_1$-$C_{12}$ substituted or unsubstituted alkyl; provided that at least one of $R^a$, $R^b$, $R^c$, and/or $R^d$ is not H.

In particular in some embodiments the [chain-node] segments have average molar mass equal to or greater than 10,000 g/mol. In some embodiments the span of [chain-node]$_m$ between FGs has average molar mass>50,000 g/mol (in particular when dispersion in the host composition despite the "solvent-phobic" FGs is desired). In some embodiments, the largest span of the molecule can be equal to or less than 500,000 g/mol (for example, when resistance to shear degradation is desired). In some embodiments the largest span of the molecule, expressed as weight average molecular weight can be equal to or less than 1,000,000 g/mol.

In some embodiments associative polymers herein described can be telechelic.

In some embodiments associative polymers herein described have a total polymer molecular weight is $M_w$< 2,000,000 g/mol and in particular can be between 100,000 g/mol and 1,000,000 g/mol. In some embodiments the largest span between nodes is less than 500,000 g/mol in particular when the associative polymers are branched polymers. In some embodiments associative polymers herein described can have an atomic composition with heteroatoms (i.e., other than C or H) present at less than 1 heteroatom per 1000 carbons. In some embodiments, heteroatoms are placed predominantly in correspondence of the functional groups.

In some embodiments associative polymers herein described can have a significant level of unsaturation (e.g. with a ratio of H to C less than 1.8), which can improve low temperature liquid behavior. However, fully-saturated chains can also be considered effective and are included in the scope of the current disclosure.

In various embodiments herein described, the associative polymers of the disclosure can interact to form supramolecular structures following interactions of the FG having association constant (k) of from $0.1<\log_{10}k<18$.

In particular, in embodiments of supramolecular structures, FG associations can be due to, for example reversible noncovalent interaction between the associative polymers that enables a discrete number of molecular subunits or components to be assembled, typically with an individual interaction strength less than that of a covalent bond. Exemplary interactions include, for example, self-associative hydrogen bonds (H-bonds), donor-acceptor H-bonds, Bronsted or Lewis acid-base interactions, electrostatic interactions, pi-acid/pi-base or quadrupolar interactions, charge transfer complex formation, or other supramolecular interactions.

In various embodiments herein described, the associative polymers of the disclosure can be used in connection with a non-polar composition to control physical and/or chemical properties of the composition. In particular, in some embodiments, the non-polar compositions comprise a host composition and at least one associative polymer herein described.

The terms "host" and "host composition", as used herein, refer to a majority component in a non-polar composition in which the physical and/or chemical properties are sought to be controlled. In particular, the host or host composition can be a single substance such as a solvent like hexane or benzene, or the host or host composition can be a substance which is a mixture such as gasoline, diesel, olive oil, or kerosene. The host or host composition can also be a mixture such as a paint or ink.

In particular, in non-polar compositions herein described a range of hosts can have dielectric constant less than 5, with hosts having dielectric constant less than 2.5 being particularly well suited to applications herein described as will be understood by a skilled person upon reading of the disclosure. Non-polar compositions with the above mentioned dielectric constants encompasses a wide range of liquids that are relevant to applications that comprise, fuels (such as gasoline, kerosene, jet fuel and additional fuels identifiable by a skilled person), foods and pharmaceuticals (such as olive oil, linseed oil, castor oil and additional foods identifiable by a skilled person), solvents used as cleaning fluids (such as turpentine, toluene and additional solvents identifiable by a skilled person), and adhesive formulations (such as pinene and additional formulations identifiable by a skilled person).

In embodiments of non-polar composition of the present disclosure, the dielectric constant of a given host will vary with temperature, which can be taken into account by one skilled in the art.

Exemplary non-polar compositions, and in particular host liquids, with a dielectric constant less than 5 are illustrated in the table below (Table 1A).The table also provides exemplary hosts that can be recognized as unfavorable for the modified non-polar compositions herein described (see Table 1B).

TABLE 1A

| Exemplary Favorable Hosts | | | |
|---|---|---|---|
| Entry | Fluid | Temperature/° C. | Dielectric constant ε |
| 1 | Benzene | 20 | 2.3 |
| 2 | Carbon disulfide | | 2.64 |
| 3 | Carbon tetrachloride | 20 | 2.23 |
| 4 | Castor oil | 15.6 | 4.7 |
| 5 | Chloroform | 20 | 4.8 |
| 6 | Cotton seed oil | | 3.1 |
| 7 | Cumene | 20 | 2.4 |
| 8 | Decane | 20 | 2 |
| 9 | Dodecane | 20 | 2 |
| 10 | Ether | 20 | 4.3 |
| 11 | Fluorine refrigerant R-12 | 25 | 2 |
| 12 | Fluorine refrigerant R-22 | 25 | 2 |
| 13 | Furan | 25 | 3 |
| 14 | Gasoline | 21.1 | 2 |
| 15 | Heptane | 20 | 1.9 |
| 16 | Hexane | −90 | 2 |
| 17 | Jet fuel | 21.1 | 1.7 |
| 18 | Kerosene | 21.1 | 1.8 |
| 19 | Linoleic acid | 0 | 2.6-2.9 |
| 20 | Linseed oil | | 3.2-2.5 |
| 21 | Naphthalene | 20 | 2.5 |
| 22 | Octane | 20 | 2 |
| 23 | Olive oil | 20 | 3.1 |
| 24 | Palmitic acid | 71.1 | 2.3 |
| 25 | Pentane | 20 | 1.8 |
| 26 | Phenol | 10 | 4.3 |
| 27 | Pinene | 20 | 2.7 |
| 28 | Styrene | 25 | 2.4 |
| 29 | Terpinene | 21.1 | 2.7 |
| 30 | Toluene | | 2.0-2.4 |
| 31 | Turpentine (wood) | 20 | 2.2 |
| 32 | Vacuum (by definition) | | 1 |
| 32.1 | Cyclohexane | | 2.0 |
| 32.2 | Liquid methane | −280 | 1.7 |
| 32.3 | Liquid Butane | −1 | 1.4 |
| 32.4 | Heavy oil | | 3 |
| 32.5 | Petroleum oil | | 2.1 |
| 32.6 | Liquid asphalt | | 2.5-3.2 |

TABLE 1B

| Exemplary Unfavorable Hosts | | | |
|---|---|---|---|
| Entry | Fluid | Temperature/° C. | Dielectric constant ε |
| 33 | Acetone | 25 | 20.7 |
| 34 | Alcohol, ethyl (ethanol) | 25 | 24.3 |
| 35 | Alcohol, methyl (methanol) | 20 | 35.1 |
| 36 | Alcohol, propyl | 20 | 21.8 |
| 37 | Ammonia (aqua) | 20 | 15.5 |
| 38 | Aniline | 20 | 7.3 |
| 39 | Cresol | 17.2 | 10.6 |
| 40 | Ethylamine | 21.1 | 6.3 |
| 41 | Ethylene glycol | 20 | 37 |
| 42 | Furfural | 20 | 42 |
| 43 | Glycerine | | 47.68 |
| 44 | Glycerol | 25 | 42.5 |
| 45 | Hexanol | 25 | 13.3 |
| 46 | Hydrazine | 20 | 52 |
| 47 | Pyridine | 20 | 12 |

In particular, in some embodiments, host composition that have dielectric constant equal to or less than about 5 are pentane, hexane, cyclohexane, benzene, toluene, chloroform and diethylether. In some embodiments, which can be used for fuel applications host composition can also have dielectric constant less than 5, including liquified petroleum gas, liquid methane, butane, gasoline, kerosene, jet fuel and diesel fuel.

In embodiments, herein described polymer dielectric constants can further provide an indication of their compatibility with a chosen non-polar composition that is in the range indicated in above. Reference is made for example to the exemplary list provided in the table below (Table 2).

TABLE 2

| Plastic Material | Dielectric Constant - ε - |
|---|---|
| Acetal | 3.7-3.9 |
| Acrylic | 2.1-3.9 |
| ABS* | 2.9-3.4 |
| Polybutadiene | approximately 2 |
| Polycarbonate | 2.9-3.8 |
| Polyester, TP | 3.0-4.5 |
| Polypropylene | 2.3-2.9 |
| Polysulfone | 2.7-3.8 |
| Polydimethylsiloxane (Silicone Rubber) | 3.0-3.2 |
| Polyphenylene sulfide | 2.9-4.5 |
| Polyacrylate | 2.6-3.1 |

*ABS is Acrylonitrile Butadiene Rubber

In particular, in some embodiments, for a given host determined to have a dielectric constant within the threshold herein disclosed, at least one associative polymer herein described is selected that is substantially soluble in the host in accordance with the present disclosure.

In particular, appropriate associative polymers for a given host can be identified by a skilled person in view of the present disclosure. For example the backbone substantially soluble in the host composition can be identified by comparison of the solubility parameters (δ) of the polymer backbone and host composition, as well as by determining the Flory-Huggins interaction parameter (χ) from the solubility parameters according to calculations described herein. In an exemplary embodiment, one or more polymer-solvent pairs can have silicone backbones for use in one or more fluorocarbon liquids.

In particular, an exemplary reference providing solubility parametes is the website www.sigmaaldrich.com/etc/medialib/docs/Aldrich/General_Information/polymer_solutions.Par.0 001.File.tmp/polymer_solutions.pdf at the time of filing of the present disclosure (see Tables 3-5). More particularly, a skilled person will know that Sigma-Aldrich and other chemical companies provide exemplary tables showing exemplary solubility paramenter values for various non-polar compositions and polymers. A skilled person can also refer to sources such as the Polymer Handbook to find solubility parameter values [Ref 1].

TABLE 3

Solubility Parameters for Plasticizers and Solvents (Alphabetical sequence)

| Solvent | δ (cal/ $cm^3$)F | H-bonding Strength[3] | Solvent | δ (cal/ $cm^3$)½ | H-bonding Strength[3] |
|---|---|---|---|---|---|
| Acetone | 9.9 | m | Dioctyl sebacate | 8.6 | m |
| Acetonitrile | 11.9 | p | 1,4-Dioxane | 10.0 | m |
| Amyl acetate | 8.5 | m | Di(propylene glycol) | 10.0 | s |
| Aniline | 10.3 | s | Di(propylene glycol) | 9.3 | m |
| Benzene | 9.2 | p | monomethyl ether | | |
| Butyl acetate | 8.3 | m | Dipropyl phthalate | 9.7 | m |
| Butyl alcohol | 11.4 | s | Ethyl acetate | 9.1 | m |
| Butyl butyrate | 8.1 | m | Ethyl amyl ketone | 8.2 | m |
| Carbon disulfide | 10.0 | p | Ethyl n-butyrate | 8.5 | m |
| Carbon tetrachloride | 8.6 | p | Ethylene carbonate | 14.7 | m |
| Chlorobenzene | 9.5 | p | Ethylene dichloride | 9.8 | p |
| Chloroform | 9.3 | p | Ethylene glycol | 14.6 | s |
| Cresol | 10.2 | s | Ethylene glycol diacetate | 10.0 | m |
| Cyclohexanol | 11.4 | s | Ethylene glycoi diethyl ether | 8.3 | m |
| Diamyl ether | 7.3 | m | Ethylene glycol dimethyl ether | 8.6 | m |
| Diamyl phthalate | 9.1 | m | Ethylene glycol monobutyl ether | 9.5 | m |
| Dibenzyl ether | 9.4 | m | (Butyl Cellosolve ®) | | |
| Dibutyl phthalate | 9.3 | m | Ethylene glycol monoethyl ether | 10.5 | m |
| Dibutyl sebacate | 9.2 | m | (Cellosolve ®) | | |
| 1,2-Dichlorobenzene | 10.0 | p | Furfuryl alcohol | 12.5 | s |
| Diethyl carbonate | 8.8 | m | Glycerol | 16.5 | s |
| Di(ethylene glycol) | 12.1 | s | Hexane | 7.3 | p |
| Di(ethyiene glycol) monobutyl | 9.5 | m | Isopropyl alcohol | 8.8 | m |
| ether (Butyl Carbitol ®) | | | Methanol | 14.5 | s |
| Di(ethylene glycol) monoethyl | 10.2 | m | Methyl amyl ketone | 8.5 | m |
| ether (Carbitol ®) | | | Methylene chloride | 9.7 | p |
| Diethyl ether | 7.4 | m | Methyl ethyl ketone | 9.3 | m |
| Diethyl ketone | 8.8 | m | Methyl isobutyl ketone | 8.4 | m |
| Diethyl phthalate | 10.0 | m | Propyl acetate | 8.8 | m |
| Di-n-hexyl phthalate | 8.9 | m | 12-Propylenecarbonate | 13.3 | m |
| Diisodecyl phthalate | 7.2 | m | Propylene glycol | 12.6 | s |
| N,N-Dimethylacetamide | 10.8 | m | Propylene glycol methyl ether | 10.1 | m |
| Dimethyl ether | 8.8 | m | Pyridine | 10.7 | s |
| N,N-Dimethylformamide | 12.1 | m | 1,1,2,2-Tetrachloroethane | 9.7 | p |
| Dimethyl phthalate | 10.7 | m | Tetrachloroethylene | 9.3 | p |
| Dimethylsiloxanes | 4.9-5.9 | p | (perchloroethylene) | | |
| Dimethyl sulfoxide | 12.0 | m | Tetrahydroturan | 9.1 | m |
| Dioctyl adipate | 8.7 | m | Toluene | 8.9 | p |
| Dioctyl phthalate | 7.9 | m | Water | 23.4 | s |

[2]"Polymer Handbook", Eds. Brandrup, J.; Immergut, E.H.; Grulke, E.A., 4th Edition, John Wiley, New York, 1999, VII/675-711.Aldrich Number Z41.247-3.
[3]H-Bonding: p = poor; m = moderate; s = strong

TABLE 4

Solubility Parameters (δ) for Plasticizers and Solvents (Increasing δ value sequence)

| Solvent | δ $(cal/cm^3)^{1/2}$ | H-bonding Strength[4] | Solvent | δ $(cal/cm^3)^{1/2}$ | H-bonding Strength[4] |
|---|---|---|---|---|---|
| Dimethylsiloxanes | 4.9-5.9 | p | Di(ethylene glycol) monobutyl | 9.5 | m |
| Diisodecyl phthalate | 7.2 | m | ether (Butyl Carbitol ®) | | |
| Hexane | 7.3 | p | Chlorobenzene | 9.5 | p |
| Diamyl ether | 7.3 | m | Methylene chloride | 9.7 | p |
| Diethyl ether | 7.4 | m | Dipropyl phthalate | 9.7 | m |
| Dioctyl phthalate | 7.9 | m | 1,1,2,2-Tetrachloroethane | 9.7 | p |
| Butyl butyrate | 8.1 | m | Ethylene dichloride | 9.8 | p |
| Ethyl amyl ketone | 8.2 | m | Acetone | 9.9 | m |
| Ethylene glycol diethyl ether | 8.3 | m | 1,2-Dichlorobenzene | 10.0 | p |
| Butyl acetate | 8.3 | m | Diethyl phthalate | 10.0 | m |
| Methyl isobutyl ketone | 8.4 | m | Ethylene glycol diacetate | 10.0 | m |
| Methyl amyl ketone | 8.5 | m | Di(propylene glycol) | 10.0 | s |
| Amyl acetate | 8.5 | m | Carbon disulfide | 10.0 | p |
| Ethyl n-butyrate | 8.5 | m | 1,4-Dioxane | 10.0 | m |

TABLE 4-continued

| Solubility Parameters (δ) for Plasticizers and Solvents (Increasing δ value sequence) | | | | | |
|---|---|---|---|---|---|
| Solvent | δ $(cal/cm^3)^{1/2}$ | H-bonding Strength[4] | Solvent | δ $(cal/cm^3)^{1/2}$ | H-bonding Strength[4] |
| Ethylene glycol dimethyl ether | 8.6 | m | Propylene glycol methyl ether | 10.1 | m |
| Carbon tetrachloride | 8.6 | p | Di(ethylene glycol) monoethyl ether (Carbitol ®) | 10.2 | m |
| Dioctyl sebacate | 8.6 | m | Cresol | 10.2 | s |
| Dioctyl adipate | 8.7 | m | Aniline | 10.3 | s |
| Isopropyl alcohol | 8.8 | m | Ethylene glycol monoethyl ether (Cellosolve ®) | 10.5 | m |
| Diethyl carbonate | 8.8 | m | Pyridine | 10.7 | s |
| Propyl acetate | 8.8 | m | Dimethyl phthalate | 10.7 | m |
| Diethyl ketone | 8.8 | m | N,N-Dimethylacetamide | 10.8 | m |
| Dimethyl ether | 8.8 | m | Cyclohexanol | 11.4 | s |
| Toluene | 8.9 | p | Butyl alcohol | 11.4 | s |
| Di-n-hexyl phthalate | 8.9 | m | Acetonitile | 11.9 | p |
| Ethyl acetate | 9.1 | m | Dimethyl sulfoxide | 12.0 | m |
| Diamyl phthalate | 9.1 | m | Di(ethylene glycol) | 12.1 | s |
| Tetrahydrofuran | 9.1 | m | N,N-Dimethylformamide | 12.1 | m |
| Dibutyl sebacate | 9.2 | m | Furfuryl alcohol | 12.5 | s |
| Benzene | 9.2 | p | Propylene glycol | 12.6 | a |
| Tetrachloroethylene (perchloroethylene) | 9.3 | p | 1,2-Propylenecarbonate | 13.3 | m |
| Di(propylene glycol) monomethyl ether | 9.3 | m | Methanol | 14.5 | s |
| Chloroform | 9.3 | p | Ethylene glycol | 14.6 | s |
| Dibutyl phthalate | 9.3 | m | Ethylene carbonate | 14.7 | m |
| Methyl ethyl ketone | 9.3 | m | Glycerol | 16.5 | s |
| Dibenzyl ether | 9.4 | m | Water | 23.4 | s |
| Ethylene glycol monobutyl ether (Butyl Cellosolve ®) | 9.5 | m | | | |

[4]H-Bonding: p = poor; m = moderate; s = strong

Carbitol and Cellosolve are registered trademarks of Union Carbide Corp.

TABLE 5

| Solubility Parameters for Homopolymers[5] | | | |
|---|---|---|---|
| Reapeating Unit (Alphabetical sequence) | δ(cal/ $cm^3)^{1/2}$ | Reapeating Unit (Increasing δ Value Sequence) | δ(cal/ $cm^3)^{1/2}$ |
| Acrylonitrile | 12.5 | Tetrafluoroethylene | 6.2 |
| Butyl acrylate | 9.0 | Isobutyl methacrylate | 7.2 |
| Butyl methacrylate | 8.8 | Dimethylsiloxane | 7.5 |
| Cellulose | 15.6 | Propylene oxide | 7.5 |
| Cellulose acetate (56% Ac groups) | 27.8 | Isobutylene | 7.8 |
| Cellulose nitrate (11.8% N) | 14.8 | Steatyl methacrylate | 7.8 |
| Chloroprene | 9.4 | Ethylene | 8.0 |
| Dimethylsiloxane | 7.5 | 1,4-cis-Isoprene | 8.0 |
| Ethyl acrylate | 9.5 | Isobornyl methacrylate | 8.1 |
| Ethylene | 8.0 | Isoprene, natural rubber | 8.2 |
| Ethylene terephthalate | 10.7 | Lauryl methacrylate | 8.2 |
| Ethyl methacrylate | 9.0 | Isobornyl acrylate | 8.2 |
| Formaldehyde (Oxymethylene) | 9.9 | Octyl methacrylate | 8.4 |
| Hexamethylene adipamide (Nylon 6/6) | 13.6 | n-Hexyl methacrylate | 8.6 |
| n-Hexyl methacrylate | 8.6 | Styrene | 8.7 |
| Isobornyl acrylate | 8.2 | Propyl methacrylate | 8.8 |
| 1,4-cis-Isoprene | 8.0 | Butyl methacrylate | 8.8 |
| Isoprene, natural rubber | 8.2 | Ethyl methacrylate | 9.0 |
| Isobutylene | 7.8 | Butyl acrylate | 9.0 |
| Isobornyl methacrylate | 8.1 | Propyl acrylate | 9.0 |
| Isobutyl methacrylate | 7.2 | Propylene | 9.3 |
| Lauryl methacrylate | 8.2 | Chloroprene | 9.4 |
| Methacrylonitrile | 10.7 | Tetrahydrofuran | 9.4 |
| Methyl acrylate | 10.0 | Methyl methacrylate | 9.5 |
| Methyl methacrylate | 9.5 | Ethyl acrylate | 9.5 |

TABLE 5-continued

| Solubility Parameters for Homopolymers[5] | | | |
|---|---|---|---|
| Reapeating Unit (Alphabetical sequence) | δ(cal/ $cm^3)^{1/2}$ | Reapeating Unit (Increasing δ Value Sequence) | δ(cal/ $cm^3)^{1/2}$ |
| Octyl methacrylate | 8.4 | Vinyl chloride | 9.5 |
| Propyl acrylate | 9.0 | Formaldehyde (Oxymethylene) | 9.9 |
| Propylene | 9.3 | Methyl acrylate | 10.0 |
| Propylene oxide | 7.5 | Vinyl acetate | 10.0 |
| Propyl methacrylate | 8.8 | Methacrylonitrile | 10.7 |
| Stearyl methacrylate | 7.8 | Ethylene terephthalate | 10.7 |
| Styrene | 8.7 | Vinylidene chloride | 12.2 |
| Tetrafluoroethylene | 6.2 | Acrylonitrile | 12.5 |
| Tetrahydrofuran | 9.4 | Vinyl alcohol | 12.6 |
| Vinyl acetate | 10.0 | Hexamethylene adipamide(Nylon 6/6) | 13.6 |
| Vinyl alcohol | 12.6 | Cellulose nitrate (11.8% N) | 14.8 |
| Vinyl chloride | 9.5 | Cellulose | 15.6 |
| Vinylidene chloride | 12.2 | Cellulose acetate (56% Ac groups) | 27.8 |

[5]Values reported are for homopolymers of the Repeating Unit. Reported δ values vary with the method of determination and test conditions. Averaged values are given in this table.

In particular, in some embodiments, the associative polymer can be selected depending on the particular physical and/or chemical properties of the non-polar composition to be controlled. In particular, in some embodiments, the chemical and/or physical property can be controlled by controlling concentration of one or more associative polymers in the host composition relative to the overlap concentration c* of the one or more associative polymers in the host concentration. Accordingly one or more associative polymers can be comprised in the host in a concentration of a fractional or integer multiple of the overlap concentration (c *).

The terms "overlap concentration", or "c *", as used herein refer to the concentration at which molecules of a non-associative form of the associative polymer (e.g. obtained from literature sources on the backbone of interest or from experimental methods described herein using the polymer of interest modified to inactivate the functional groups to prevent association, for example by esterifying carboxylic acids) dissolved in the host begin to overlap each other, as opposed to being separated as they would be in a more dilute solution. In particular, c* for particular polymers in particular hosts can be identified by methods and calculations identifiable to a skilled person (see, e.g. [Ref 4] and Example 23).

In particular, the chain length of the backbone can be chosen such that the backbone is long enough to ensure that a small concentration of the polymer will suffice to produce a desired effect using relationships between chain length and the c* of the associative polymer described herein. For example, a polymer that is effective at concentrations less than 1% by weight can be obtained by choosing a backbone length that gives c* less than or approximately equal to 1% by weight. In particular, the relationship between chain length (e.g., expressed as the weight averaged molecular weight) and c* can be determined from references identifiable by a skilled person or determined by calculations as described herein.

In particular, for a non-associative polymer chain, the overlap concentration is given by:

$$c^* = \frac{3M_w}{4\pi(R_g^2)^{3/2}\ N_a},$$

wherein $M_w$ is the weight averaged molecular weight, $R_g$ is the radius of gyration, and $N_a$ is Avogadro's constant. The overlap concentration represents a concentration equal to one polymer molecule per spherical volume of radius $R_g$, as illustrated for example in the exemplary schematic of FIG. 17. Throughout this disclosure, reference is made to c* when describing the concentration of associative polymer required to achieve each type of desired chemical or physical property. Generally the pairings of polymer and host represent good solvent (e.g. a solvent in which the polymer-solvent interactions are more thermodynamically favorable than polymer-polymer interactions; see e.g. [Ref 5]) conditions for the polymer backbone. In good solvent conditions, $R_g$ increases approximately as the ⅔ power of $M_w$, so the expression for c* above shows that c* decreases as $M_w$ increases. For a specific choice of polymer backbone and host liquid, c* scales approximately as $1/M_w$. For example, doubling the length of the polymer backbone approximately reduces by half the concentration of associative polymer required to achieve a given effect.

In several exemplary embodiments, many polymers' data relating $R_g$ to $M_w$ are available for commonly used solvents [Ref 6]. When experimental values are not available, an indicative estimate can be made using a theoretical chain model as herein described. For example, the estimate of $R_g$ using the ideal chain model provides a conservative estimate c *of the concentration of polymer required to achieve a desired effect. A skilled person will realize upon a reading of the present disclosure that the polymer backbone is in a good solvent condition when dissolved in the host, so the actual c* of the polymer in the host can be less than the value of c* estimated using the ideal chain model.

For the purpose of selecting the degree of polymerization to use for the span of the polymer (which is the backbone length in the simple case of a linear telechelic structure), an equivalent expression can be written that refers to tabulated parameters, including e.g. parameters available for many polymers. In particular, tabulated values of the characteristic ratio, $c_\infty$ and the length and equivalent mass of a "Kuhn segment" (b and $M_o$) can be used to estimate the chain length that will confer a desired effect with a selected concentration. For example, for mist control, the polymer can be present at its overlap concentration. In applications in which a polymer concentration is desired to be at most $c_{max}$, a chain can be used that has sufficiently many Kuhn segments, N, so that the polymer begins to overlap when its concentration is approximately $cm_{max}$ or less. Such chain can be given by:

$$N^{3/2} = \frac{9\sqrt{6}}{2\pi b^3 c_{max}}$$

where N is the number of Kuhn segments and corresponds to a linear polymer (or span of a branched polymer) having molar mass $NM_0$, where $M_0$ is the mass per Kuhn segment. Therefore, one can synthesize for example a polymer that has a span of molar mass $NM_0$ (and functional groups, selected with guidance below) and introduce the synthesized polymer to a composition at a concentration c* to provide mist control. A skilled person will realize that when using approximate expressions for c*, mist control is expected to improve by increasing or decreasing the concentration relative to the estimated value of c*. In particular, in experiments that examine the extent of mist control with associative polymer, concentrations of associative polymer of 0.5 c* and 2 c* can be suitable. Similar reasoning can be applied for other effects herein described as will be understood by a skilled person.

A list of exemplary tabulated parameters is indicated below (Table 6; [Ref 7], p. 53):

TABLE 6

Characteristic ratios, Kuhn lenghts, and molar masses of Kuhn monomers for common polymers at 413K

| Polymer | Structure | $C_\infty$ | b (Å) | ρ (g cm$^{-3}$) | $M_0$ (g mol$^{-1}$) |
|---|---|---|---|---|---|
| 1,4-Polyisoprene (PI) | —($CH_2CH{=}CHCH(CH_3)$)— | 4.6 | 8.2 | 0.830 | 113 |
| 1,4-Polybutadiene (PB) | —($CH_2CH{=}CHCH_2$)— | 5.3 | 9.6 | 0.826 | 105 |
| Polypropylene (PP) | —($CH_2CH2(CH_3)$)— | 5.9 | 11 | 0.791 | 180 |
| Poly(ethylene oxide) (PEO) | —($CH_2CH_2O$)— | 6.7 | 11 | 1.064 | 137 |
| Poly(dimethyl siloxane) (PDMS) | —($OSi(CH_3)_2$)— | 6.8 | 13 | 0.895 | 381 |
| Polyethylene (PE) | —($CH_2CH_2$)— | 7.4 | 14 | 0.784 | 150 |

TABLE 6-continued

Characteristic ratios, Kuhn lenghts, and molar masses of Kuhn monomers for common polymers at 413K

| Polymer | Structure | $C_\infty$ | b (Å) | ρ (g $cm^{-3}$) | $M_0$ (g $mol^{-1}$) |
|---|---|---|---|---|---|
| Poly(methyl methacrylate) (PMMA) | —$(CH_2C(CH_3)(COOCH_3))$— | 9.0 | 17 | 1.13 | 655 |
| Atactic polystyrene (PS) | —$(CH_2CHC_6H_5)$— | 9.5 | 18 | 0.969 | 720 |

In addition, a skilled person can also identify the relationship between chain length and c* by experimental measurement, e.g. by measuring the shear viscosity of the host composition including the non-associative form of the polymer as a function of the concentration of the polymer.

In particular, the overlap concentration of the backbone can be determined from conventional shear viscosity measurements of solutions containing various concentrations of the non-associative form of the polymer. Alternatively, it can be evaluated using the weight average molecular weight of the longest span of the polymer, which is often characterized as part of the synthesis and purification of a synthetic polymer.

Figure 38:
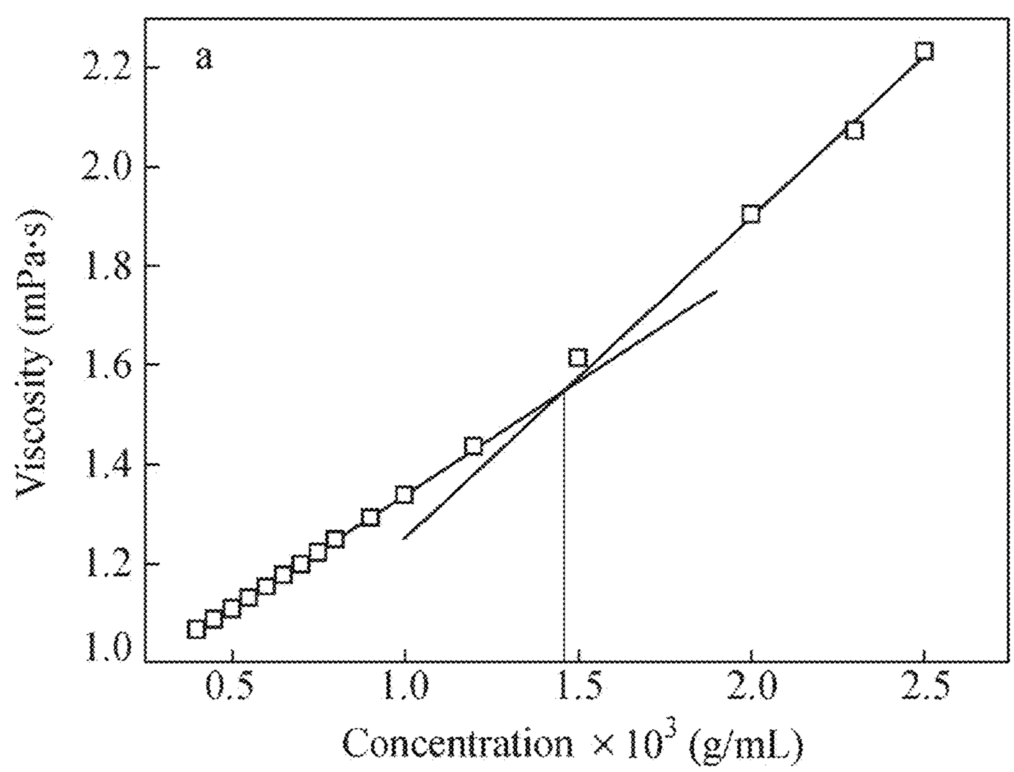
FIG. 38 shows a plot of the viscosities of a non-associative polymer in an appropriate host at varying concentrations using a rheometer wherein at c* a deviation from linearity is observed in the plot of viscosity versus polymer concentration. Linear regression is performed on the data from both dilute and concentrated regimes, and the crossover of the two linear fits represents the overlap concentration, c*.

In particular, c* can be determined at a given temperature by measuring the viscosities of a non-associative polymer in an appropriate host at varying concentrations using a rheometer wherein at c* a deviation from linearity is observed in the plot of viscosity versus polymer concentration. Linear regression is performed on the data from both dilute and concentrated regimes, and the crossover of the two linear fits represents the overlap concentration, c* (see, e.g. [Ref 7, 8] and FIG. 38).

In particular, in some embodiments, a way to identify a "desired overlap concentration" is to consider the type of beneficial effect that is needed. For example, for a desired effect of mist control, a concentration of polymer can be used that is approximately equal to the overlap concentration. For example a concentration range suitable for mist control can be between 0.5 c* to 2 c *. In embodiments in which a desired effect is enhancing fuel efficiency, a polymer concentration can be used in the non-polar compositions herein described that is less than c*, and in particular can be between 0.1 c* and 0.5 c*. In embodiments in which the desired effects are drag reduction and enhanced lubrication, a polymer concentration can be a concentration below or approximately equal c*, and in particular can be between 0.05 c* to c*. In embodiments in which a desired effect is converting a liquid into a gel, a concentration greater than c* can be provided and in particular a concentration from 2 c* to 10 c*.

Selection of one or more specific associative polymers that can be comprised within the composition at a concentration relative to the c* selected to control a set of one or more chemical and/or physical properties can be performed in view of the characteristics of functional groups, chain structures, and weight average molecular weight of associative polymers herein described.

In some embodiments, the functional groups described herein at the ends of the backbone of the associative polymer can be selected to ensure association occurs with the range of the polymer concentrations selected. In conjunction with the selection of functional groups, the synthetic chemistry is selected to be appropriate for introduction of such groups.

A skilled person will realize that characteristics of the host that influence the selection of functional groups include, for example, its dielectric constant and whether or not it contains protic species or species that offer a lone pair of electrons. Non-polar liquids generally contain molecules made mainly of atoms with similar electronegativities, such as carbon and hydrogen (for example, hydrocarbons that dominate fuels and many lubricants). Bonds between atoms with similar electronegativities lack partial charges, making the molecules non-polar. A common way of quantifying this polarity is the dielectric constant. A skilled person will also realize that another characteristic of components in the host liquid is whether or not they have O—H or N—H bonds that can participate in hydrogen bonding. A skilled person would recognize these as protic molecules. Examples of protic species that may be present in host liquids in the disclosed ranges of dielectric constants include, for example secondary amines with substantial hydrocarbon content (e.g., Diisobutylamine, which has dielectric constant 2.7; dipropylamine, which has dielectric constant 2.9; Methylbenzylamine, which has dielectric constant 4.4), carboxylic acids with substantial hydrocarbon content (e.g., palmitic acid, which has dielectric constant 2.3; linoleic acid, which has dielectric constant 2.6; oleic acid, which has dielectric constant 2.5), and alcohols with substantial hydrocarbon content (e.g., hexadecanol, which has dielectric constant 3.8). In addition, a skilled person will also realize that other protic species (e.g., protic species that in their pure state can have a dielectric constant greater than 5, such as aniline and phenol) can be present as minor species in a host liquid that has dielectric constant less than 5.

A skilled person will realize that another relevant characteristic of components in the host liquid is whether or not they present a lone pair of electrons that can participate in hydrogen bonding. Examples of species with lone pairs that may be present in host liquids in the disclosed ranges of dielectric constants include alkyl-quinoxalines (e.g., 2,3-Dimethylquinoxaline, which has dielectric constant 2.3), tertiary amines (e.g., triethylamine, which has dielectric constant 2.4) and nonconjugated esters (e.g., isoamylvalerate, which has dielectric constant 3.6). In addition, a skilled person will also realize that other lone-pair species (that in their pure state might have a dielectric constant greater than 5, such as pyridine and methylethylketone) can be present as minor species in a host liquid that has dielectric constant less than 5. In addition, a skilled person will realize that components that are used as additives when the host liquid is formulated can also be present. For example, metal chelating agents (e.g., N,N-Disalicylidene-1,2-propanediamine) can be present in a host liquid that is a fuel. A skilled person will realize that the presence of these constituents influences the selection of functional groups depending on the presence of protic species or species that offer a lone pair of electrons as described herein.

A skilled person will also realize the presence of protic species can, in some circumstances, interfere with FG association mediated by hydrogen bonding. The skilled person will realize that one way to overcome the interference is to increase the number of hydrogen bond moieties at the chain ends. The skilled person will also realize that another way to overcome the interference is to reduce the concentration of protic species in the host. A skilled person would recognize that these two approaches can be used together. IN addition, a skilled person will also realize that, all other factors being equal, increasing the dielectric constant of the host weakens the interaction (e.g., conventional hydrogen bonds, charge-assisted hydrogen bonds, charge transfer interaction, metal-ligand interactions). For example, increasing the dielectric from 2.4 (toluene) to 4.8 (chloroform) decreases the association constant for the Hamilton-receptor and cyanuric acid by an order of magnitude. Accordingly, FGs that provide a stronger association (e.g., charge assisted hydrogen bonding or a metal-ligand interaction) are expected to be beneficial when the dielectric constant is greater than 2.5. A skilled person would realize that the selection of FGs that provide strong association can be used together with increasing the number of associative groups at the chain ends and with reducing the concentration of host components that have high dielectric constants.

In particular, in some embodiments, the value of the concentration of the associative polymer relative to overlap concentration c* can be governed by the selection of chain-host pair and can be insensitive to the specific choice of FG. A skilled person will understand that the overlap concentration can vary with temperature, in a manner that is particular to a specific chain-host pair. For example, the selection of polymer backbone and host governs the solvent quality; and, for a given solvent quality, the degree of polymerization is chosen to adjust c* once the chain-host pair is selected. In this connection selecting a greater degree of polymerization, provides a greater $R_g$ and, consequently, a reduced c * as will be understood by a skilled person.

Figure 16:
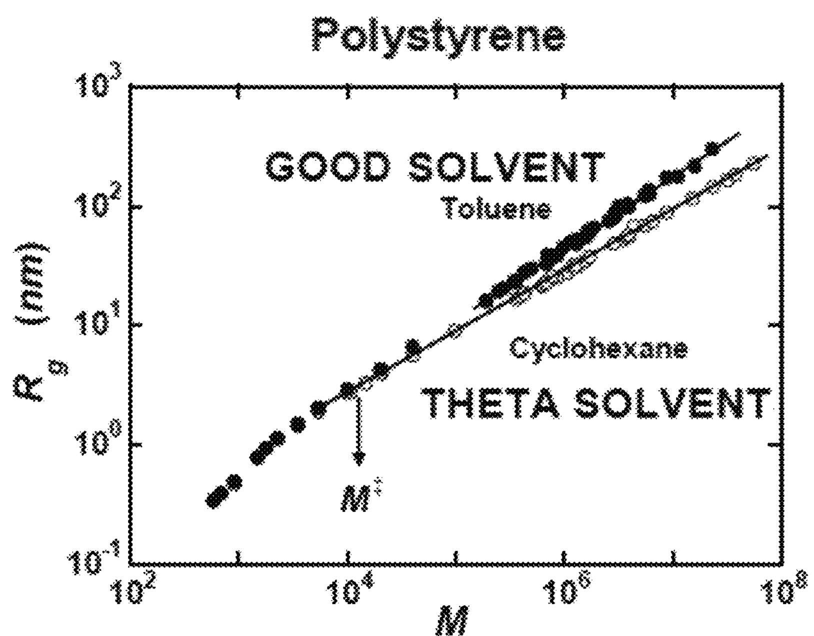
FIG. 16 shows is a diagram illustrating the radius of gyration of an exemplary backbone polymer (polystyrene) as a function of its weight-average molecular weight ($M_w$ in g/mol) in a representative theta solvent (cyclohexane) and in a representative good solvent (toluene). In particular.

In some embodiments herein described, the chain structure between the nodes (e.g. the chain being a polyolefin, polydiene, or other structure identifiable to a skilled person upon a reading of the present disclosure) can be chosen such that it interacts favorably with the host, the state of the backbone can be estimated using good solvent (e.g. a solvent in which the polymer-solvent interactions are more thermodynamically favorable than polymer-polymer interactions; see e.g. [Ref 5]) scaling for its pervaded volume. Over most of the molar mass range of interest, the ideal chain approximation (e.g. approximation of the polymer chain as a random walk and neglecting any kind of interactions among monomers; see e.g. [Ref 7]) can also be useful: it provides a lower bound on $R_g$ that is usually within a factor of 2 of the good solvent chain dimensions, as shown in FIG. 16 for the case of polystyrene for a good solvent such as toluene, and a theta solvent (e.g. a solvent in which the polymer-solvent interactions are approximately as equally thermodynamically favorable as polymer-polymer interactions; see e.g. [Ref 5]) such as cyclohexane. In particular, the value of the radius of gyration can be used to estimate the concentration at which polymer molecules would begin to overlap one another: the overlap concentration c* corresponds to the value that gives approximately one polymer molecular per $R_g$^3.

Additional factors related to applications of the resulting compositions (e.g. distribution through a pipeline, storage for a certain time period and other factors identifiable by a skilled person), can also be taken into account in the selection of the specific associative polymer or combination thereof and/or in the selection of the related concentration in the host composition relative to c* within a range associated to control of one or more chemical and/or physical properties.

In embodiments in which a low concentration of polymer is desired, a reduction in the concentration of the associative polymer relative to c* can be obtained by selecting a polymer with high degree of polymerization. In some of those embodiments, the degree of polymerization of the polymer is low enough that the polymers do not degrade during necessary handling. For example, in embodiments in which the non-polar compositions are fuel or other liquid and the liquid is intended to travel through a distribution system, minimization of the degradation of the polymer upon passage through pumps and filters, and/or minimization of degradation during turbulent flow in transport pipelines or hoses can be desirable. In this connection, in exemplary embodiments in which the polymers comprise linear chains, keeping the weight-average molar mass below 1,000,000 g/mol can give adequate stability with respect to shear degradation. In exemplary embodiments in which the polymer comprises lightly branched molecules, having node-chain-node segments that are individually greater than 10,000 g/mol, the longest span of the molecule can be kept below the threshold for shear degradation (typically less than 1,000,000 g/mol).

In embodiments wherein conversion of liquid to gel is desired, a solution or gel that has dielectric constant less than 5 and comprises a polymer that has weight average molar mass between 100,000 g/mol and 1,000,000 g/mol, can comprise the polymer at a concentration that is between 0.1 c* and 10 c*. The specific concentration can be determined based on the measured length and backbone composition of the polymer, and the polymer molecules manifestly associate with one another as evidenced by shear viscosity that is anomalously enhanced relative to a non-associative polymer of the same molar mass and backbone structure or by light scattering showing structures that are much larger than a non-associative polymer of the same molar mass and backbone structure. The latter measurements can be performed for example by removing the polymer from the composition and reconstituting them in a solvent that has a dielectric constant that is close to that of the composition (plus or minus 20%) at a concentration of c* based on the weight-average molar mass determined by GPC equipped with light scattering.

In embodiments in which the composition comprise liquid fuels, such as gasolines, diesel fuels, kerosene and jet fuels, such compositions can comprise polymers with molar mass between 100,000 g/mol and 1,000,000 g/mol having backbones that, as bulk polymers, have dielectric constant less than 3 and are present in the composition at a concentration that is between 0.1 c* and 10 c*, based on the measured weight averaged molar mass and backbone composition of the polymer, and the polymer molecules manifestly associate with one another as evidenced by shear viscosity that is enhanced relative to a non-associative polymer of the same molar mass and backbone structure or by light scattering showing structures that are much larger than a non-associative polymer of the same molar mass and backbone structure. The latter measurements can be performed for example by removing the polymer from the composition and reconstituting them in toluene at a concentration of c* based on the weight-average molar mass determined by GPC equipped with light scattering. In several examples of the current disclosure toluene is indicated as a reference host because it has a dielectric constant of approximately 2.2, which is at the upper range of diverse fuels and, therefore, gives a conservative diagnostic of association. That is, a polymer that forms intermolecular associations in toluene will form intermolecular associations in gasoline, diesel, kerosene and jet fuel, among others.

In some embodiments, polymer for improving fuel efficiency can be effective at 10000 ppm or less with weight average molecular weight below 1,000,000 g/mol, possibly after more than 10 passages of the fuel through a fuel pump. In some embodiments, associative polymers can remain uniformly dissolved for at least 2 weeks or even months even at −30° C.

In some embodiments, with weight average molecular weight 400,000 g/mol chains, droplet behavior of non-polar composition comprising associative polymers herein described is expected to match 4,200,000 g/mol (weight average) polyisobutylene, a commonly used standard material to achieve mist control effect using high molecular weight polymer, compared at the same, concentration of 0.3%.

In some embodiments, if for a particular application the polymer concentration is desired to be kept low, this can be achieved by increasing the length of the polymer chain between associative groups. The reason for this is that polymers tend to adopt compact conformations in isolated clusters when the concentration is far below their overlap concentration; increasing the length of the polymer between associative groups decreases the overlap concentration, thereby allowing desired properties to be achieved with a lower concentration of polymer.

In some embodiments, if for a particular application the polymer additive is desired to survive passage through pumps and turbulent pipe flow, this can be achieved by keeping the length of the polymer below the threshold at which chain scission occurs in intense flows. For a number of polymers, the literature provides values of the chain length above which chains scission occurs (e.g. polyisobutylene) For any choice of polymer backbone structure, the threshold length (or equivalently, degree of polymerization or molar mass) above which chain scission occurs upon passage through pumps or turbulent pipe flow can be determined as will be understood by a skilled person.

In some embodiments, for the purpose of creating additives that deliver valuable effects at low polymer concentration, use of chain segments having molar mass between 100,000 g/mol and 500,000 g/mol between FG and node can be desired. This range of structures can associate at low concentrations to give desired properties. For example, in the context of fuels, the resulting polymers can inhibit misting in order to reduce the risk of post-crash fires; can control atomization to increase fuel efficiency and/or reduce emissions; can confer drag reduction that reduces pumping costs and improves throughput through existing pipelines; and improve lubrication. In particular, polymers of the present disclosure can survive prolonged, severe shear with little degradation; the polymers do not interfere with filtering fuel; the polymers do not interfere with dewatering fuel.

According to the above indication and to the additional indication provided in the disclosure, in some embodiments, one skilled in the art can identify whether or not a host of interest (e.g., a particular lubricant oil) is suitable for application of the associative polymers based on the dielectric constant of the host, and the skilled person can identify suitable monomer structures using knowledge of the dielectric constant or solubility parameter of the resulting polymer, and thus select the degree of polymerization (e.g. by synthesizing a polymer backbone of a particular weight-averaged molecular weight) to achieve a desired c *.

In some embodiments herein described once the suitability of a potential host is determined, as well as the selection of the monomer and the selection of the degree of polymerization are made, functional groups can be selected that are able to associate according to the indicated association constant. In particular, in some embodiments when the host has a relatively low dielectric constant (e.g. $\epsilon<2$) and little or no participation in hydrogen bonds, there are many associative groups that are effective as will be understood by a skilled person. Therefore, secondary considerations can be applied to narrow down the selection (such as cost, sensitivity to ionic species, nature of combustion products, and other considerations identifiable to a skilled person). For example, in some instances, with increasing dielectric constant of the host, many of the useful interactions (hydrogen bonding, charge transfer, acid-base, and others identifiable to a skilled person) become progressively weaker. Therefore, clusters of functional groups may be required to confer adequate association. Consequently, for solvents that have dielectric constant greater than 2.5, dendrimeric FG can be used that include multiple associative groups (examples are shown for FG that each present four or eight copies of a chosen associative group).

For example, if drag reduction (e.g. the flow resistance of a non-polar composition through a conduit such as an oil pipeline or fuel line in a vehicle) is the property sought to be controlled, a skilled person can identify the solubility parameter of the fluid, and then can identify polymer backbones that are substantially soluble in the fluid (e.g. by comparing the solubility parameters and/or using the solubility parameters to determine the Flory-Huggins interaction parameter as described herein). The selection of particular polymers for the backbone of the associative polymer suitable to be included at a concentration relative to c* below c* can be further refined based on, for example, on the cost of the polymers, or the ease and/or expense of the polymerization chemistry, as would be identifiable to a skilled person.

In particular, for drag reduction, a skilled person would realize it is desirable to minimize the amount of polymer used for two reasons: to minimize cost and to avoid undue increase in the shear viscosity of the mixture. Accordingly, the length (expressed as the weight-averaged molecular weight) of the backbone of the associative polymer can be near the threshold imposed by shear degradation, which a skilled person would understand to be in the range of approximately 500,000 g/mol for hydrocarbon polymers such as polyisobutylene, polybutadiene, polyolefins, and others identifiable to a skilled person.

In particular, a skilled person can verify that the chain length selected resists shear degradation by performing analyses known to the skilled person. For example, the viscosity of a non-polar composition comprising the associative polymers described herein can be measured before and after recirculation through a conduit (e.g. by using a fuel pump to recirculate a sample of the non-polar composition) and determining if there is a difference in viscosity between the two time points (e.g., if the viscosity decreases after recirculation, the associative polymer can be considered to have undergone shear degradation).

As another example, if mist control is the property of the nonpolar composition desired to be controlled, the polymer backbone selection among the possible polymers to be included at a concentration relative to c* between 0.5 c* to 2 c* can be based on solubility of the in nonpolar composition as described herein (e.g. solubility parameters and/or Flory-Huggins interaction parameter), with the additional consideration of the associative polymer having negligible effect on the calorific value of the nonpolar composition in which mist control is desired, as would be identifiable to a skilled person (e.g. by using the calorimetric method ASTM D240-09). The functional groups described herein at the ends of the backbone of the associative polymer can be chosen to ensure that association occurs at desired concentration such that heteroatom content is so low as to not affect burning. For example, association can be measured using titration techniques identifiable to a skilled person (see, e.g., [Ref 9]). Using the titration methods, the skilled person can identify a concentration at which the particular associative polymers (with a given number of end groups containing heteroatoms) associate; if the concentration is suitable based on c * considerations (e.g. the particular concentration of the associative polymer relative to c * to control a particular property such as mist control) the skilled person can then measure the calorific value using ASTM D240-09. If the concentration is not suitable, the number of end groups can be changed accordingly (e.g. by increasing the number for greater association at a given concentration, or by decreasing the number for lesser association), the titration re-performed, and the calorific value re-measured.

In various embodiments, associative polymers herein described can be made with methods in which a backbone polymer is provided which is then functionalized with suitable FGs.

In some embodiments, in which the backbone has a structural unit of formula node chain] (II), wherein chain is a non-polar polymer substantially soluble in a non-polar composition, the polymer having formula $$R_1\text{-}[A]_nR_2$$

in which

A is an organic moiety;

$R_1$ and $R_2$ are independently selected from any carbon based or organic group; and n is an integer≥1; and node is a chemical moiety covalently linking one of $R_1$ and $R_2$ of at least one first chain with one of the $R_1$ and $R_2$ of at least one second chain;

and wherein the chain and node of different structural units of the polymer can be the same or different and the polymer presents two or more terminal $R_1$ and $R_2$ groups the method can comprise: providing the polymer having structural unit of formula node chain] (II) and attaching functional groups FG herein described to terminal $R_1$ and/or $R_2$ groups of the polymer.

In some embodiments, an associative polymer can be provided by forming a polymer chain through a method of polymerization of a suitable monomer such as those described in "Polymer Handbook", $4^{th}$ edition; Brandrup, J.; Immergut, Edmund H.; Grulke, Eric A.; Abe, Akihiro; Bloch, Daniel R. (eds.), J. Wiley and Sons (New York), 1999) so that the desired architecture (linear, branched, star, and other architectures identifiable to a skilled person) is generated and individual polymer chains are substantially terminated by chemical groups that are amenable to functionalization. The end groups can already be functionalized by FGs or formed by precursors that are converted to FGs (e.g., by deprotection or functional groups that are suitable for covalent attachment of FGs). This prepolymer can then be reacted with a molecule containing the desired FG, so that FGs are introduced to the polymer chain through chemical transformations commonly described as functional group interconversions. Thus, in some embodiments the desired polymer composition can be achieved in a two-step process, in which after the first step reaction of the monomer gives a polymer that does not substantially include the desired FG or FGs, which are introduced in the second step. For example, the prepolymer may be synthesized as substantially terminated with functional groups known in the art to be "leaving groups" such as halide, triflate or tosylate, and the desired FG or FGs introduced to the polymer chain through nucleophilic substitution reaction.

In some embodiments, suitable monomers comprise dienes, olefins, styrene, acrylonitrile, methyl methacrylate, vinyl acetate, dichlorodimethylsilane, tetrafluoroethylene, acids, esters, amides, amines, glycidyl ethers, isocyanates, and mixtures of these.

The association polymers described herein can be synthesized by methods known to a skilled person. For example, the backbone can be synthesized by Ring-Opening Metathesis Polymerization (ROMP) chemistry and functionalized at the ends of the backbone using appropriate chain transfer agents (see, e.g., Examples section herein and [Ref 10]). In addition, anionic polymerization, Atom-transfer Radical-Polymerization (ATRP), Reversible Addition-Fragmentation chain Transfer polymerization (RAFT) and other polymerization techniques identifiable to a skilled person (including an alternative overview of metathesis techniques) can be used to synthesize several types of backbones (e.g. block, star, branched and other architectures) and introduce of many different types of functional groups at the ends of the polymer chain (or elsewhere if desired) (see, e.g. [Ref 11, 12]).

In certain embodiments, an associative polymer in accordance with the present disclosure can be provided by forming a polymer chain such that the desired architecture is generated, and individual polymer chains are substantially terminated by the desired FG, in situ. Thus, in some embodiments the desired polymer composition can be achieved in a single step process, and reaction of the monomer affords a polymer that includes the desired FG or FGs. In yet other embodiments, the desired FGs can be introduced to the polymer chain in a form such that the ultimate function of such FGs is masked by a chemical substitution (e.g. the FGs feature one or more "protecting groups"), and the desired functionality of the FGs can then be enabled for example through removal of such a "protecting group" through chemical transformation in subsequent steps. However, in some embodiments, the desired polymer composition can still be achieved in a single step process, and the polymer as synthesized includes the desired FG or FGs in protected form. In some of those embodiments, suitable monomers include cyclic olefins and acyclic α,ω-dienes.

Suitable methods of polymerization in accordance with some embodiments herein described, comprise ring-opening metathesis polymerization (ROMP) and acyclic diene metathesis polymerization (ADMET), in the presence of suitable chain transfer agent (CTA) typically consisting of the FG suitably disposed about a reactive olefinic functionality (e.g. cis-double bond). The FG or FGs can be in their ultimate functional form in this CTA, or can be in "protected" form such that unmasking of the ultimate functional form may be achieved through removal of this "protecting group" through chemical transformation.

Suitable "protecting groups" in accordance with some embodiments herein described, comprise those described in "Greene's Protective Groups in Organic Synthesis, $4^{th}$ edition"; Wuts P. G. M. and Green, T. W., J. Wiley and Sons (New York), 2006.

For example, in some embodiments where the polymer backbone is made by a ROMP polymerization (e.g. using cyclooctadiene to synthesize a backbone of repeating $=CHCH_2CH_2CH=CHCH_2CH_2CH=$ units), the ends of the polymer backbone can be functionalized with appropriate chain transfer agents to provide functionalized ends of the backbone which can be further transformed to provide functional groups capable of being corresponding functional groups, as shown for example in Examples 1-3 where carboxylic acid functional groups are installed. A skilled person will realize upon a reading of the present disclosure that analogous reactions can be performed to synthesize other backbones such as poly(vinylacetate) (e.g. RAFT polymerization as shown, for example in [Ref 13] ; or free radical polymerization of vinyl acetate using a free radical initiator comprising FG groups as shown, for example, in [Ref 14]).

In particular, as exemplified in Example 3, chain transfer agents can be used to attach moieties substituted with chloro groups, which can then be displaced with azide groups (e.g. using trimethylsilyl (TMS) azide by methods identifiable to a skilled person). A moiety comprising attached alkyne groups can then be reacted with the azide groups via reactions such as the azide-alkyne Huisgen cycloaddition (e.g. click reaction) to attach the moiety to thereby attach the FG to the backbone (see, e.g. Example 3).

In yet further embodiments, an associative polymer in accordance with the present disclosure can be provided by metathesis applied to a high molecular weight ($M_w$> 5,000,000 g/mol) poly(diene) such as poly(butadiene) in the presence of suitable CTA and metathesis catalyst to give a shorter poly(diene) substantially terminated by FG, with the diene:CTA ratio chosen to afford the desired molecular weight for the product telechelic polymer. In particular methods of these particular embodiments, the starting high molecular weight poly(diene) can be linear and substantially free of 1,2-vinyl groups in the polymer backbone.

Figure 10:
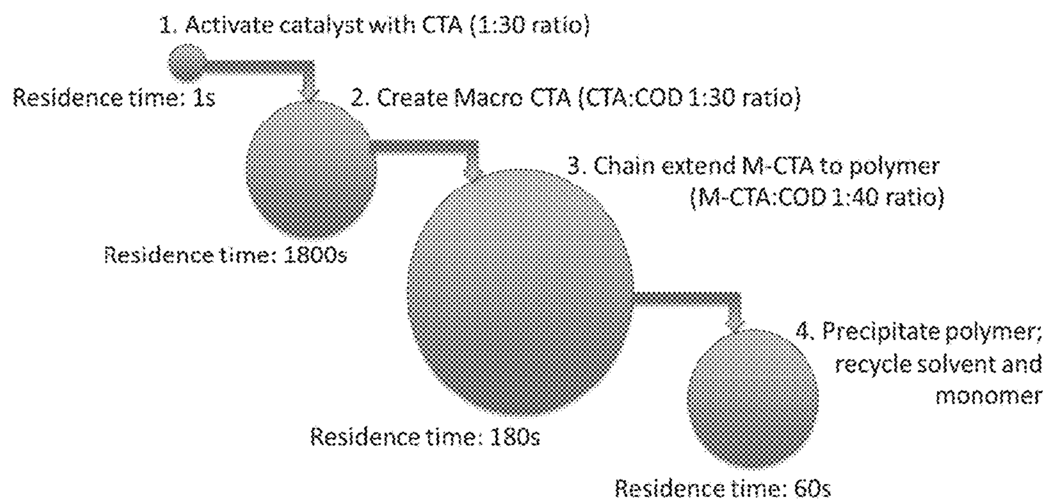
FIG. 10 shows a schematic representation of an exemplary method to produce associative polymers herein described using chain transfer agents according to embodiments herein described.

In exemplary methods to make a polymer of the present disclosure, the polymer can be made by ROMP in a continuous process. In particular, methods of these particular embodiments the continuous process can use reactions in series (FIG. 10). In relation to compositions that are used as liquid fuels the continuous production of the associative polymers herein described can be performed near or inside a petrochemical refinery and incorporated into a product continuously.

In exemplary methods to make a polymer of the present disclosure, the polymer can be made by ring-opening metathesis polymerization (ROMP) to obtain desired end-functional telechelic polymers of weight averaged molecular weight 100,000 to 1,000,000 g/mol.

In exemplary methods to make a polymer of the present disclosure, the polymer can be made by related polymerization and/or functionalization methods to make functional telechelics of molecular weight 100,000 to 1,000,000 g/mol.

In various embodiments, associative polymers herein described can be used in methods and systems to control physical and/or chemical properties of a non-polar composition herein described.

In particular in some embodiments, in which associative polymers herein described are resistant to shear degradation (e.g. chain scission upon passage through pumps, during prolonged turbulent flow in pipelines, tubes or hoses, during passage through filters), the associative polymer of the present disclosure can be introduced at early steps in the preparation of non-polar host compositions. In many applications the host composition can be itself a mixture.

In particular in exemplary embodiments in which a modified non polar composition comprising associative polymers herein described is provided in connection with production of inks or paints that can comprise a carrier liquid, pigments, stabilizers and other components, the associative polymer can be added to the carrier liquid prior to incorporation of the remaining components, with the possibility that a central depot of carrier liquid can feed production lines for diverse colors or grades of ink or paint. In some of these embodiments, the efficacy of the polymer can be retained after pumping, filtering, mixing and other processing steps.

Similarly, in exemplary embodiments in which a modified non polar composition comprising associative polymers herein described is provided in connection with lubricant applications, the associative polymers herein described can be incorporated into the base oil that is subsequently combined with diverse additive packages. At concentrations up to c*, the associative polymers are expected to survive and are expected to not interfere with processes that include but are not limited to filtering, dewatering, pumping and mixing operations.

In exemplary embodiments in which a modified non polar composition comprising associative polymers herein described is provided in connection with fuel applications (e.g. use as drag reducing agents, enhancers of fuel efficiency, emission reducing agents, or mist control agents), the ability to incorporate the associative polymer herein described at any point along the distribution system allows for example incorporation at the refinery; or in the intake line of a storage tank; or in the intake line of a tanker ship, railway tank car, tank of a tanker truck; or in the intake line to a major site of use, such as an airport or a military depot; or in the transfer line from a storage tank into a vehicle; or as a solution added to the tank of a vehicle at the time of fueling.

In exemplary embodiments in which a modified non polar composition comprising associative polymers herein described is provided in connection with drag reducing agents in the transport of petrochemicals (especially crude oil) through very long pipelines, the present polymers resist shear degradation upon passage through pumps; therefore, fewer injection stations are required. In some cases, introduction of the associative polymer at a single location prior to the intake of the pipeline will provide drag reduction throughout the entire length of the pipeline.

In some embodiments herein described associative polymers are not interfacial agents, so that such polymers can be added prior to dewatering operations (including but not limited to fuel handling) and defoaming operations (including but not limited to production of paints and inks); at concentrations up to c*, the associative polymers do not interfere with these essential processing steps and the processing steps have a minimal effect on the associative polymers.

In some embodiments, associative polymers herein described can be used as a fuel additive with one or more of the following features: i) effective at low concentrations (acceptable viscosity), ii) introduced at the refinery; iii) resistant to non-intentional degradation; iv) soluble over wide temperature range (−50° C. to 50° C.); v) permit dewatering and filtering, vi) permit optimization in engine combustion chamber; vii) clean burning, and viii) affordable.

As disclosed herein, the associative polymers and non-polar composition herein described can be provided as a part of systems to control physical and/or chemical properties herein described, including any of the methods described herein. The systems can be provided in the form of kits of parts.

In a kit of parts, polymers (e.g. backbone polymers, associative polymers or precursor thereof), compositions and other reagents to perform the methods can be comprised in the kit independently. One or more polymers, precursors, compositions and other reagents can be included in one or more compositions alone or in mixtures identifiable by a skilled person. Each of the one or more polymers, precursors, compositions and other reagents can be in a composition alone or together with a suitable vehicle.

Additional reagents can include molecules suitable to enhance reactions (e.g. association of one or more associative polymers herein described with a related host composition) according to any embodiments herein described and/or molecules standards and/or equipment to facilitate or regulate the reaction (e.g. introduction of the associative polymer to the host).

In particular, the components of the kit can be provided, with suitable instructions and other necessary reagents, in order to perform the methods here described. The kit can contain the compositions in separate containers. Instructions, for example written or audio instructions, on paper or electronic support such as tapes or CD-ROMs, for carrying out reactions according to embodiments herein described (e.g. introduction of associative polymer in a host composition), can also be included in the kit. The kit can also contain, depending on the particular method used, other packaged reagents and materials.

Further advantages and characteristics of the present disclosure will become more apparent hereinafter from the following detailed disclosure by way of illustration only with reference to an experimental section.

EXAMPLES

The associative polymers, materials, compositions, methods system herein described are further illustrated in the following examples, which are provided by way of illustration and are not intended to be limiting.

In particular, the following examples illustrate exemplary associative polymers and related methods and systems. A person skilled in the art will appreciate the applicability and the necessary modifications to adapt the features described in detail in the present section, to additional associative polymers, compositions, methods and systems according to embodiments of the present disclosure.

Example 1

Exemplary Associative Polymer and Architectures

Exemplary associative polymers and related exemplary architectures are illustrated in FIGS. 3 to 6.

Figure 3:
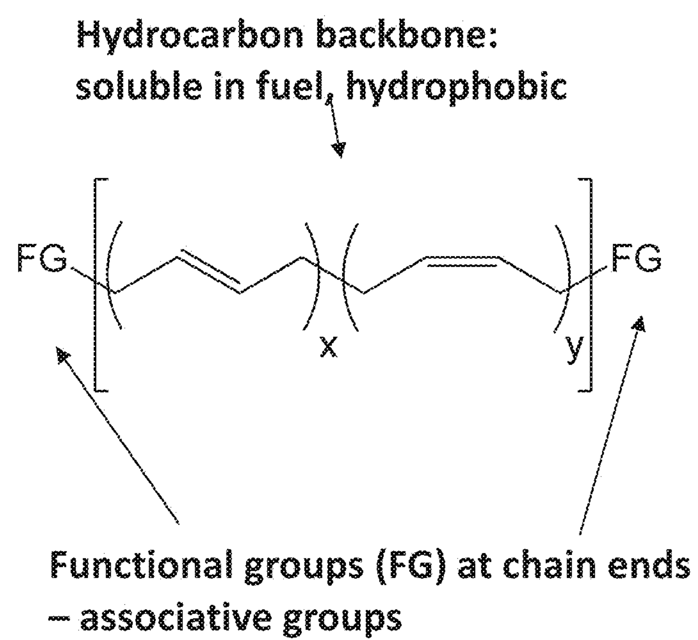
FIG. 3 shows an exemplary associative polymer according to an embodiment herein described. In the illustration of FIG. 3 x and y can be independently selected between any integer≥1.The sum of x and y can be between 1,000 and 10,000.

In particular in the illustration of FIG. 3 a linear polymer backbone of 1,4-polybutadiene is illustrated in which end groups are <1 wt % of the polymer and contain <0.2 wt % heteroatoms. When added to fuel, polymers of this type burn cleanly and maintain the caloric content of the fuel.

Figure 4:
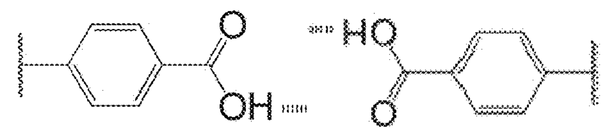
FIG. 4 shows exemplary functional groups and related exemplary associative interactions according to embodiments herein described.
Figure 4:
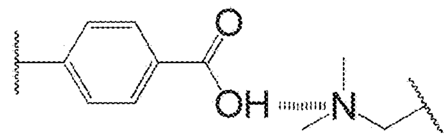
Figure 4:
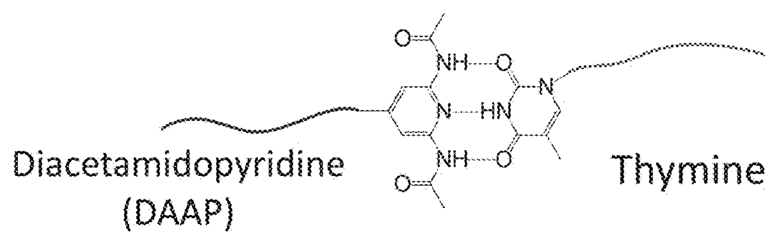
Figure 4:
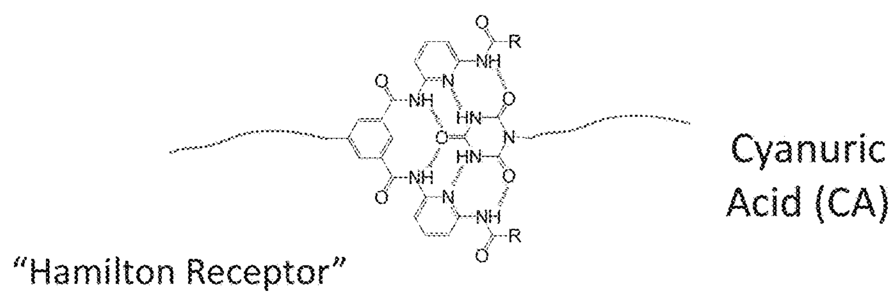
Figure 5:
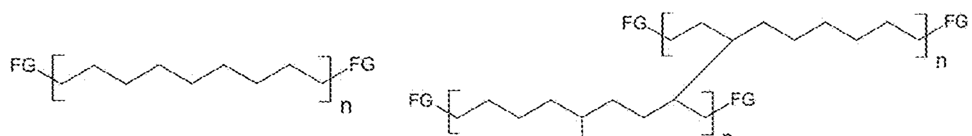
FIG. 5 shows exemplary architectures of associative polymers herein described. In particular in the illustration of FIG. 5, *a, b, c, d, n,* and *e* are independently integers≥1.
Figure 5:
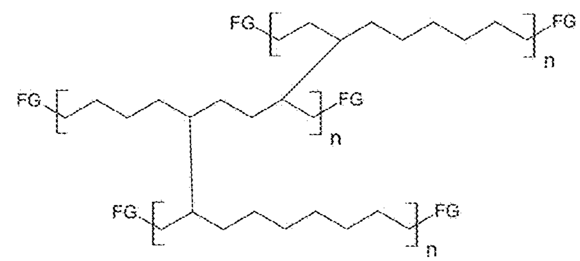
Figure 5:
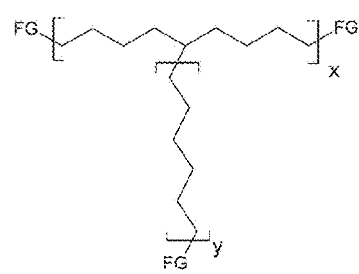
Figure 5:
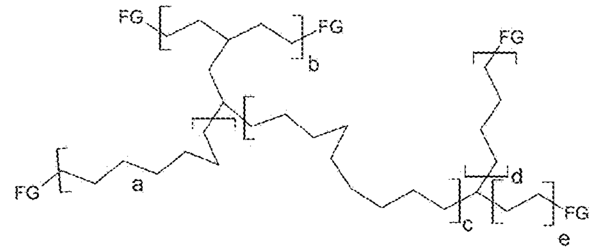
Figure 5:
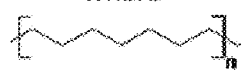
Figure 6:
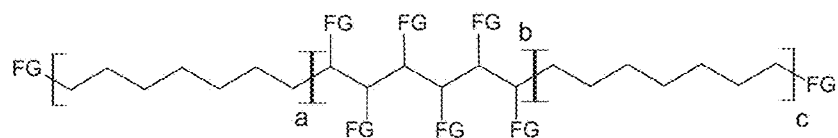
FIG. 6 shows exemplary block architectures of associative polymers herein described and of an exemplary chain or backbone moiety. In particular in the illustration of FIG. 6, *a, b, c, d, n, x,* and *y* are independently integers≥1.
Figure 6:
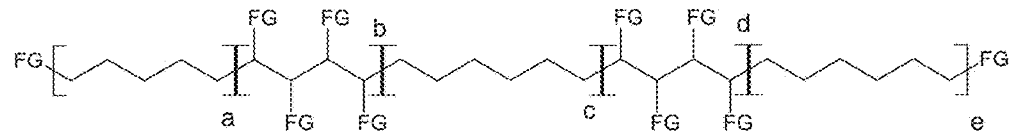

The illustration of FIG. 4 provides exemplary functional groups which can be used with the backbone of FIG. 3 or other backbones as will be understood by a skilled person. The illustration of FIGS. 5 and 6 shows exemplary branched architectures (FIG. 5) and exemplary block-polymer architecture (FIG. 6) which can be created with the backbone of and/or other backbones as will be understood by a skilled person. When the associative polymer is added to a host composition the FGs form physical associations according to their nature (e.g. self to self, donor-acceptor, pairwise, or multidentate). The illustration of FIGS. 1 and 2 show exemplary types of supramolecular structures thus formed.

Example 2

Methods of Making Associative Polymers and Related Architectures

A schematic illustration of exemplary reactions and methods suitable to make associative polymers herein described is provided in FIGS. 7 to 10.

Figure 7:
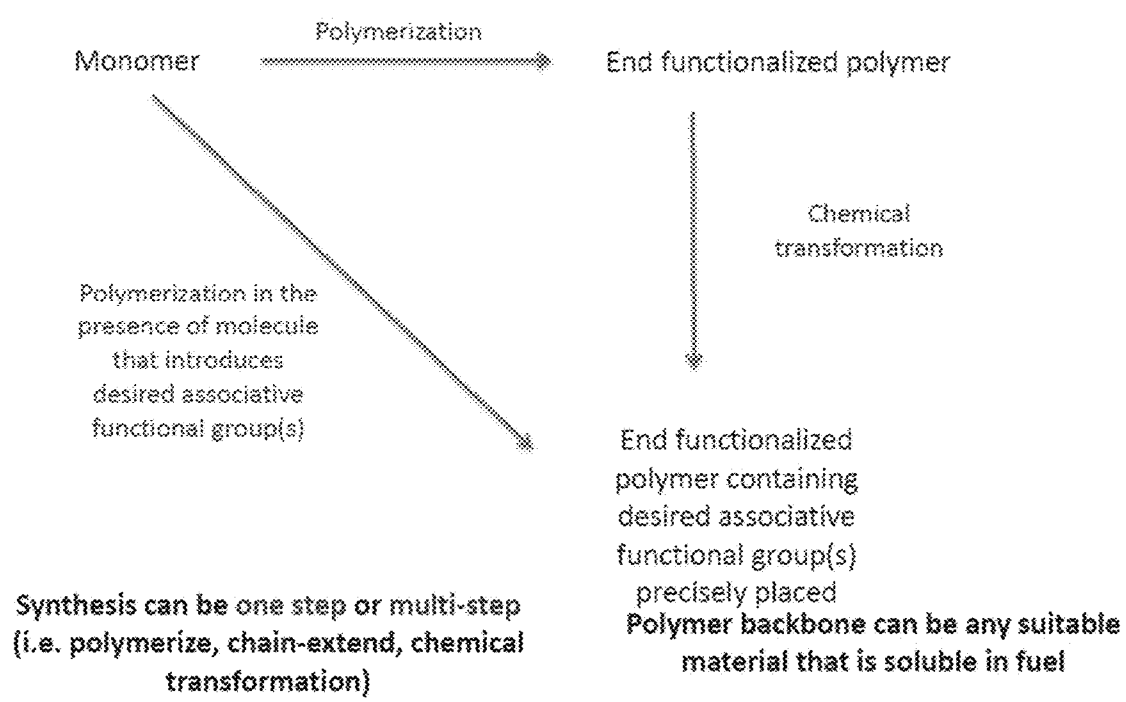
FIG. 7 shows a schematic representation of a method to provide an associative polymer of the disclosure according to embodiments herein described.

In particular FIG. 7 shows a schematic of an exemplary method to provide an associative polymer herein described illustrated making specific reference to embodiments where a corresponding non-polar composition is a fuel.

Figure 8:
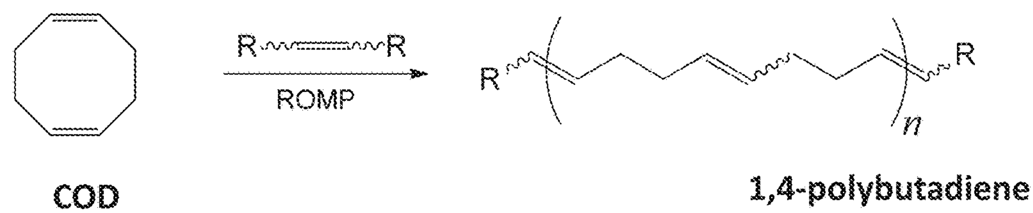
FIG. 8 shows a schematic representation of a reaction suitable to provide an associative polymer of the disclosure using chain transfer agents according to embodiments herein described.
Figure 9:
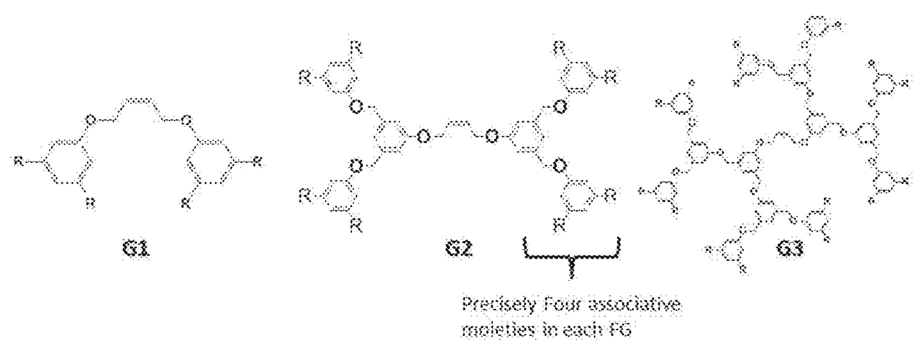
FIG. 9 shows exemplary chain transfer agents suitable to be used in the reaction illustrated in FIG. 8 according to embodiments herein described, and in particular, chain transfer agents with internal olefins based on benzyl ether dendrons.

FIGS. 8 and 9 show an exemplary ROMP +Chain Transfer Agent (CTA) reaction (FIG. 8) and exemplary chain transfer agents (FIG. 9). This exemplary reaction allows in several cases precise control of the number of associating groups. It will be appreciated by a skilled person that it can be straightforward to synthesize and purify at large scale associative polymers compatible with non-polar compositions, with the backbone and associative groups chosen for a particular application as described in the specification (see, e.g., [Ref 10-12]).

FIG. 10 shows a schematic of an exemplary method to synthesize an associative polymer using CTAs.

Example 3

Synthesis of High Molecular Weight di-TE PB by ROMP 6.7 mg of octa-functional tent-butyl ester CTA is loaded into a 50 ml Schlenk flask (charged with a magnetic stir bar). The flask is later sealed with a septum. The content is then deoxygenated by 5 times of pulling vacuum/filling argon. 0.5 ml of deoxygenated DCM is added to dissolve the CTA. 0.13 ml of 1 mg/ml DCM solution of Grubbs II catalyst is injected into the flask, and then 0.03 ml of freshly vacuum distilled, purified COD (≡50 eq. w.r.t. CTA) is immediately injected.

The mixture is stirred at 40° C. for 33 minutes to allow complete incorporation of CTA into the polymer. Another 0.13 ml of freshly prepared 1 mg/ml DCM solution of Grubbs II catalyst is then injected, followed by 5.6 ml of freshly vacuum distilled, purified COD (≡10,000 eq.) in 12 ml of deoxygenated DCM. The reaction is stopped by adding 30 ml of oxygen-containing DCM as the mixture turns viscous enough to completely stop the motion of magnetic stir bar. The diluted mixture is precipitated into 400 ml of acetone at room temperature. The resulting polymer is collected and dried in vacuo at room temperature overnight. GPC results of the polymer: $M_w$=430,000 g/mol, PDI=1.46.

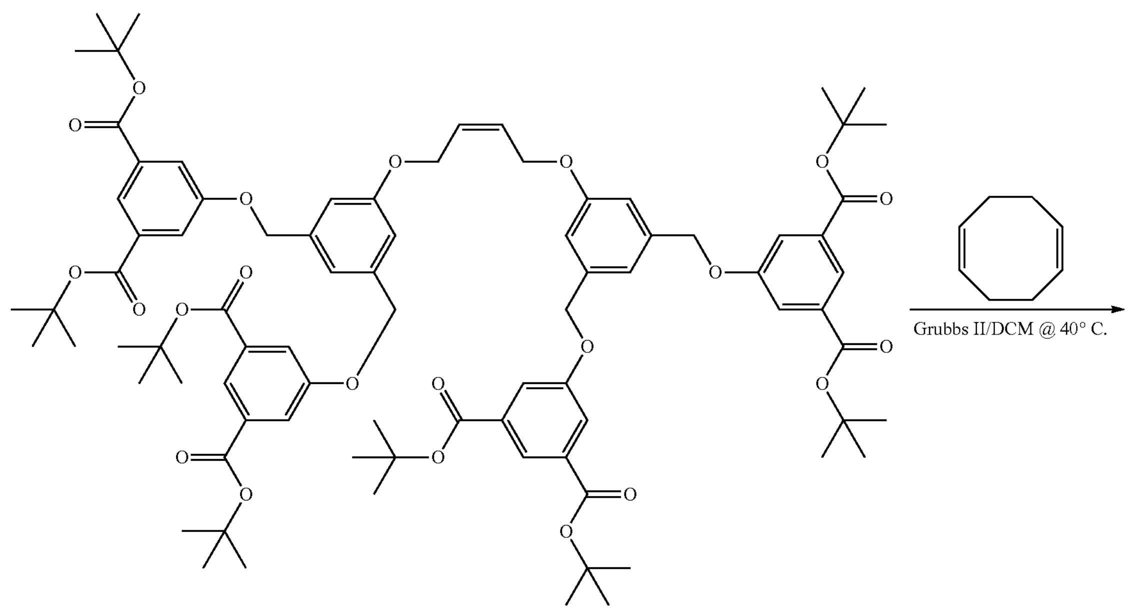

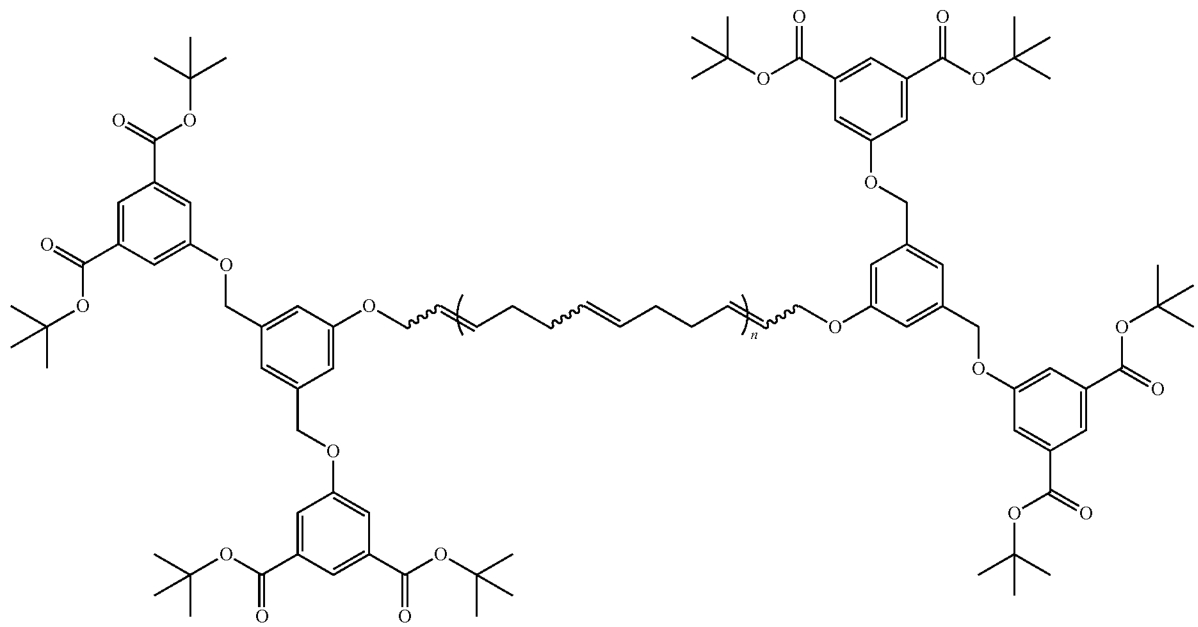

Example 4

Deprotection of the Acid End Groups 1 g of the aforementioned polymer is loaded into a 50 ml Schlenk flask (charged with a magnetic stir bar), and degassed by 5 times of pulling vacuum/filling argon). 30 ml of deoxygenated is then syringe-transferred into the flask. The mixture is homogenized at room temperature. Once complete homogenization is achieved, 1.25 ml of deoxygenated trifluoroacetic acid (TFA) is syringe-transferred into the flask. The mixture is then stirred at room temperature overnight.

Upon the completion of TFA hydrolysis, the mixture is diluted with 20 ml of DCM, and the resulting solution is precipitated into 400 ml of acetone at room temperature. The resulting polymer is further purified by 2 times of re-precipitation from THF into acetone.

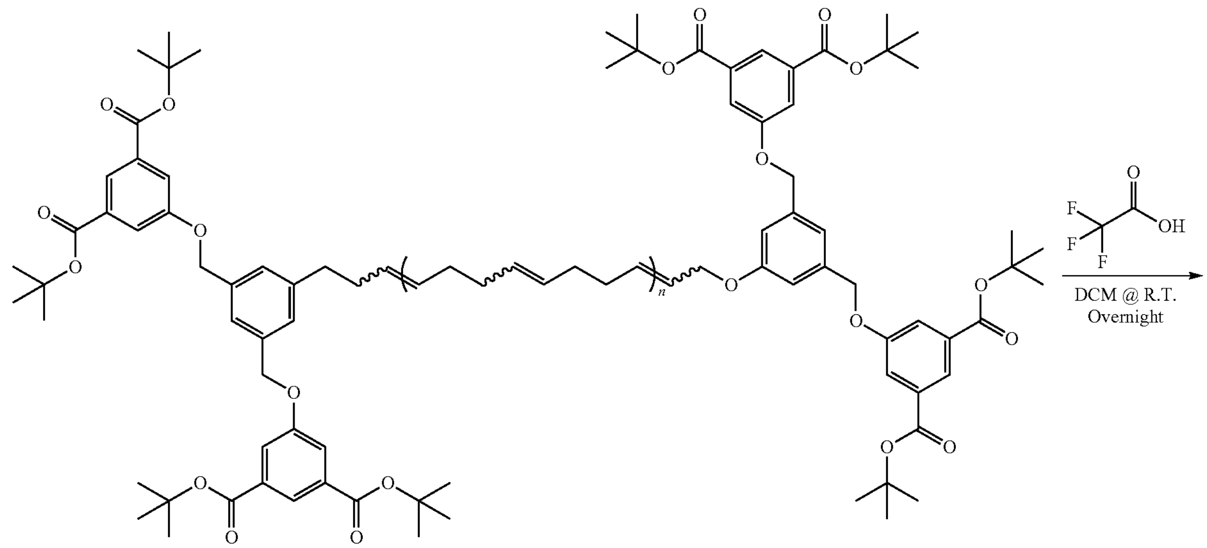

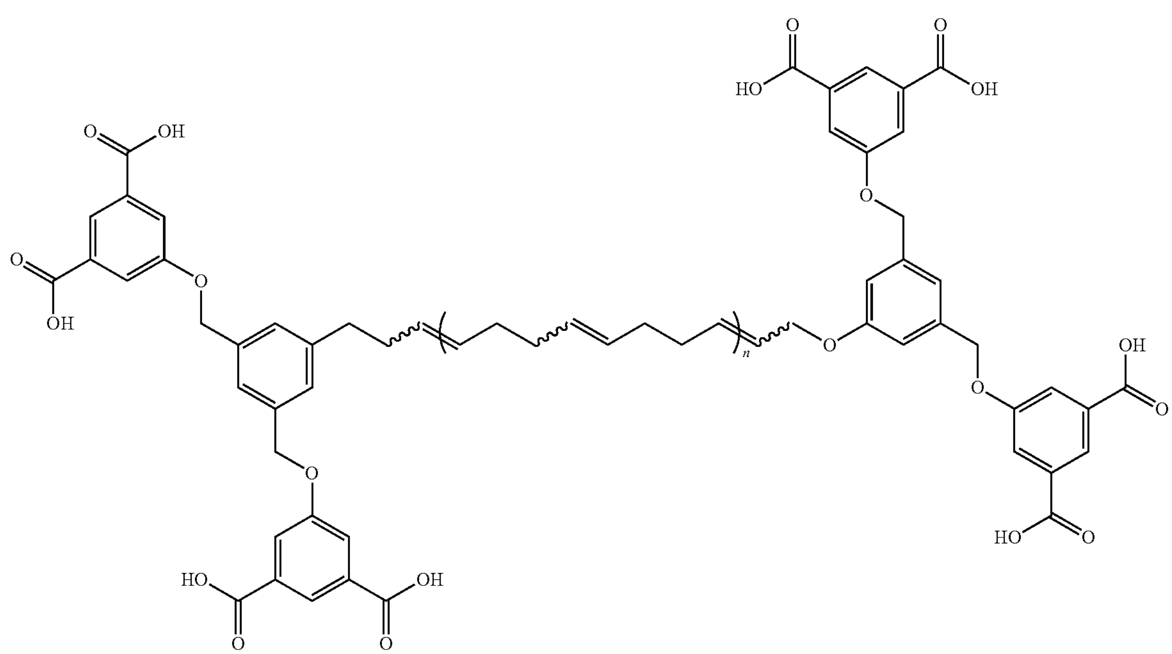

Example 5

Synthesis of High Molecular Weight di-TB PB by ROMP

Synthesis of high M.W di-TB PB by ROMP is performed according to the following steps:

Step 1: Prepolymer Synthesis 5 mg of octa-functional chloro CTA is loaded into a 50 ml Schlenk flask (charged with a magnetic stir bar). The flask is later sealed with a septum. The content is then deoxygenated by 5 times of pulling vacuum/filling argon. 0.5 ml of deoxygenated DCM is added to dissolve the CTA. 0.13 ml of 1 mg/ml DCM solution of Grubbs II catalyst is injected into the flask, and then 0.03 ml of freshly vacuum distilled, purified COD (≡50 eq. w.r.t. CTA) is immediately injected. The mixture is stirred at 40° C. for 33 minutes to allow complete incorporation of CTA into the polymer. Another 0.13 ml of freshly prepared 1 mg/ml DCM solution of Grubbs II catalyst is then injected, followed by 5.6 ml of freshly vacuum distilled, purified COD (≡10,000 eq.) in 12 ml of deoxygenated DCM. The reaction is stopped by adding 30 ml of oxygen-containing DCM as the mixture turns viscous enough to completely stop the motion of magnetic stir bar. The diluted mixture is then precipitated into 400 ml of acetone at room temperature. The resulting polymer is collected and dried in vacuo at room temperature overnight. GPC results of the polymer: $M_w$=430,000 g/mol, PDI=1.46.

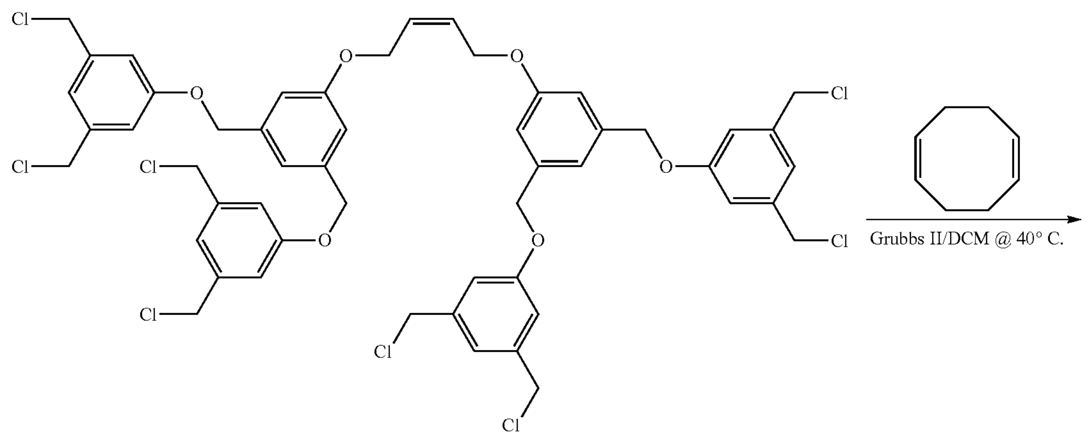

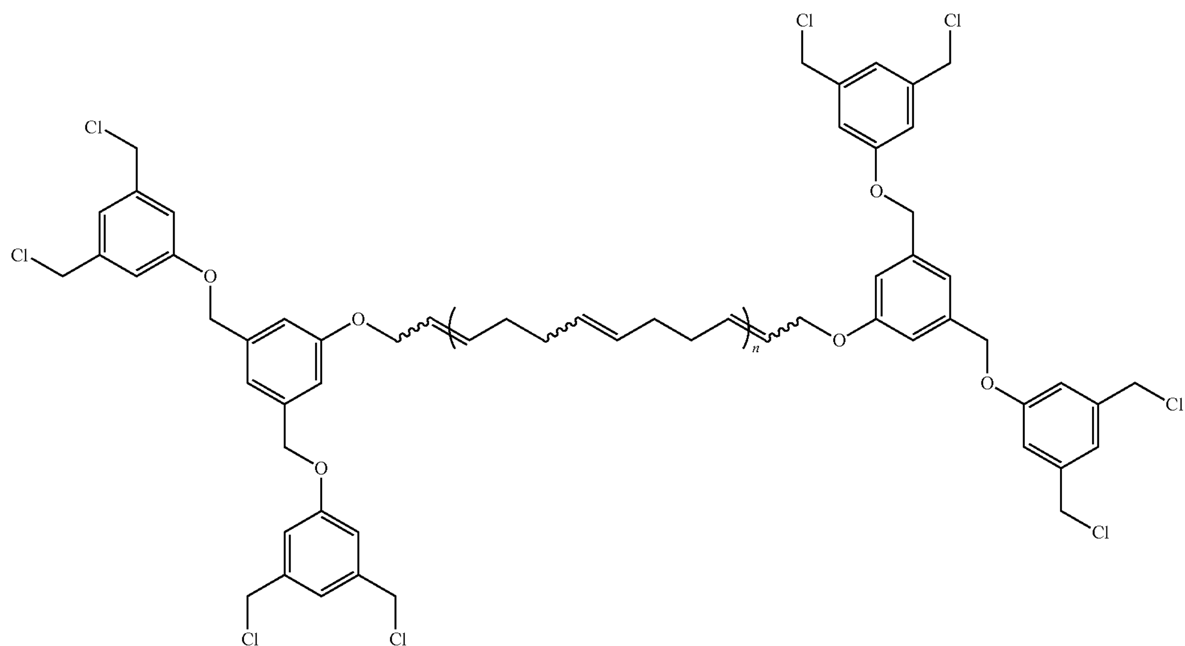

Step 2: End-Azidation of Prepolymer 1 g of the aforementioned chloro-terminated prepolymer is loaded into a 50 ml Schlenk flask, and dissolved into 30 ml of anhydrous THF. Upon complete homogenization, 0.73 g of azidotrimethylsilane (≡1200 eq w.r.t. polymer) and 1.57 g of tetrabutylammonium fluoride (≡1200 eq w.r.t. polymer) are added into the flask. The resulting mixture is degassed by 2 freeze-pump-thaw cycles to prevent crosslinking by dissolved oxygen. Then, the mixture is stirred at 60° C. overnight. The mixture is precipitated into 300 ml of methanol at room temperature. The resulting polymer is further purified by 2 more times of reprecipitation from THF into acetone. The resulting polymer is dried in vacuo at room temperature overnight.

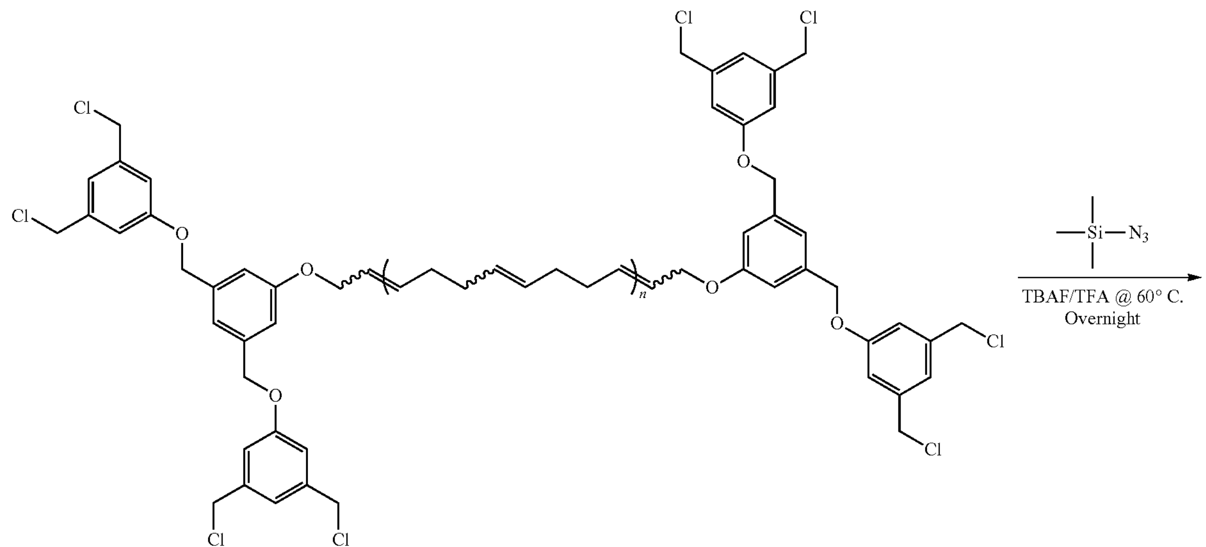

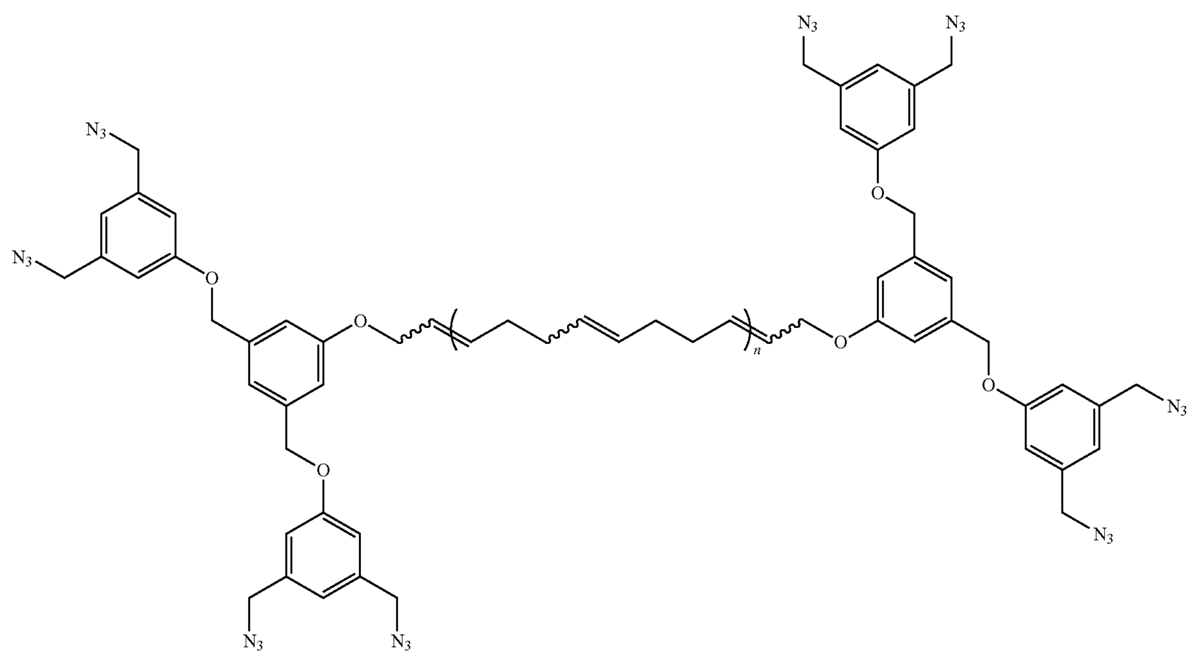

Step 3: Attachment of Tertiary Amine Groups to Polymer Chain Ends 0.68 g of the aforementioned azido-terminated prepolymer is loaded into a 50 ml Schlenk flask, and dissolved into 25 ml of anhydrous THF. Once homogenization is complete, 0.23 g of 3-Dimethylamino-1-propyne (≡1,200 eq. w.r.t. the polymer), along with 0.02 g of N,N,N',N',N"-pentamethyldiethylenetriamine (PMDETA, ≡50 eq. w.r.t. the polymer) are added into the flask. The mixture is then deoxygenated by 2 freeze-pump-thaw cycles. Later it is frozen and pumped again, and then 0.016 g of copper (I) bromide (≡50 eq. w.r.t. the polymer)) is added into the flask under the protection of argon flow when the mixture is still frozen. After thawing the mixture and filling the flask with argon, the mixture is stirred at room temperature for 20 minutes in order to homogenize the copper (I) catalyst. The mixture is stirred at 50° C. overnight. 2 ml of methanol is slowly injected into the mixture in order to remove copper from the amine end groups. The mixture is precipitated into 300 ml of methanol at room temperature. The resulting polymer is further purified by 2 more times of reprecipitation from THF into methanol. It is later dried in vacuo at room temperature overnight.

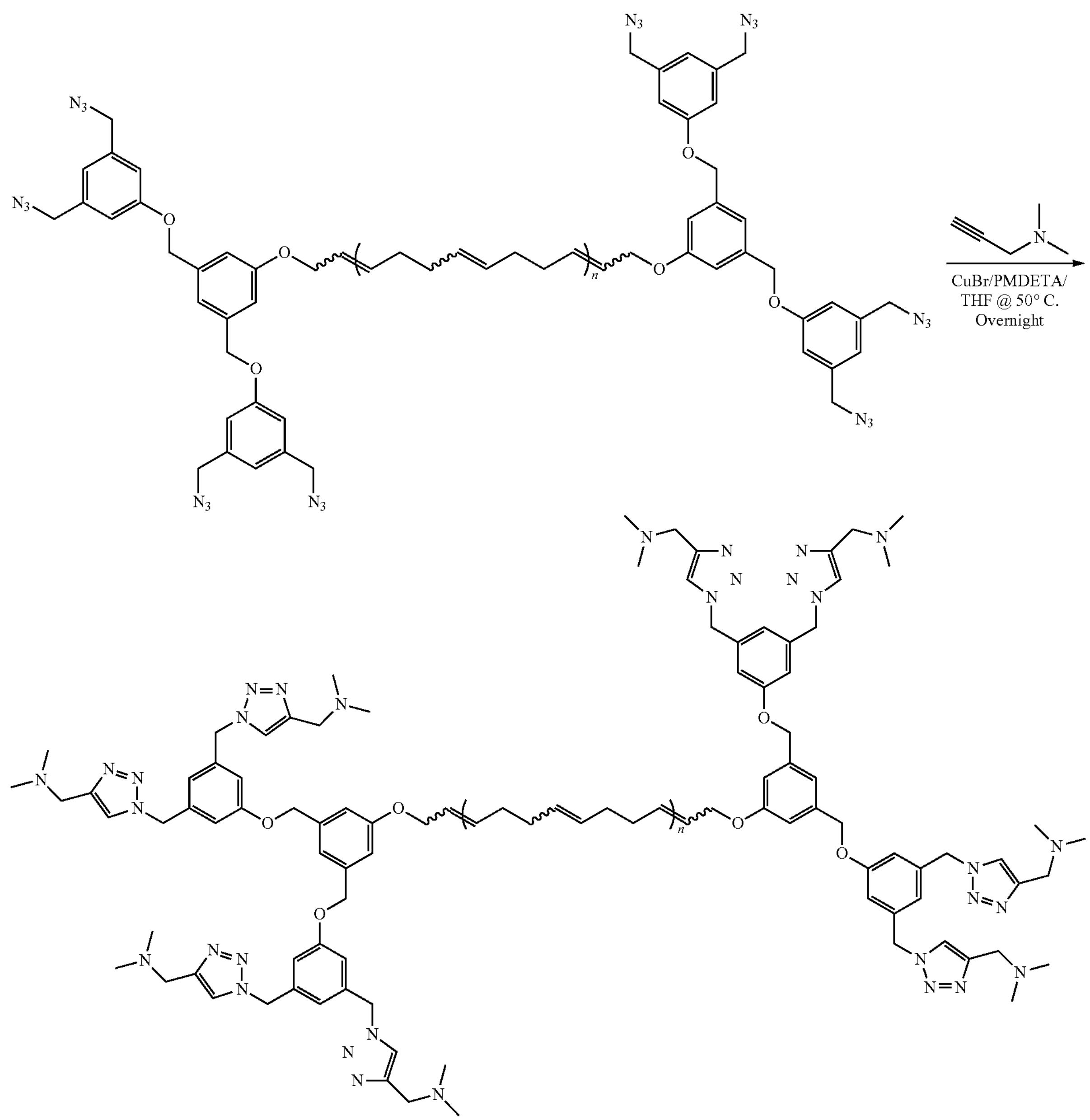

Example 6

Effect of Self-Association in Exemplary Associative Polymers

Figure 11:
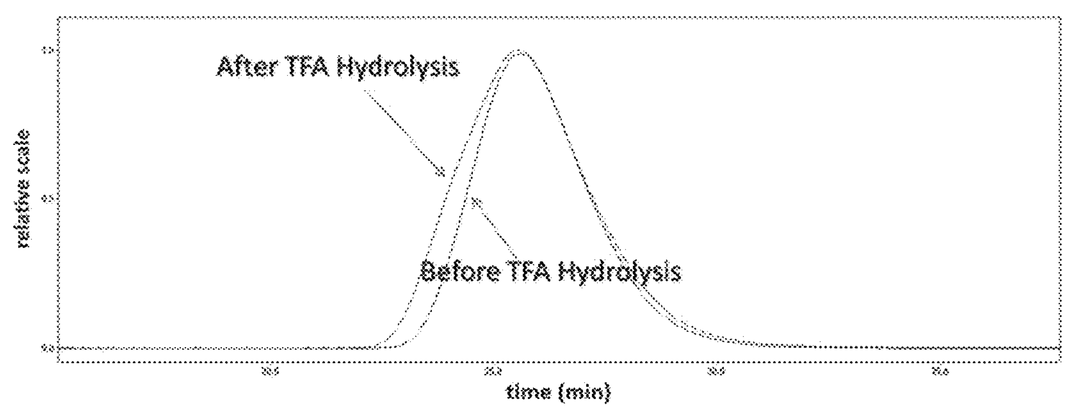
FIG. 11 shows a diagram illustrating GPC traces of 430K di-TE PB (di-TE PB also called octa tBu ester PB herein) and the resulting polymer of its hydrolysis reaction (in THF). In particular.
Figure 12:
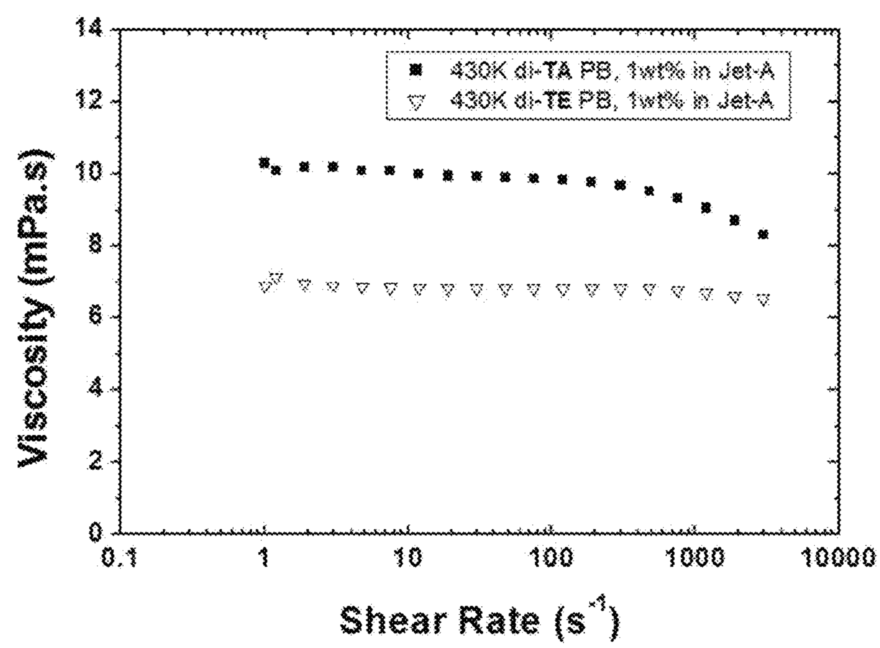
FIG. 12 shows a diagram illustrating viscosity in function of shear rate of the 1 wt % Jet-A solutions of the 430K di-TE PB and 430K diTA PB herein also indicated as di-TE PB and (430K di-TA-PB).

Proof of effect of self-association in exemplary associative polymers herein described is illustrated in FIG. 11 and FIG. 12. In the exemplary associative of Example 5 the aforementioned method of recovering the end acid groups does not crosslink the polybutadiene backbone, as proved in the superposition of GPC traces of 430K di-TE PB and the resulting polymer of its hydrolysis reaction (in THF) illustrated in FIG. 11

In the illustration of FIG. 11, the slight increase in the population of high molecular weight species is due to the weak self-association of chain-end acid clusters. The apparent $M_w$ increases by 20% after TFA hydrolysis.

A further confirmation is provided by the illustration of FIG. 12. In particular, FIG. 12 shows the rheology data of the 1 wt % Jet-A solutions of the 430K di-TE PB and 430K di-TA PB respectively. The viscosities of 1 wt % Jet-A solution of 430K di-TA PB are significantly higher than those of the ester prepolymer. Since the GPC results show the extent of backbone crosslinking during removal of tert-butyl groups is negligible, it is reasonable to say that the self-association of acid clusters accounts for the increase in viscosities.

Example 7

Figure 13:
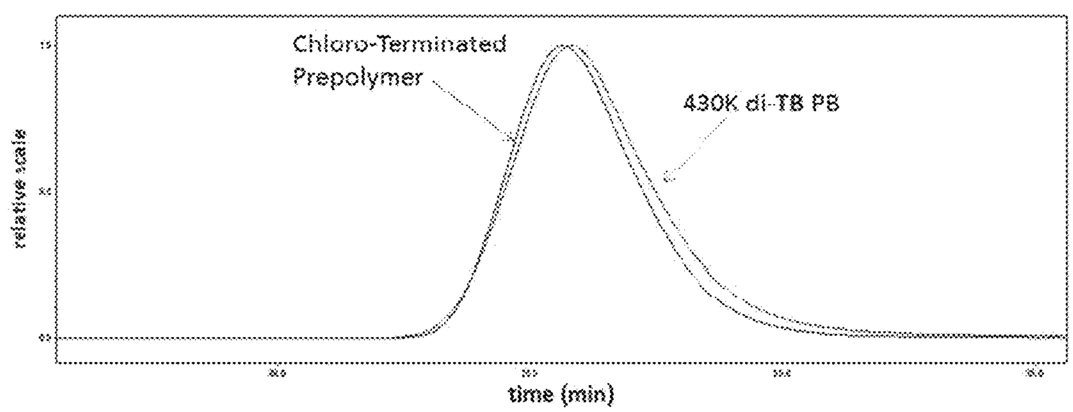
FIG. 13 shows a diagram illustrating GPC traces of the 430K octa chloro PB and the corresponding octa tertiary amine PB. In particular.
Figure 14:
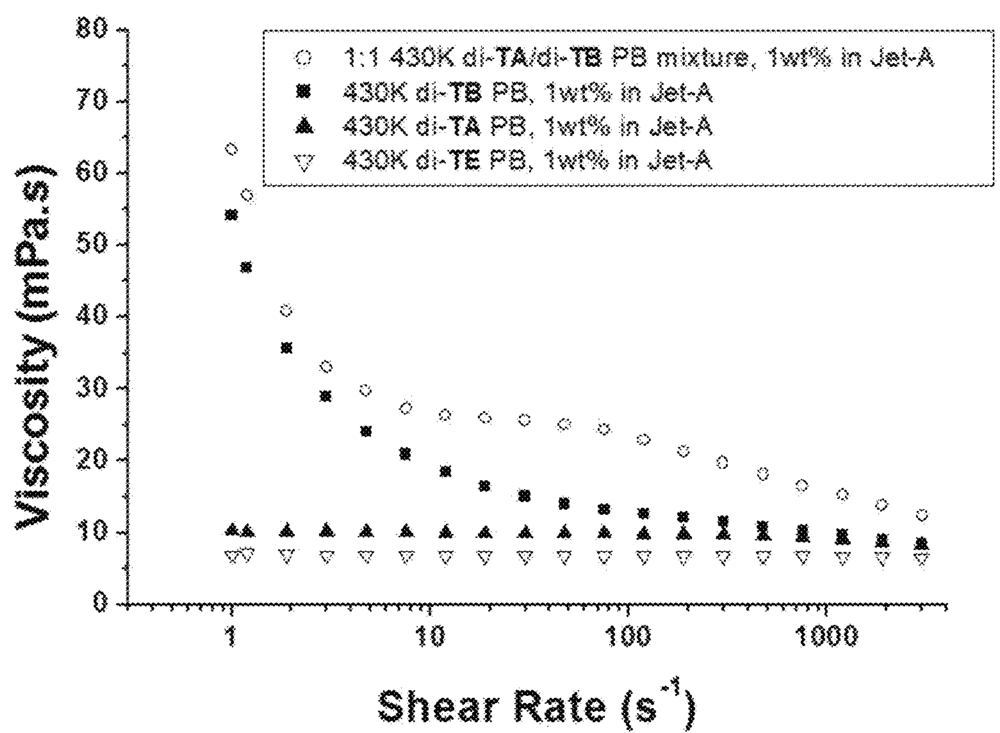
FIG. 14 shows a diagram illustrating viscosity in function of shear rate of 1 wt % Jet-A solutions of 430K di-TE PB, di-TA PB, di-TA PB, and 1:1 w/w di-TA PB/di-TB PB mixture herein also indicated as 430K di-TE PB, di-TA PB, di-TB PB, and 1:1 w/w -di-TA PB/di-TB PB mixture.

Effect of End-To-End Donor Acceptor Association in Exemplary Associative Polymers A proof of the effect of end-to-end donor/acceptor association is provided in FIG. 13 and FIG. 14. In particular FIG.

13, shows the superposition of GPC traces of the 430K octa chloro PB and the corresponding octa tertiary amine PB.

In the illustration of FIG. 13, the polybutadiene backbone is mainly intact after two end-functionalization reactions.

FIG. 14 shows the rheology data of 1 wt % Jet-A solutions of 430K di-TE PB, di-TA PB, di-TB PB, and 1:1 w/w di-TA PB/di-TB PB mixture. In the illustration of FIG. 14, the 1:1 mixture shows significantly higher viscosities than the other solutions. Since none of the two polymer components are crosslinked, it suggests that the end-to-end acid/base interaction results in the formation of supramolecular species.

Example 8

Effect of an Exemplary Associative Polymer on Fuel Compositions

Effect of di-TA PB synthesized according to Example 5, was tested in Jet A fuel. In particular a composition comprising 0.5% of di-TA PB with a backbone length of 264,000 g/mol (denoted 264K di-TA PB) in jet A fuel has been provided as illustrated in FIG. 15.

Figure 15:
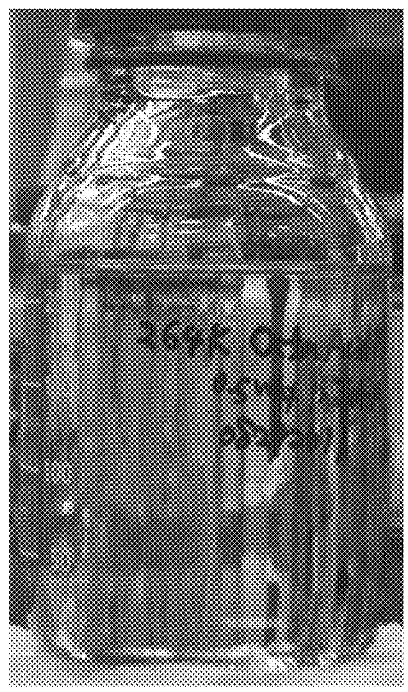
FIG. 15 illustrates properties of an exemplary hydrocarbon composition according to the disclosure. In particular, Panel A shows that the exemplary composition remains stable for months at −30 ° C. and Panel B shows that dewatering operations occur as quickly and completely in the composition (right) as in an untreated host (left).
Figure 15:
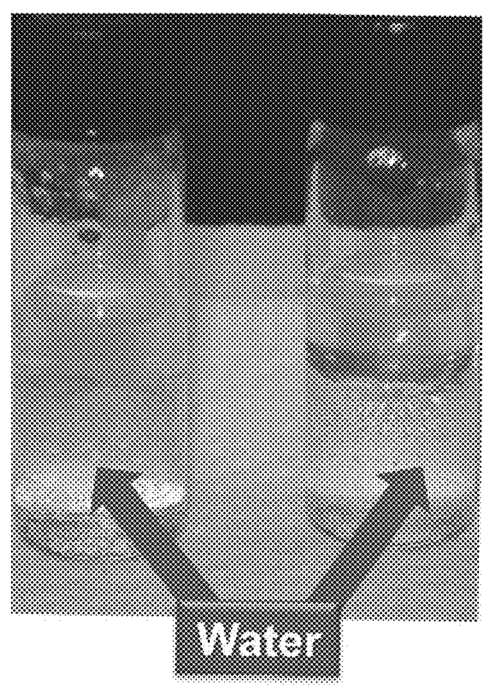

In the illustration of FIG. 15 is shown that the exemplary associative di-TA PB of Example 5 showed no phase separation and was able to stay in solution (crystal clear) even at −30° C. for months(see FIG. 15A).

Additionally, dewatering operations appeared to occur as quickly and completely in the composition with associative di-TA PB of Example 5, as in the untreated host Jet A (see FIG. 15B left vial v. right vial)

Example 9

High-Speed Impact/Flammability Test

To demonstrate the effect of exemplary polymers on the mist-control of kerosene, a series of high-speed impact/flammability test were conducted at California Institute of Technology. The high-speed impact test is designed to simulate a scenario in which fuels can be atomized into droplets due to impact, whereas the continuously provided ignition sources are used to obtain an indication of the flammability of resulting droplets. The following samples were loaded into 50 ml aluminum cans, fixed on a stage, and impacted by a 5 cm×3 cm steel cylinder travelling at 200 km/hr (three continuously burning propane torches were set up along the path of splashed samples): Jet-A, 0.35 wt % Jet-A solutions of 4.2 M polyisobutylene (PIB) with and without recirculation by a Bosch 69100 In-line turbine fuel pump for 1 minutes, 0.3 wt % of Jet-A solutions of 430K di-TA PB with and without recirculation by a Bosch 69100 In-line turbine fuel pump for 1 minutes. The results for each sample are described below: Jet-A: Significant amount of fine droplets was generated upon impact. The fine droplets travelling along the path of the projectile were ignited by the burning torches within 50 milliseconds, and then evolved into a propagating fire ball.

0.35 wt % Jet-A solution of 4.2M PIB, without shear: Large droplets and filaments were generated by the impact. Sparkles were observed as the fluid elements passed over the torches, but they failed to propagate.

0.35 wt % Jet-A solution of 4.2M PIB, with 1 min. of shear: Fine droplets were generated by the impact. The fine droplets travelling along the path of the projectile were ignited by the burning torches within 50 milliseconds, and then evolved into a propagating fire ball.

0.3 wt % Jet-A solution of 430K di-TA PB, without shear: Droplets were generated by the impact. Sparkles were observed as the fluid elements passed over the torches, but they failed to propagate.

0.3 wt % Jet-A solution of 430K di-TA PB, with 1 min. of shear: Droplets were generated by the impact. Sparkles were observed as the fluid elements passed over the torches, but they failed to propagate.

Example 10

Synthesis of Octa Functional CTAs

Figure 18:
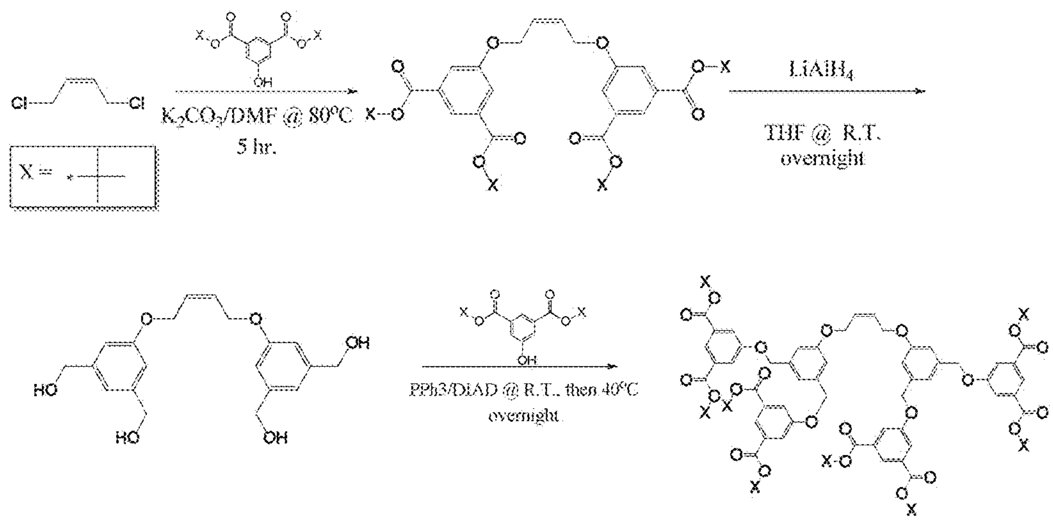
FIGS. 18 and 19 show exemplary synthesis reactions for exemplary CTAs suitable to make associative polymers in accordance with embodiments herein described.
Figure 19:
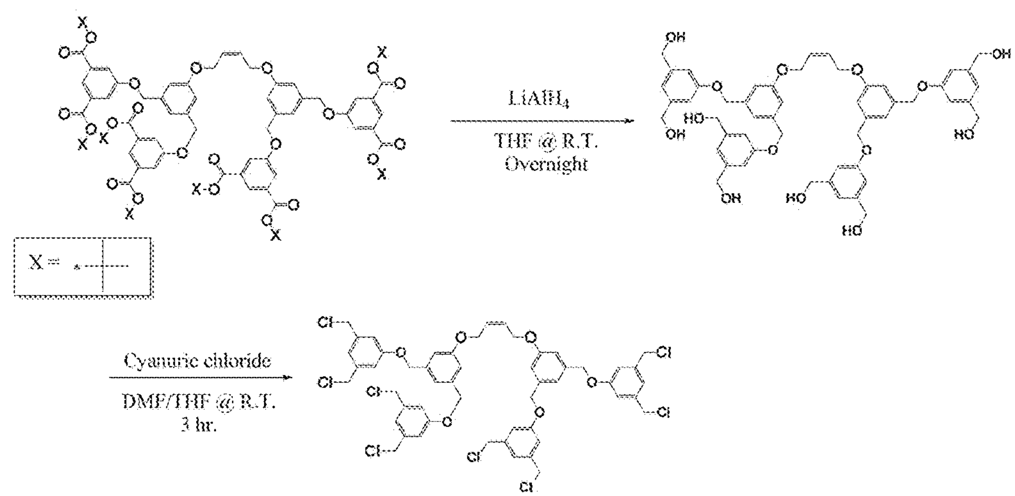

Reaction schemes for exemplary Octa functional CTAs in accordance with the present disclosure are shown in the illustration of FIG. 18 and FIG. 19.

Example 11

Exemplary Node to Chain and Node to FG Interactions

Figure 20:
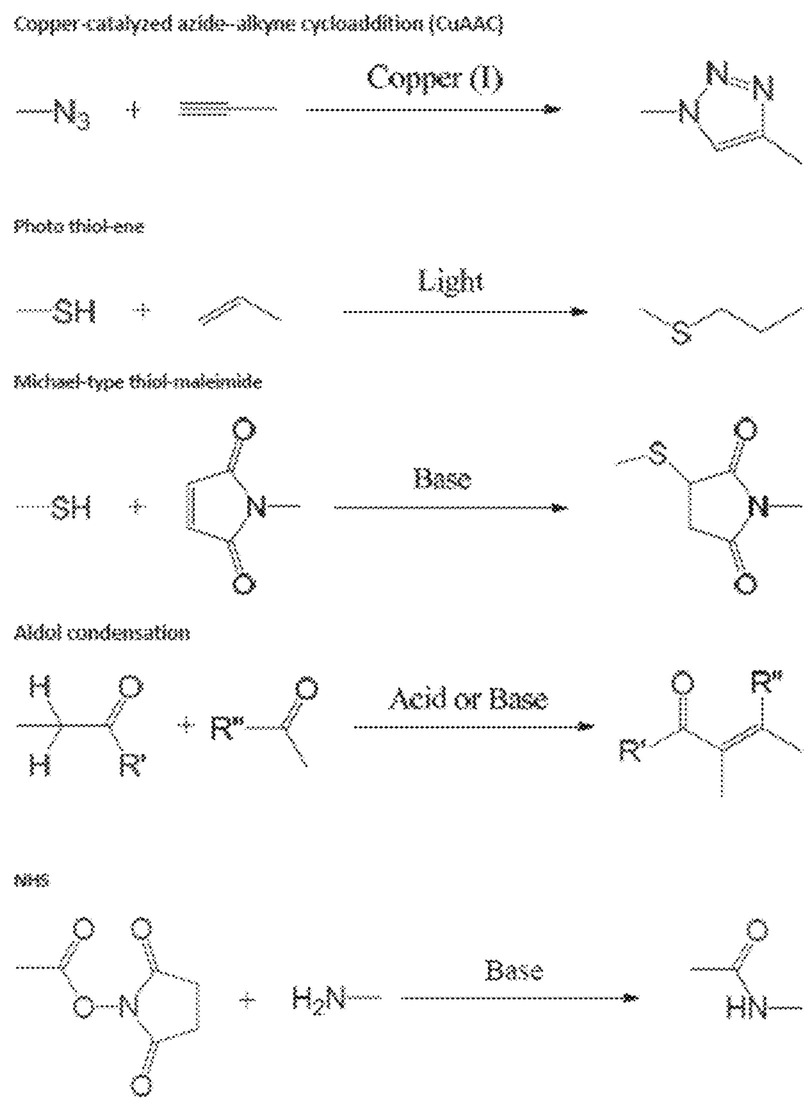
FIGS. 20 and 21 show exemplary covalent links linking node to chain and node to FG according to embodiments herein described.
Figure 21:
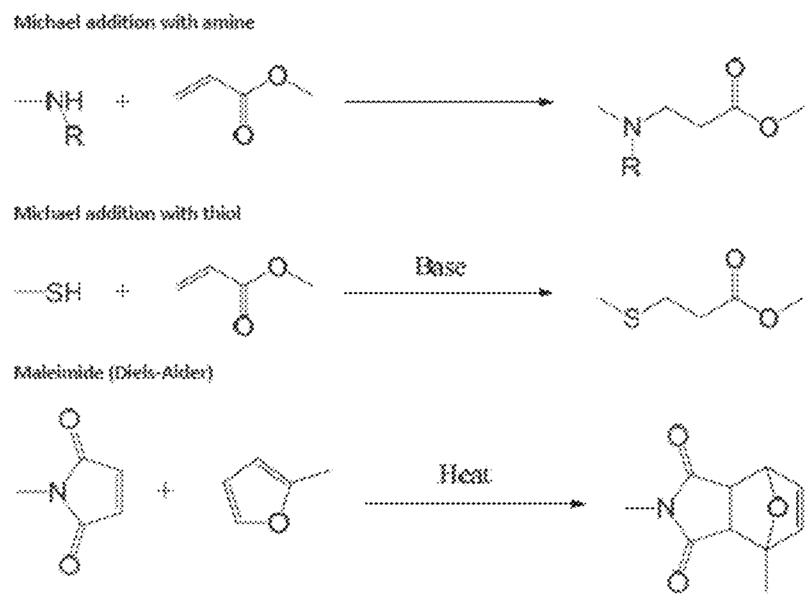

Exemplary pairs of reactive groups that are useful at end positions such as $R_1$ or $R_2$ in the structure of formula (III) or in di- or multi-valent crosslinkers and the product of their reaction, which can be used for covalently linking a chain and a FG, or linking chains to a node or attaching FG to a node in accordance with the present disclosure, are shown in the illustration of FIG. 20 and FIG. 21.

Example 12

Polymer-Composition Solubility Determination

Solubility of an exemplary polymer 1,4-polybutadiene (PB) in a non-polar composition has been determined. The nonpolar composition is kerosene, which can be considered to be a mixture of hydrocarbons that contain 6-16 carbon atoms per molecule, the vo of octane (160 $cm^3$/mol) can be chosen as a representative value for kerosene.

Accordingly, when 1,4-polybutadiene (PB) is used as the backbone of invented associative polymers, the value of $\delta_1$ is ~8 $(cal/cm^3)^{0.5}$ (see, e.g. [Ref 1, 15]). To evaluate $\delta_2$ for kerosene, the following relationship (dispersive Hansen parameter) can be used:

$$\delta=9.55n_D-5.55$$

where $n_D$ is the refractive index of the host, and $n_D$ can be well-approximated by the square root of the dielectric constant ($\in$) of the host. Given $\in_{kerosene}$ is 1.8 at 20° C., $\delta_2$ is ~$9.55\times(1.8)^{0.5}-5.55=7.26$.

Accordingly, the interaction parameter for the associative polymer with a 1,4-polybutadiene backbone in kerosene at ambient temperature can be estimated as follows:

$$\chi \approx 0.34 + \frac{160}{1.987\times 298.15}\times(8-7.26)^2 = 0.49.$$

The calculated value of $\chi$of 0.49 indicates that the PB associative polymer with a 1,4-polybutadiene backbone would be expected to be substantially soluble in a non-polar composition of kerosene.

A skilled person can determine based on the above Example if other associative polymer backbones would be substantially soluble in other non-polar compositions by applying the same calculations using the particular solubility parameters for the particular non-polar composition.

Example 13

Drag Reduction Test 0.2 grams of telechelic 1,4-PB of $M_w$630,000 g/mol, terminated by 2 acid groups (denoted 630K di-DA PB) and 0.2 grams of telechelic 1,4-PB of $M_w$ 540,000 g/mol, terminated by 2 tertiary amine groups (denoted 540K di-DB PB) were dissolved in 39.6 grams of Jet-A at room temperature over 16 hours.

Figure 39:
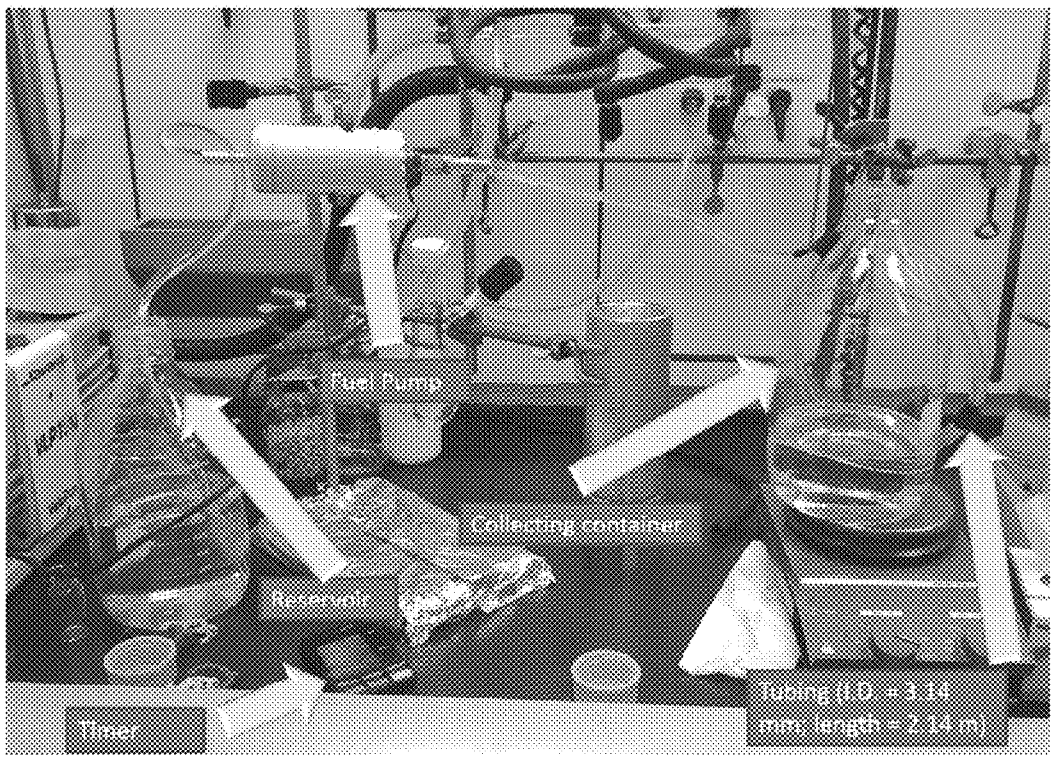
FIG. 39 shows an image of an experimental setup to test the associative polymers herein described in the control of drag reduction in compositions (see, e.g. Example 13).

The resulting 1 wt % Jet-A solution of 1:1 w/w 630K di-DA PB/540K di-DB PB was further diluted with 1293 grams of Jet-A to a concentration of 300 ppm (~0.1 c* of the non-associative backbone). A Bosch 69100 In-line turbine fuel pump with its outlet connected to a piece of TYGON® tubing (inner diameter=6.34 mm; length=40 cm) and inlet outlet connected to a piece of TYGON® tubing (inner diameter=3.17 mm; length=2.14 m) was used to transfer the fuel sample from its reservoir to a collecting jar over a period of 20 seconds (FIG. 39).

The pump was primed with ~200 mL of the sample before the test. The collecting jar was weighed before and after the transfer in order to determine the amount of fuel collected. The same procedure was also performed on the unmodified host Jet-A. The measured mass flow rate of unmodified Jet-A was 24.17 g/s, which corresponded to a Reynolds number of 6458. As for the Jet-A sample with 300 ppm of 1:1 donor/acceptor polymer pair, the measured mass flow rate was 24.92 g/s. Hence, an increase of 3.2% in mass flow rate was achieved, indicating that the presence of 1:1 (w/w) mixture of 630K di-DA PB and 540K di-DB PB at 300 ppm in Jet-A reduced the effect of turbulent drag on flow rate.

A skilled person will realize that the above test can be applied to other associative polymers in order to determine the extent of drag reduction.

Example 14

Detection of Rehological Properties of Solutions

Figure 22:
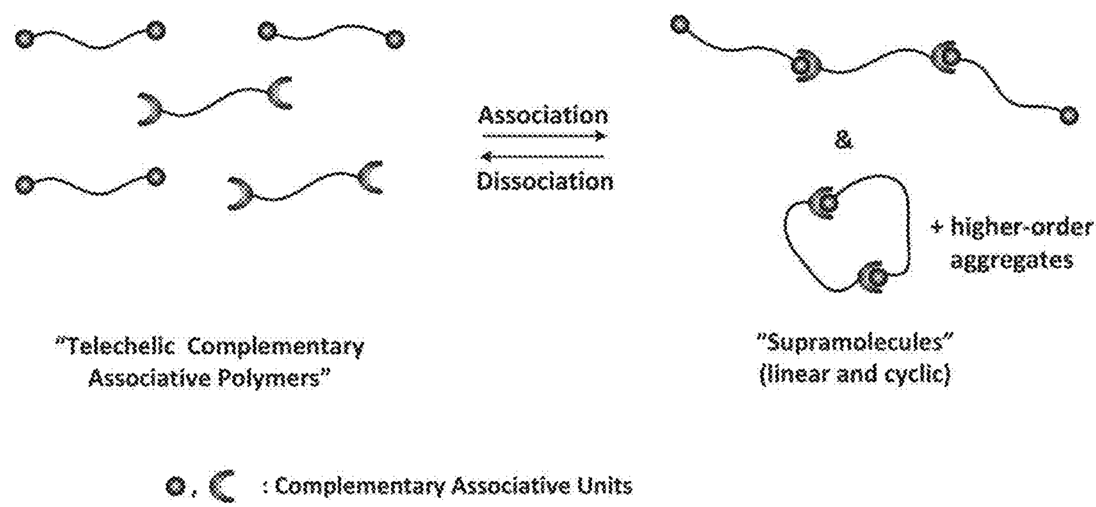
FIG. 22 Shows a schematic illustration of the self-association behavior of carboxyl-terminated telechelic 1,4-PBs according to some embodiments herein described.
Figure 41:
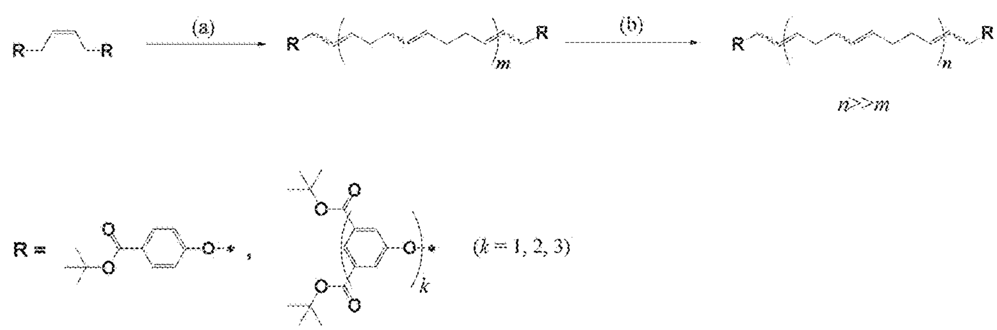
FIG. 41 shows a schematic illustration of a two-stage synthesis of tert-butyl ester-terminated telechelic 1,4-PBs. Step (a): 50-100 equiv of COD, 1/30 equiv of second-generation of Grubbs Catalyst, anhydrous dichloromethane (DCM), 40° C., 30-60 min. Step (b): 1000-2000 equiv of COD for target Mw<300,000 g/mol, anhydrous dichloromethane (DCM), 40° C., 16 h; 10000 equiv of COD for target Mw>400,000 g/mol, anhydrous dichloromethane (DCM), 40° C., <10 min.
Figure 42:
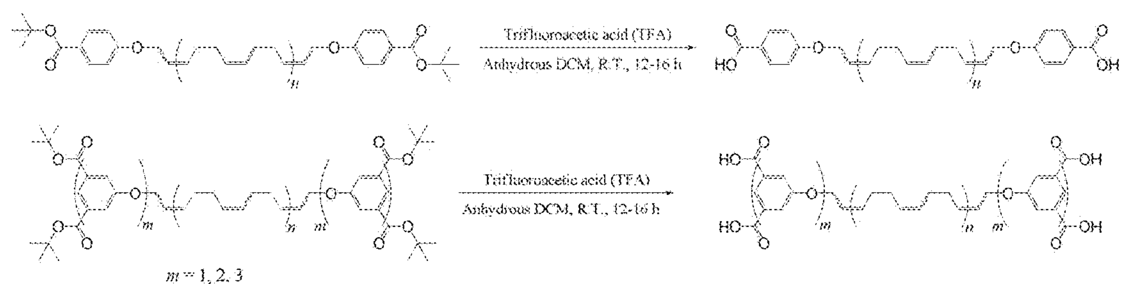
FIG. 42 shows a schematic illustration of TFA hydrolysis of tert-butyl ester polymer end groups.

The methods presented in Examples 2-5 to synthesize telechelic 1,4-PBs with $M_w$ up to 430,000 g/mol capped at each end with well-defined tert-butyl ester-terminated dendrons (FIG. 41) provides facile access to matched pairs of non-associative and associative telechelic 1,4-PBs (FIG. 42). In this example, these model polymers were used to study the relationship between molecular properties (e.g., polymer molecular weight and the number of carboxyl groups on chain ends) and association behavior, particularly its effects on the rheological properties in solution. The present study of the self-association behavior of carboxyl-terminated telechelic 1,4-PBs provides a foundation for comparative studies of complementary association illustrated in FIG. 22.

The following materials and methods were used: Solvents 1-chlorododecane (CDD) and tetralin (TL) were both obtained from Aldrich in 97% and 99% purity, respectively. All tert-butyl ester-terminated telechelic 1,4-PBs and their corresponding carboxyl-terminated telechelic 1,4-PBs were prepared as described herein. Four values of the number of functional groups on polymer chain ends, N, and three polymer backbone lengths (in terms of $M_w$ by GPC-LS) were selected for the present study: A series of polymers with approximately matched backbone length (nominally 220,000 g/mol) were prepared with N=1, 2, 4 and 8; and a series of polymers with N=4 was prepared with three backbone lengths of 76,000, 230,000, and 430,000 g/mol. (Table 3.1). To simplify the nomenclature of materials, polymer end-groups with N=1, 2, 4, and 8 tert-butyl ester groups are denoted ME, DE, TE, and OE (for mono-, di-, tetra-, octa-ester end groups, respectively), respectively. Similarly, polymer end-groups with N=1, 2, 4, and 8 carboxyl groups are denoted MA, DA, TA, and OA (for mono-, di-, tetra-, octa-acid end groups, respectively), respectively.

Procedure for Sample Preparation: Solutions of tent-butyl ester terminated polymers for viscosity measurements were prepared by combining polymer and solvent in clean 20 mL scintillation vials or larger 50 mL glass jars which were placed on a Wrist-Action Shaker (Burrell Scientific) for up to 24 h to allow complete homogenization.

Solutions of carboxyl-terminated polymers were prepared as follows: To 150 to 200 mg of carboxyl-terminated polymer in a 50-mL Schlenk flask was added necessary amount of solvent for 1 wt % stock. The contents of the Schlenk flask were degassed by 3 freeze-pump-thaw cycles, and then stirred overnight at 70° C.

Viscosity Measurements: Steady shear viscosity was measured in a cone-plate geometry (60 mm diameter aluminum, 1° cone, 29 μm truncation) using an AR1000 rheometer from TA Instruments (temperature controlled at 25° C.). Solutions of tent-butyl ester terminated polymers were probed in the shear rate range 1-200 $s^{-1}$ logarithmically (5 shear rates per decade). The range was extended to 3000 $s^{-1}$ for carboxyl-terminated polymers to better capture shear-thinning behavior. All viscosity data were reported in terms of specific viscosity ($\eta_{sp}$, $\equiv(\eta_{solution}-\eta_{solvent})/\eta_{solvent}$, where $\eta_{solvent}$=2.72 mPa·s for CDD and 2.02 mPa·s for TL at 25° C.) which reflects the contribution of the polymer to the viscosity [Ref 16].

Example 15

Dissolution Behavior

All six tent-butyl ester-terminated 1,4-PBs (Table 7) were found readily soluble in both CDD and TL. With increasing carboxyl content, it became more difficult to dissolve carboxyl-terminated polymers: For N=1, the corresponding polymer (226K di-MA 1,4-PB) was found soluble in both CDD and TL at room temperature; at N=2 and 4, the corresponding polymers (230K di-DA 1,4-PB; 76K, 230K, and 430K di-TA 1,4-PBs) were not soluble in either model solvent at room temperature, but they dissolved into CDD and TL when heated at 70° C. and remained in solution thereafter. At N=8, the polymer 207K di-OA 1,4-PB did not dissolve completely into either solvent even when heated at elevated temperatures (>110° C.) overnight. The difficulty of dissolving 207K di-OA 1,4-PB is not due to crosslinking: The polymer dissolves readily in THF, it passes easily through filters, and GPC-LS analysis showed that 207K di-OA 1,4-PB has a unimodal distribution similar to the other polymers in the series of similar $M_w$ (near 220,000 g/mol; see Table 7, which shows molecular weight ($M_w$) and number of chain-end functional groups (N) of tert-butyl ester- and carboxyl-terminated telechelic 1,4-PBs).

Table 7[a]

| | Nominal $M_w$ | | |
|---|---|---|---|
| N | 76 | 220 | 430 |
| 1 | | 226 (1.4) | |
| 2 | | 230 (1.5) | |
| 4 | 76 (1.5) | 230 (1.4) | 430 (1.5) |
| 8 | | 207 (1.5) | |

[a]GPC was performed for in THF for 35° C. for the tert-butyl ester form; results are shown for $M_w$ in kg/mol followed by PDI in parentheses.

Example 16

Steady-Flow Shear Viscosity of 1 wt % Polymer Solutions

Figure 23:
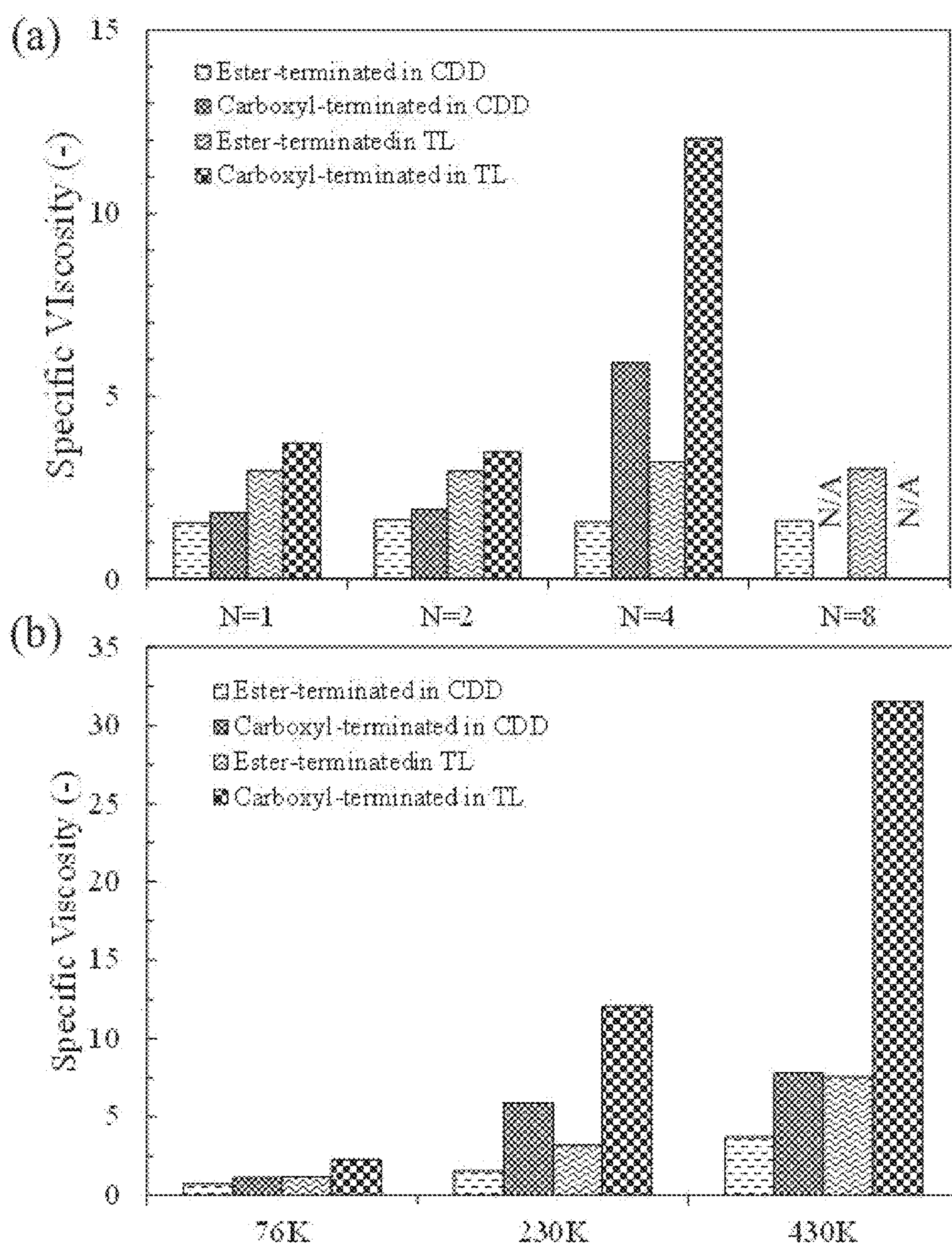
FIG. 23 shows a graph Specific viscosity of 1 wt % solutions of test polymers in 1-chlorododecane (CDD) and tetralin (TL).

Specific viscosity ($\eta_{sp}$) of 1 wt % polymer solutions averaged over shear rates from 10-100 $s^{-1}$ show that all solutions of carboxyl-terminated 1,4-PBs had higher $\eta_{sp}$ than their tert-butyl ester-terminated (i.e., protected) counterparts, but the highest increase was observed in the case of N=4 (FIG. 23). The lack of $\eta_{sp}$ data for carboxyl-terminated 1,4-PB with N=8 is due to the poor solubility of the polymer in both solvents. While $\eta_{sp}$ for all of the non-associative ~230K tert-butyl ester-terminated polymers was the same, the deprotection of carboxyl groups on polymer chain ends produced a threefold increase in specific viscosity in both CDD and tetralin for N=4, whereas at N=1 and 2 only marginal increases were observed after deprotection of carboxyl groups (FIG. 23). Thus, there appears to be a minimum number of carboxyl groups on polymer chain ends to achieve the intermolecular association suitable for viscosity modification (N>2) and a maximum number imposed by the solubility limit (N<8). The effect of solvent quality on lisp was also observed in FIG. 23. Increasing the length of 1,4-PB backbone, for identical TA end groups (N=4) increases the specific viscosity strongly (FIG. 23): In tetralin, for the 76,000 g/mol polymer, deprotection of carboxyl groups only increases the specific viscosity by 90%, whereas the increase is more than 320% for the 430,000 g/mol polymer. For each polymer, $\eta_{sp}$ of its 1 wt % tetralin solution was found nearly twice as high as that of its 1 wt % 1-chlorododecane solution.

Example 17

Concentration Dependence of Specific Viscosity

Figure 24:
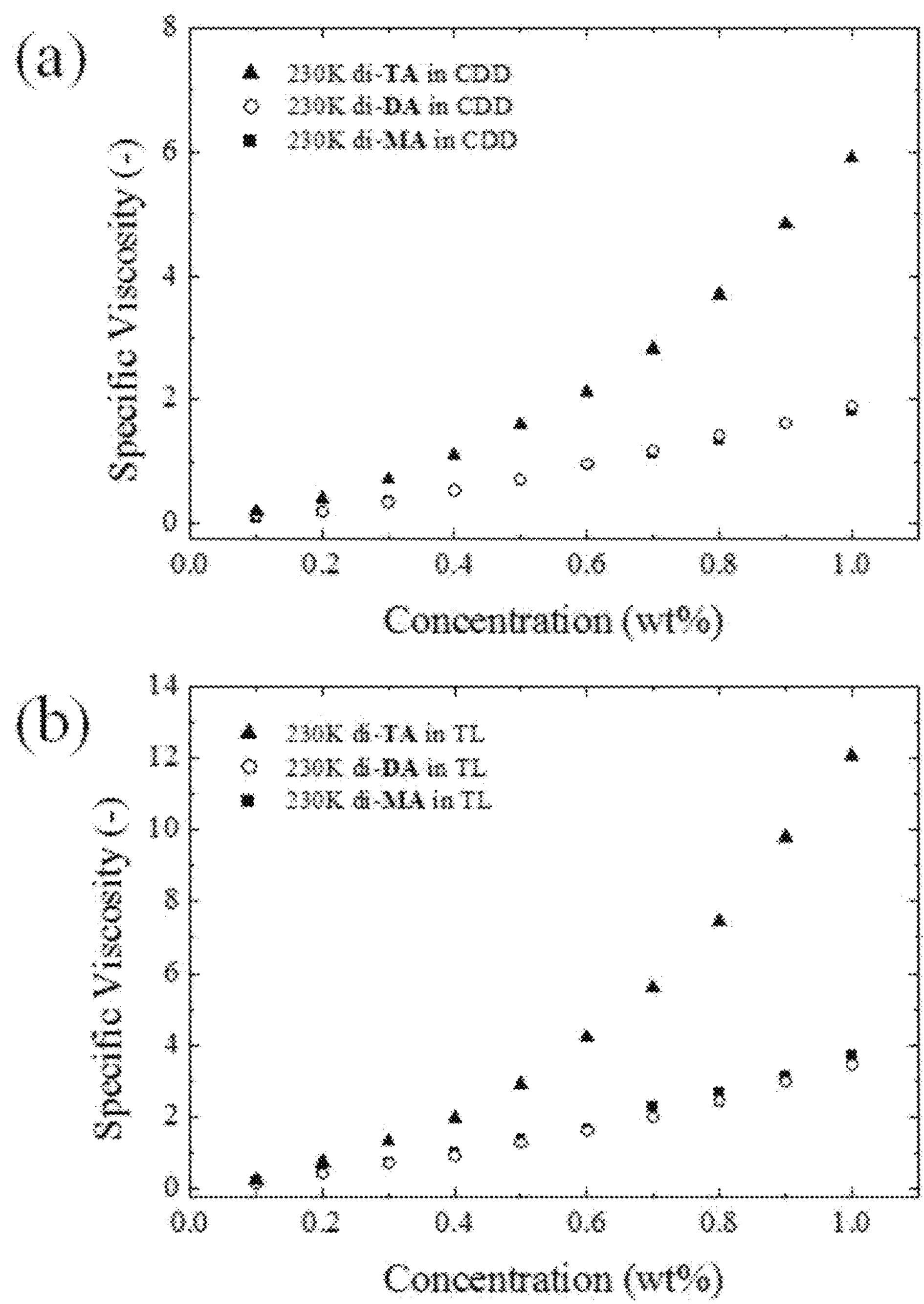
FIG. 24 shows the effect of number of chain-end functional groups (N) on the concentration dependence of the specific viscosity of solutions of telechelic associative polymers with Mw ~230,000 g/mol.
Figure 25:
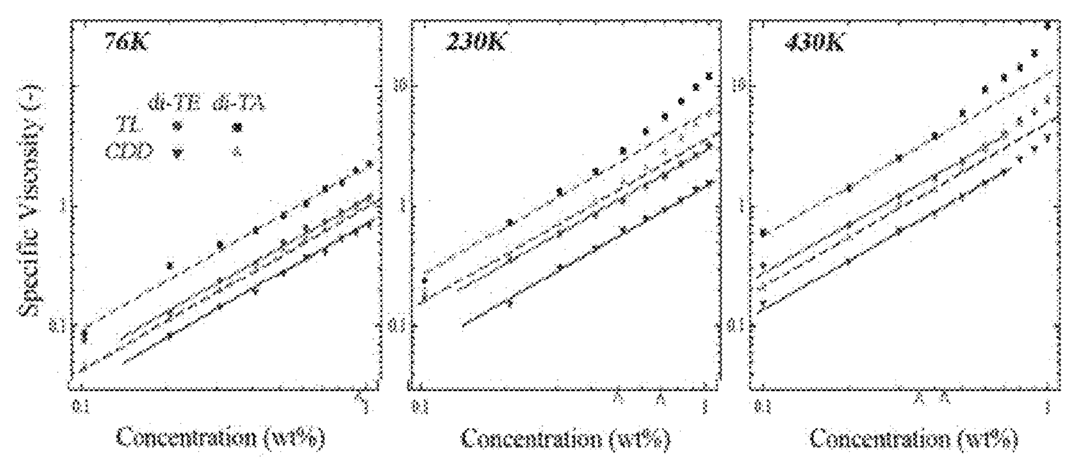
FIG. 25 shows the concentration dependence of specific viscosity of solutions of telechelic 1,4- PBs with non-associative and associative chain ends (N=4) as a function of Mw: from left to right, 76,000 g/mol, 230,000 g/mol, and 430,000 g/mol. The overlap concentration of the tertbutyl ester form of each polymer is indicated by the marks on the concentration axis, circles and squares for tetralin (TL) and triangles for 1-chlorododecane (CDD); for 76K di-TE in CDD c*=1.4 wt % (offscale). Solid lines indicate linear regression from 0.2 wt % to 1.5c* for di-TE; dashed lines correspond to the solid line vertically shifted to the linear portion of the di-TA data: red for TL and blue for CDD.

While the values of $\eta_{sp}$ of three tent-butyl ester-terminated polymers in both CDD and TL showed a nearly linear dependence on polymer concentration, the CDD and TL solutions of the three carboxyl-terminated polymers (76K, 230K and 430K di-TA 1,4-PBs) exhibited nonlinear increases of $\eta_{sp}$ with concentration, and the extent of such non-linearity was found positively correlated with the $M_w$ of polymer backbone (FIG. 24). In accord with the observation that associative polymers with 1 and 2 carboxyl groups at their ends have less effect on viscosity, comparison of the three 230K carboxyl-terminated 1,4-PBs with N=1, 2 and 4 shows that the non-linear increase of $\eta_{sp}$ with polymer concentration was obvious only in the case of N=4 (FIG. 25).

Example 18

Shear-Thinning Behavior of Solutions of Carboxyl-Terminated Polymers

Figure 33:
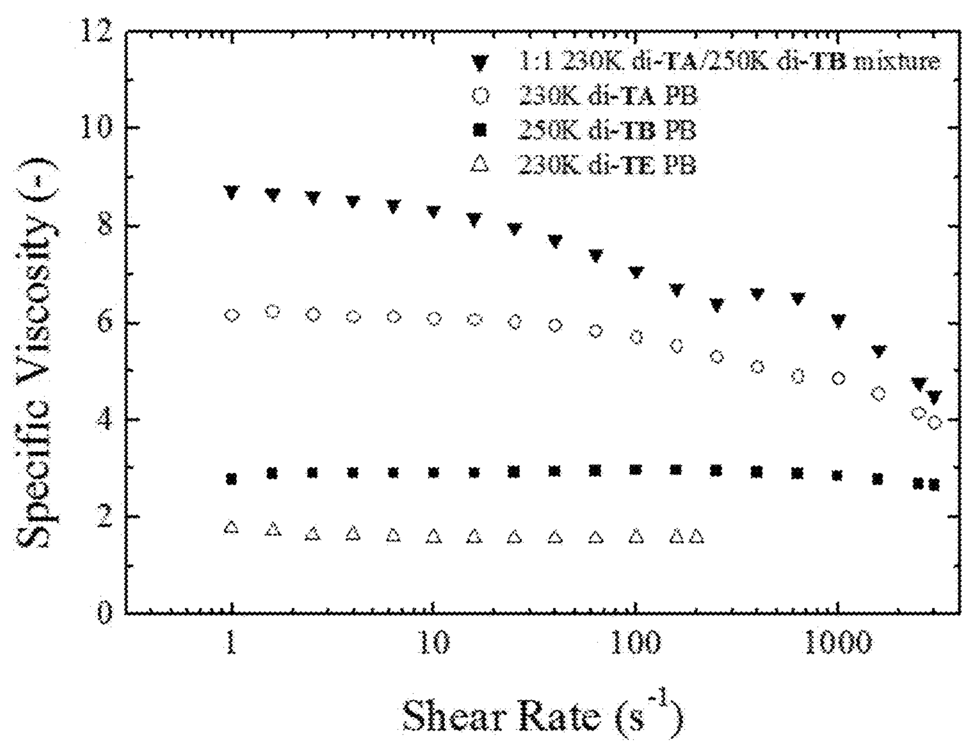
FIG. 33 shows a plot of specific viscosity (25° C.) of 1 wt % CDD solutions of 230K di-TE 1,4-PB, 230K di-TA 1,4-PB, 250K di-TB 1,4-PB, and the 1:1 (w/w) mixture of 230K di-TA 1,4-PB and 250K di-TB 1,4-PB at shear rates 1-3000 $s^{-1}$.
Figure 34:
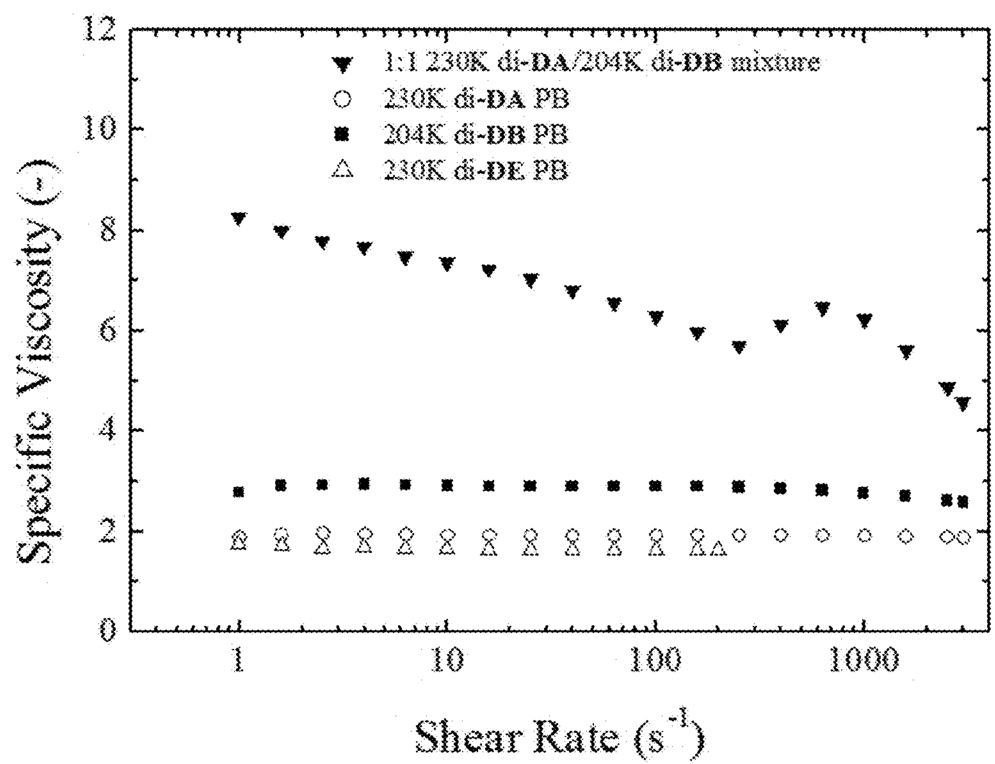
FIG. 34 shows a plot of specific viscosity (25° C.) of 1 wt % CDD solutions of 230K di-DE 1,4-PB, 230K di-DA 1,4-PB, 250K di-DB 1,4-PB, and the 1:1 (w/w) mixture of 230K di-DA 1,4-PB and 250K di-DB 1,4-PB at shear rates 1-3000 $s^{-1}$.

The onset and magnitude of shear-thinning can depend on the molecular weight and concentration of polymer. Solutions of 76K di-TA 1,4-PB showed negligible shear-thinning (up to 3000 $s^{-1}$) (in either CDD or TL, FIGS. 33 and 34, respectively). In the case of 230K di-TA 1,4-PB, its CDD and TL solutions showed shear-thinning at 1 wt %, with onsets in the range 10-100 $s^{-1}$. With decreasing concentration, the magnitude of shear thinning decreased and the shear rate required to elicit it increased (e.g., relative to the 1 wt % solution, at 0.7wt %, the extent of shear-thinning observed in both CDD and TL was less significant and the onset shifted to >100 $s^{-1}$) (FIGS. 33 and 34). Similar trends were observed for solutions of 430K di-TA 1,4-PBs, with greater extent of shear-thinning and onset of shear-thinning at lower shear rates compared to their 76K and 230K counterparts (in both CDD and TL, FIGS. 33 and 34, respectively).

Figure 26A:
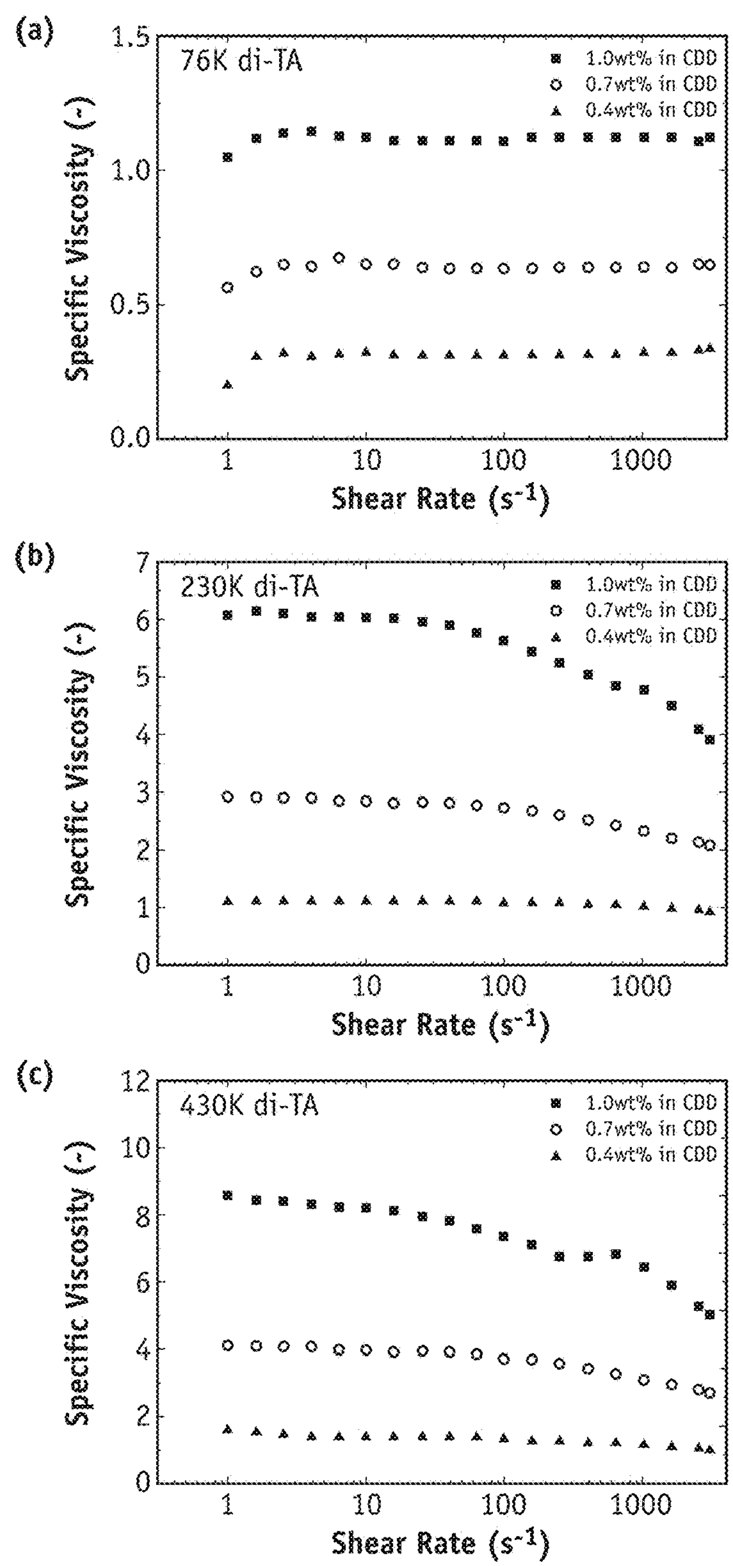
FIG. 26A and FIG. 26B show graphs depicting shear-thinning behavior of CDD solutions and TL solutions.
Figure 26B:
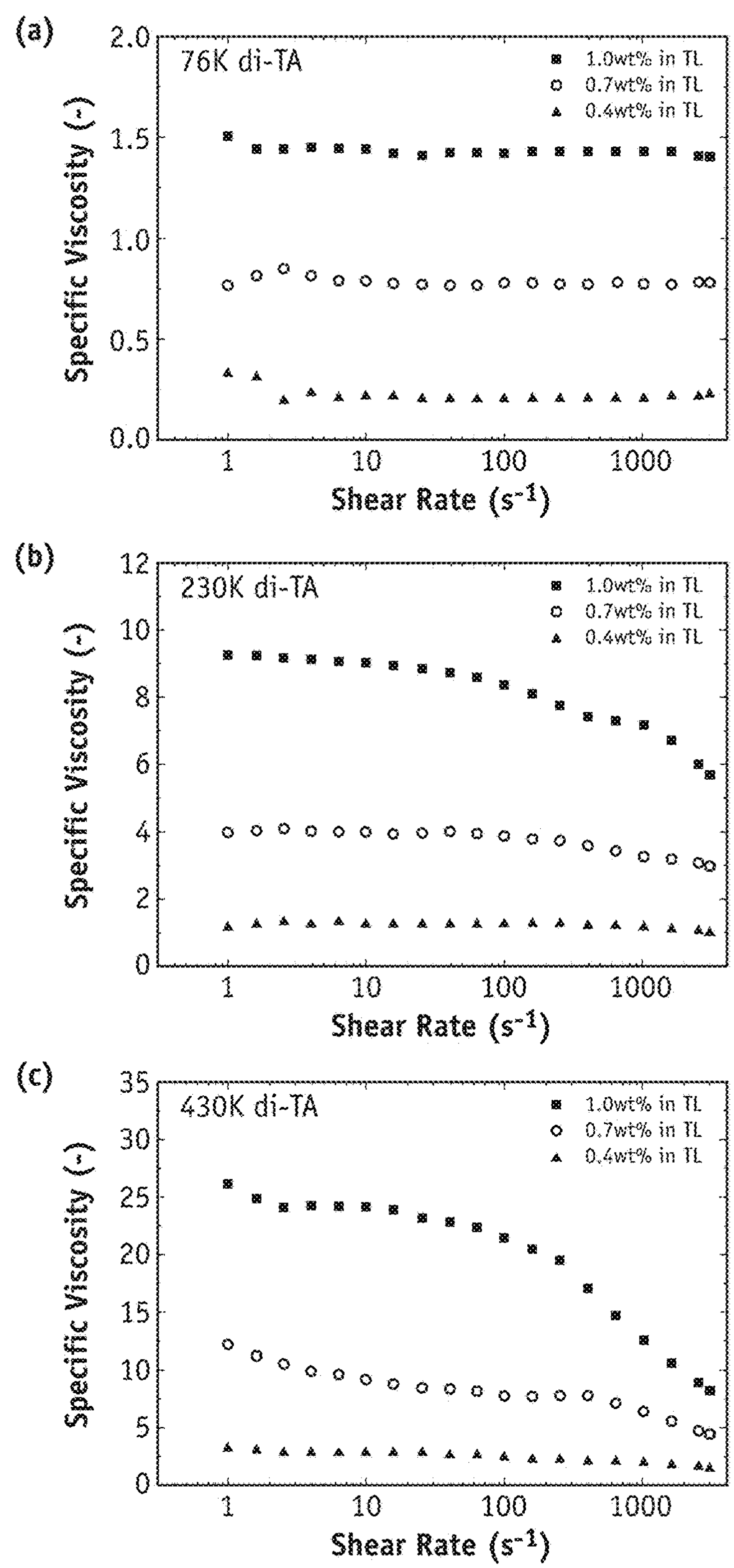

An interesting shear-thickening feature followed by further shear-thinning was observed for 430K di-TA 1,4-PB at 1 wt % in CDD and 0.7wt % in TL (see FIGS. 26A and 26B). The shear-thickening appeared at a higher shear rate in CDD than in TL (shear rates between 250 and 1000 $s^{-1}$ in FIG. 26, compared to 160 and 630 $s^{-1}$ in FIG. 26B).

Example 19

$^1$H NMR Study on Complementary End-Association in Deuterated Chloroform $^1$H NMR spectroscopy has been widely used to study the association of hydrogen-bonding-based hetero-complementary associative motifs in non-polar deuterated solvents (e.g., $CDCl_3$) because the resultant hydrogen bonds can cause significant changes in electron environments surrounding protons participating complementary associations; consequently, measurable changes in chemical shifts of those protons can be observed as the results of such complementary associations [Ref 17-23]. This technique was adopted to investigate if the three pairs of hetero-complementary associative groups (THY/DAAP, HR/CA, and TA/TB) can perform complementary association in $CDCl_3$ at room temperature when attached to chain ends of 1,4-PB of $M_w$~10,000-50,000 g/mol, which was chosen to keep signals of end-groups recognizable.

$^1$H NMR Study of Hetero-Complementary End-Association. $^1$H NMR study of hetero-complementary end-association of telechelic 1,4-PB chains was carried out at a total polymer concentration of ~1 wt % in deuterated chloroform ($CDCl_3$) at room temperature. $^1$H NMR samples of individual telechelic associative polymers were prepared by combining polymer and $CDCl_3$ at a polymer concentration ~1 wt % in 20 mL scintillation vials, which were placed on a Wrist-Action Shaker (Burrell Scientific) for up to 16 h to allow the polymer to completely dissolve. $^1$H NMR samples of complementary polymer pairs were prepared by mixing ~1 wt % $CDCl_3$ solutions of their corresponding polymers in 20 mL scintillation vials in desired end-group ratios, except for the 1:1 (w/w) mixture of 24K di-TA/22K di-TB 1,4-PBs, of which the $^1$H NMR sample was prepared by combining the two polymers at a 1:1 weight ratio and $CDCl_3$ at a total polymer concentration ~1 wt % in a 20 mL scintillation vial that was placed on a Wrist-Action Shaker (Burrell Scientific) for 16 h at room temperature.

The investigation of hetero-complementary end-association by $^1$H NMR spectroscopy was carried out by measuring the $^1$H NMR spectra of individual telechelic associative polymers and those of complementary polymer pairs, followed by comparing signals of protons participating hetero-complementary end-association in $^1$H NMR spectra of individual polymer solutions to those of the same protons in the spectra of corresponding polymer mixtures. Due to the inherent detection limit of $^1$H NMR spectroscopy, either changes in chemical shifts or the disappearance of the signals of protons participating hetero-complementary association of polymer end-groups were followed as the evidence of end-association, depending on the sizes of polymer backbones. For telechelic associative polymers of $M_w$<50,000 g/mol, characteristic shifts of signals of associative end-groups were followed; for those of $M_w$>200,000 g/mol, the focus was whether the mixing of complementary partners caused the disappearance of the signals of protons participating hetero-complementary association of polymer end-groups.

$^1$H NMR spectra were obtained using a Varian Inova 500 spectrometer (500 MHz); all spectra were recorded in $CDCl_3$, acetone-$d_6$, and DMSO-$d_6$ at ambient temperature. Chemical shifts were reported in parts per million (ppm, $\delta$) and were referenced to residual solvent resonances. Polymer molecular weight measurements were carried out in tetrahydrofuran (THF) at 35° C. eluting at 0.9 mL/min (pump: Shimadzu LC-20AD Prominence HPLC Pump) through four PLgel 10-μm analytical columns (Polymer Labs, $10^6$ to $10^3$ Å in pore size) connected in series to a DAWN EOS multi-angle laser light scattering (MALLS) detector (Wyatt Technology, Ar laser, λ=690 nm) and a Waters 410 differential refractometer detector (λ=930 nm).

Figure 27:
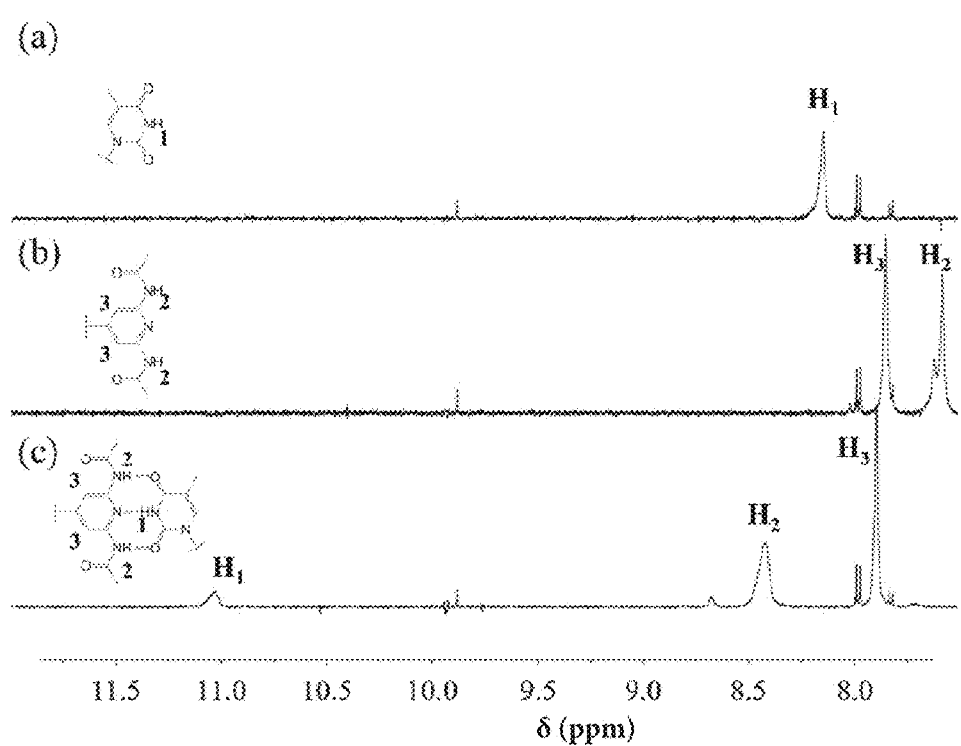
FIG. 27 shows expanded $^1H$ NMR (500 MHz) spectra of $CDCl_3$ solutions of telechelic polymers that have a 10,000 g/mol 1,4-PB backbone with end groups.

The results of each pair are described as follows:

THY (thymine)/DAAP (diacetamidopyridine): FIG. 27 shows the expanded $^1$H NMR spectra (500 MHz, $CDCl_3$) of 10K di-THY 1,4-PB 5, 10K di-DAAP 1,4-PB 14, and the mixture of 5 and 14 in a 1:2 wt ratio. In the absence of its complementary unit, the signal of the imide proton of THY end groups was observed at 8.05 ppm (FIG. 27). Upon addition of ~2 eq of DAAP end groups, a large downfield shift to 11.05 ppm accompanied by signal broadening was observed (FIG. 27). Similar shift was also observed for the signal of the amide protons of DAAP end groups (from 7.58 to 8.42 ppm, (b) and (c) in FIG. 27). The observed association-induced shift (~2.9 ppm) of the imide proton signal of THY end groups is in good agreement with the literature [Ref 18, 19, 21], and it indicates that THY and DAAP end groups could find and associate with each other in $CDCl_3$.

Figure 28:
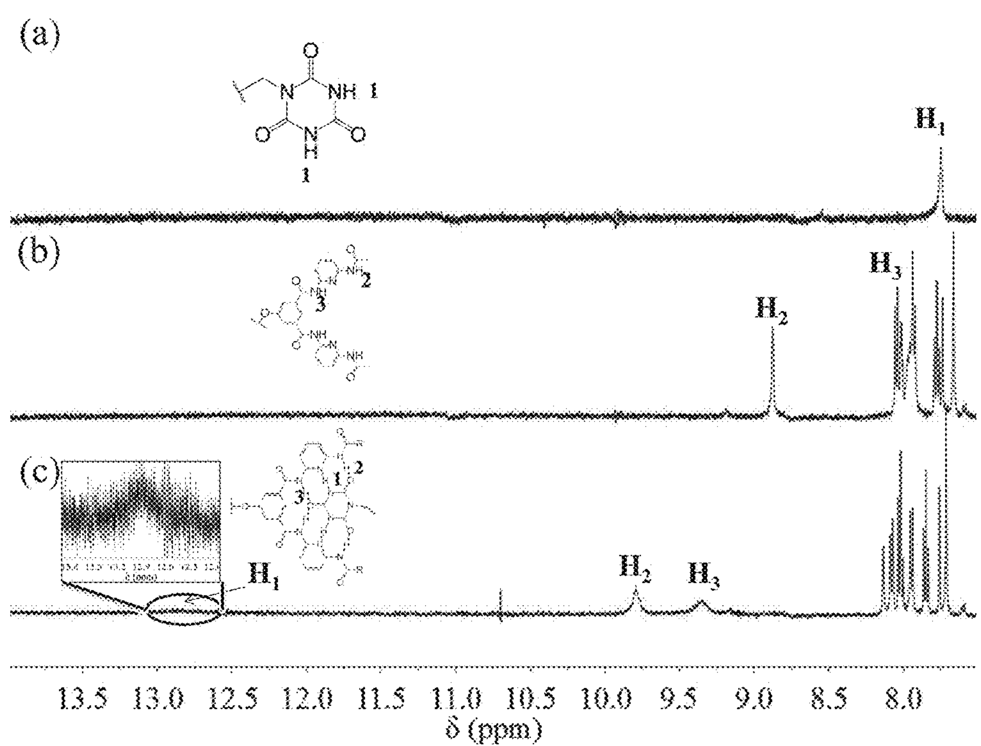
FIG. 28 shows expanded $^1H$ NMR (500 MHz) spectra of $CDC1_3$ solutions of telechelic polymers.

HR (Hamilton receptor)/CA (cyanuric acid): FIG. 28 shows the expanded $^1$H NMR spectra (500 MHz, $CDCl_3$) of 50K di-CA 1,4-PB, 24K di-HR 1,4-PB, and the mixture of 50K di-CA 1,4-PB and 24K di-HR 1,4-PB in a 1:1.4 wt ratio. In the absence of its complementary unit, the signal of the imide protons of the CA end group was observed at 7.75 ppm (FIG. 28). A very large downfield shift to 12.90 ppm accompanied by peak broadening was observed (FIG. 28) as ~2 eq of HR end groups were added. Similar to the case of THY/DAAP pair, the observed association-induced shift (~5.2 ppm) of the signal of the imide protons of CA units indicates that CA and HR end groups could also find and associate with each other in $CDCl_3$. The magnitude of the observed shift is in good agreement with the literature [Ref 24-29].

Figure 29:
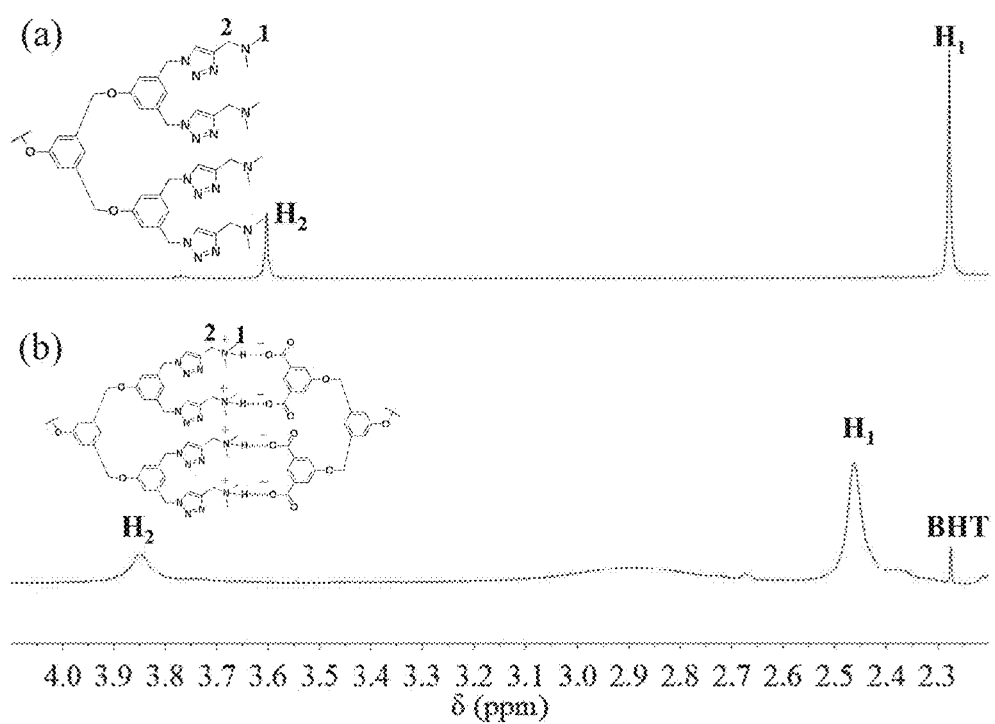
FIG. 29 shows expanded $^1H$ NMR (500 MHz) spectra of $CDCl_3$ solutions of telechelic polymers.

TA/TB: Due to the fact that 24K di-TA 1,4-PB is not soluble in $CDCl_3$, $^1$H NMR study was only performed on 22K di-TB 1,4-PB and its 1:1 (w/w) mixture with 24K di-TA 1,4-PB and monitored the association by tracking the shifts of the signals of the tertiary amine end group ($H_1$ and $H_2$, see FIG. 29). The results are shown in FIG. 29. It was found that the presence of 22K di-TB 1,4-PB assisted the dissolution of 24K di-TA 1,4-PB in $CDCl_3$ and thus rendered the $^1$H NMR experiment possible. The signals of $H_1$ and $H_2$ were observed at 2.28 and 3.60 ppm respectively in the absence of 24K di-TA 1,4-PB (FIG. 29). The addition of 24K di-TA 1,4-PB resulted in shifts of both signals: The signals of $H_1$ and $H_2$ shifted from 2.28 and 3.60 to 2.46 and 3.85 ppm, respectively. The observed shifts indicate the association of TA and TB end groups.

Figure 30:
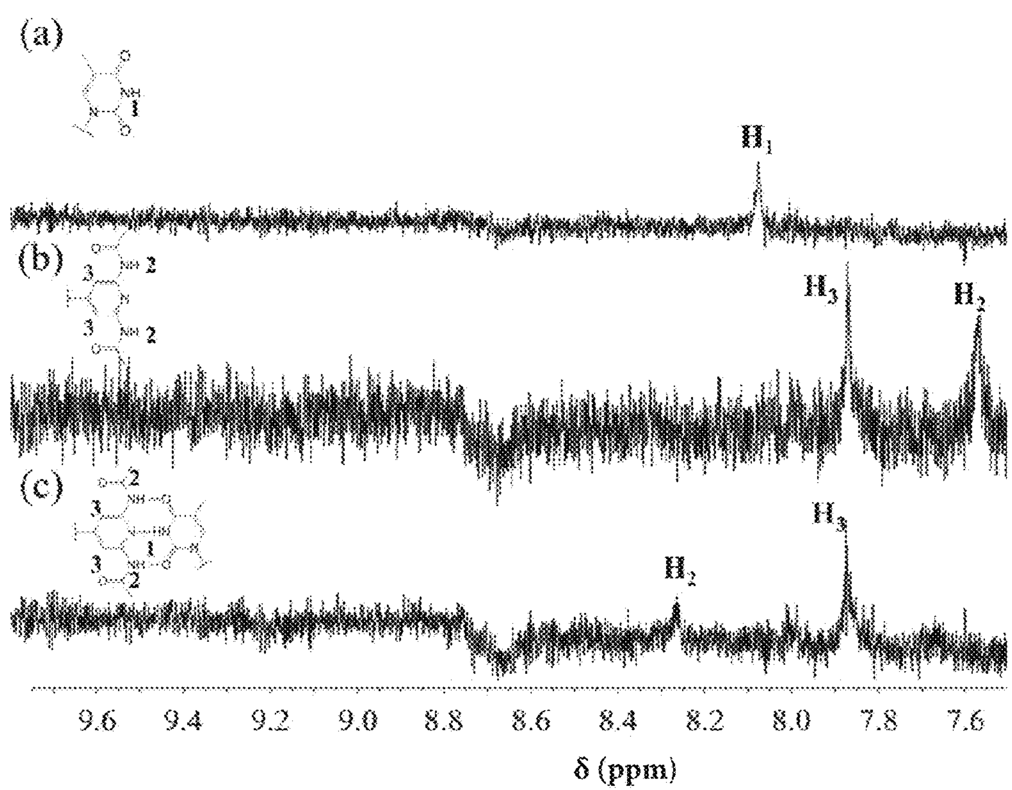
FIG. 30 shows expanded $^1H$ NMR (500 MHz) spectra of $CDCl_3$ solutions of telechelic polymers.
Figure 31:
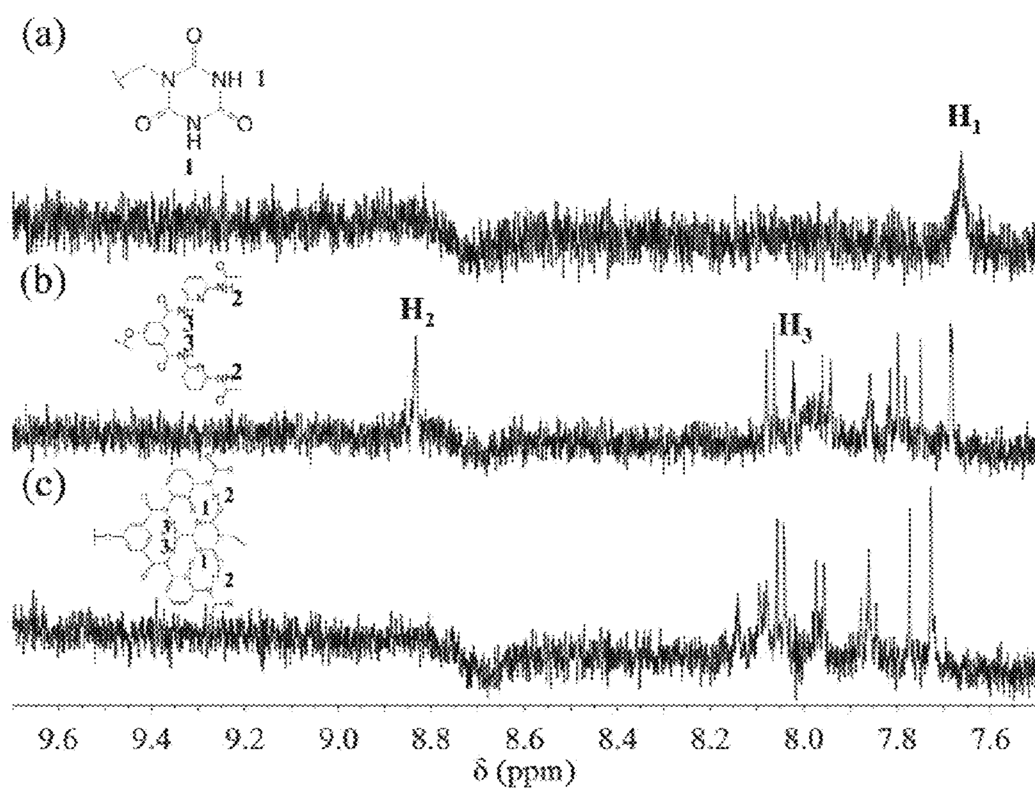
FIG. 31 shows expanded $^1H$ NMR (500 MHz) spectra of $CDCl_3$ solutions of telechelic polymers.
Figure 32:
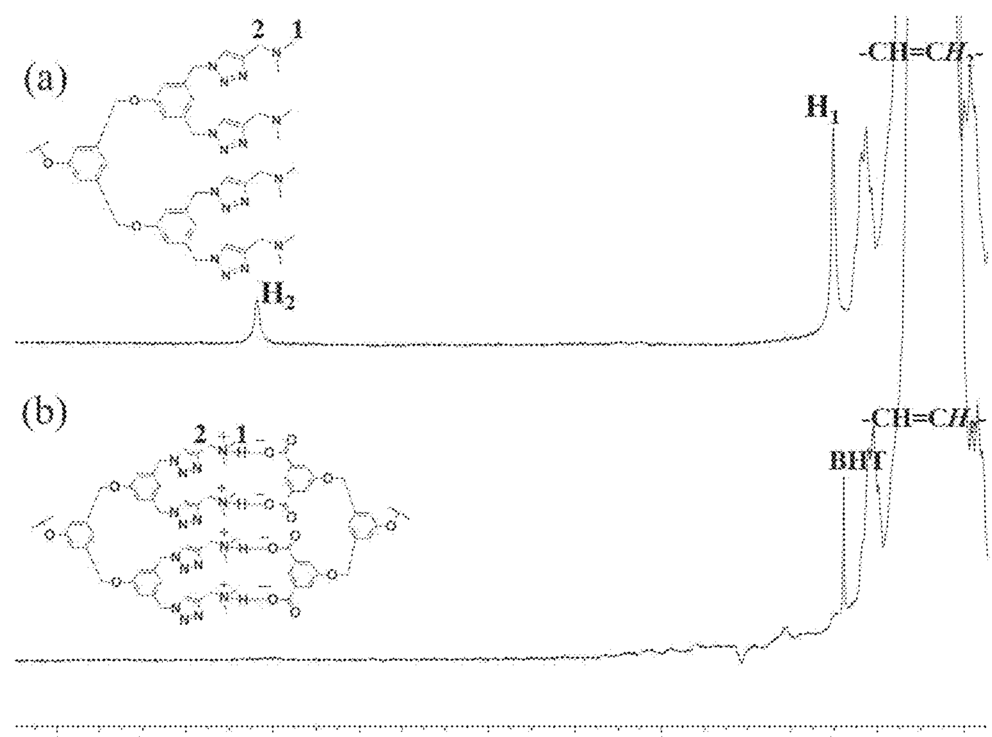
FIG. 32 shows expanded $^1H$ NMR (500 MHz) spectra of $CDCl_3$ solutions of telechelic polymers.

In order to determine if the three pairs of complementary associative groups were still effective when attached to chain ends of 1,4-PBs of $M_w$~200,000-300,000 g/mol, $^1$H NMR analysis of the corresponding polymers and the complementary pairs was performed at ~1 wt % in $CDCl_3$ at room temperature. It was found that in this case, signals of polymer end groups were barely recognizable due to their low contents in the test samples. In addition, association-induced signal broadening could cause signals of protons involved in complementary association to appear vanished. Nevertheless, evidence of end-association was observed in all three pairs of telechelic associative polymers of $M_w$~200,000 g/mol. In the case of the THY/DAAP pair, the signal of the imide proton of THY end group of 288K di-THY 1,4-PB was observed at 8.05 ppm with a very low intensity (FIG. 30), and it was found disappeared in the $^1$H NMR spectrum of the 1:2 (w/w) mixture of 288K di-THY and 219K di-DAAP 1,4-PBs. The disappearance of the signal indicates that THY and DAAP end groups could find and bind with each other in $CDCl_3$, even when attached to chain ends of polymers of $M_w$~200,000 g/mol. Likewise, the signal of imide protons of the CA end groups of 200K di-CA 1.4-PB, along with those of the amide protons of the HR end groups of 240K di-HR 1,4-PB, were not observable in the $^1$H NMR spectrum of the 1:1 (w/w) mixture of 200K di-CA and 240K di-HR 1,4-PBs (FIG. 31). Signals of the TB end groups of 250K di-TB 1,4-PB were also found disappeared after the polymer was mixed with 230K di-TA 1,4-PB in a 1:1 wt ratio (FIG. 32). These results suggest that all three complementary associative pairs can provide sufficient strength of end-association for telechelic 1,4-PB chains of $M_w$~200,000 g/mol to form supramolecular aggregates stable at least on the time scale of $^1$H NMR spectroscopy.

Example 20

Shear Viscometric Study of Complementary End-Association

Shear viscometry was used as a complementary measure of $^1$H NMR study to evaluate the strength of hetero-complementary pairs. 1-Chlorododecane (CDD) was chosen as the solvent due to its low interference with hydrogen bonding, low volatility at room temperature, high solvency for 1,4-PB backbones, and being a pure solvent. For all of the four hetero-complementary pairs (THY/DAAP, HR/CA, DA/DB, and TA/TB), telechelic polymers of $M_w$~200,000 g/mol were used. In addition to CDD, dodecane and Jet-A were also used in shear viscometric study of THY/DAAP and HR/CA pairs, respectively. Except for di-DA and di-TA 1,4-PBs, polymer solutions in 1-chlorododecane were prepared by combining polymer and solvent at a weight fraction of polymer=1 wt % in clean 20 mL scintillation vials, which were placed on a Wrist-Action Shaker (Burrell Scientific) at room temperature for up to 16 h to allow complete dissolution of polymers. 1 wt % CDD solutions of di-DA and di-TA 1,4-PBs of $M_w$~200,000 g/mol were prepared according to the procedure described in Examples 2-5. For each hetero-complementary associative pair, 1 wt % solutions of polymer mixture were prepared by mixing 1 wt % solutions of the individual polymers in desired weight ratios in 20 mL scintillation vials at room temperature. Shear viscosity of polymer solutions were measured according to the procedure described herein (see, e.g. Examples 16-17).

Figure 43:
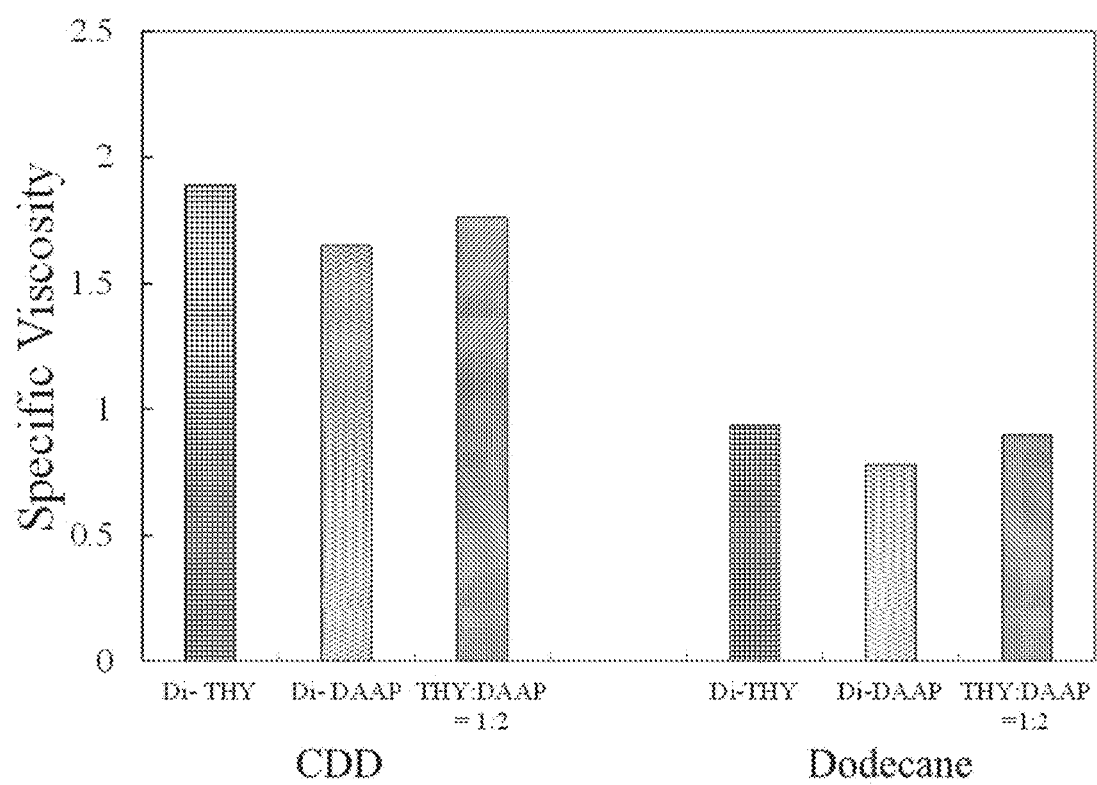
FIG. 43 shows graphs of specific viscosity (25° C.) of 1 wt % 1-chlorododecane (CDD) and dodecane solutions of 288K di-THY 1,4-PB, 219K di-DAAP 1,4-PB, and 1:2 (w/w) mixture of 288K di-THY 1,4-PB and 219K di-DAAP 1,4-PB.
Figure 44:
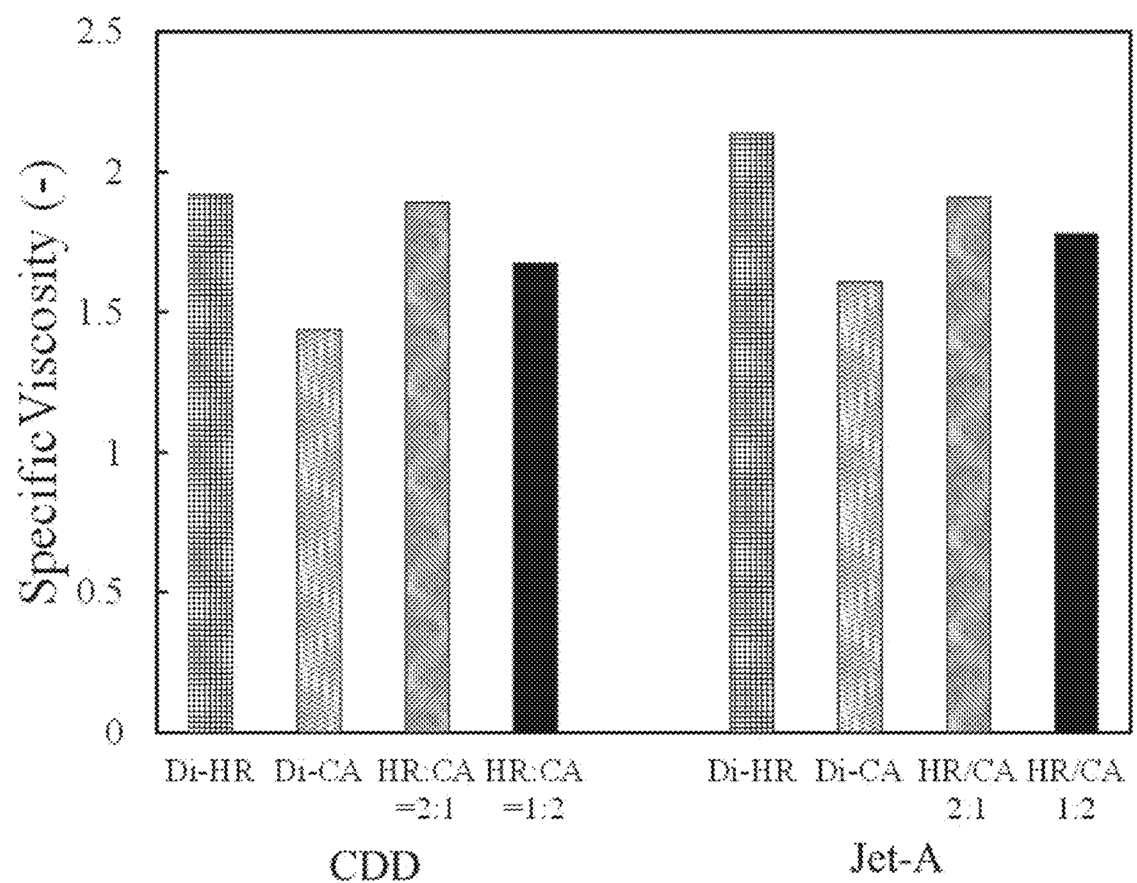
FIG. 44 shows a graph of Specific viscosity (25° C.) of 1 wt % 1-chlorododecane (CDD) and Jet-A solutions of 240K di-HR 1,4-PB, 200K di-CA 1,4-PB, and 1:2 and 2:1 (w/w) mixtures of 240K di-HR 1,4-PB and 200K di-CA 1,4-PB.

Steady-flow shear viscometry at 25° C. was used in parallel with $^{1}$H NMR spectroscopy to investigate the ability of OHB-based and CAHB-based hetero-complementary associative pairs to afford supramolecular aggregates of telechelic 1,4-PBs of $M_w \geq 200,000$ g/mol that are stable enough at low-moderate shear rates to provide modulation of rheological properties. In other words, it is expected that at the same concentrations, the solution of complementary polymer pair would be more viscous than those of individual components. To avoid possible complications arising from the multi-component nature of fuels, 1-chlorododecane (CDD) was chose as the model solvent, and prepared all polymer solutions at 1 wt % in CDD. In both THY/DAAP and HR/CA complementary polymer pairs, none of them showed the expected enhancement in shear viscosity due to complementary end-association (FIGS. 43 and 44). To find out if the comparatively polar CDD (dielectric constant=4.2 at 25° C.) interferes with THY/DAAP and HR/CA complementary interactions, the experiments were repeated in less polar solvents: Dodecane (dielectric constant=2.0 at 20° C.) and Jet-A (dielectric constant=1.8 at 20° C.) were used for THY/DAAP pair and HR/CA pair, respectively. As shown in FIGS. 43 and 44, the expected enhancement in shear viscosity was still absent in both cases when less polar solvents were used.

Figure 45:
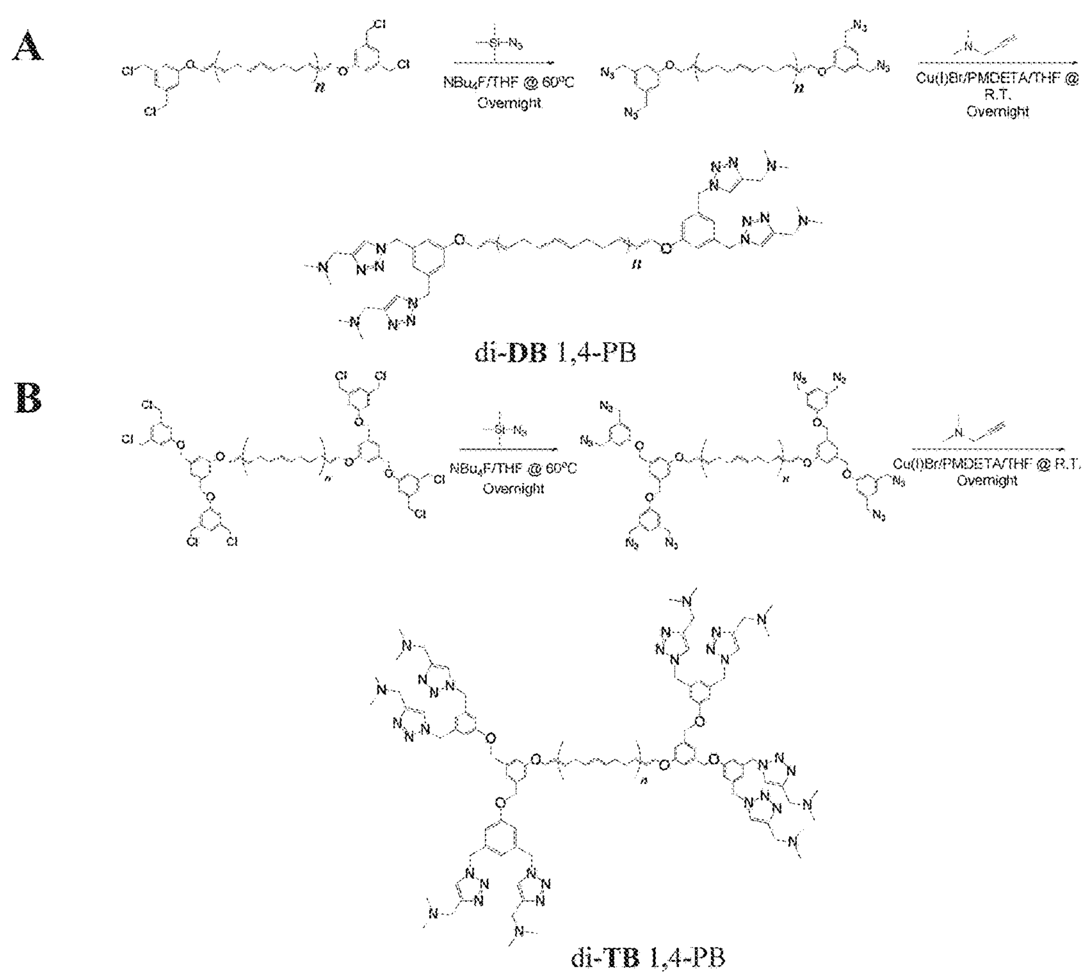
FIG. 45 shows a schematic illustration of a synthesis of di-DB and di-TB 1,4-PBs via two-stage, post-polymerization end-functionalization reaction.

Different results were observed in the case of TA/TB pair. The 1:1 (w/w) mixture of 1 wt % CDD solutions of 230K di-TA and 250K di-TB 1,4-PBs was found considerably more viscous than both solutions (FIG. 33), and the observed enhancement in viscosity illustrated that the strength of TA/TB complementary end-association was sufficient to drive the formation of supramolecules stable at shear rates investigated in the present study. As discussed in above, strong self-association of 230K di-TA 1,4-PB resulted in significant difference in shear viscosity between the 1 wt % CDD solution of 230K di-TA 1,4-PB and that of the non-associative pre-polymer 230K di-TE 1,4-PB (FIG. 33). It was observed that the addition of equal amount (by weight) of 250K di-TB 1,4-PB further enhanced the shear viscosity. What is also worth noting is the shear-thinning behavior observed in the 1 wt % CDD solution of 1:1 mixture of 230K di-TA and 250K di-TB 1,4-PBs, which is a feature shared by aqueous solutions of water-soluble telechelic associative polymers [Ref 30-33]. As for the 1 wt % CDD solution of 250K di-TB 1,4-PB, even though GPC-LS analysis confirmed no crosslinking of polymer backbone took place during end-functionalization with tertiary amine groups, it was found that it was more viscous than that of the non-associative 230K di-TE 1,4-PB. Aggregation of triazole units resulting from the end-functionalization reaction (FIG. 45) may contribute to the above difference in shear viscosity [Ref 34].

With the positive results of the pair of 230K di-TA/250K di-TB 1,4-PBs, the viscometric study was extended further to the complementary DA/DB association as an attempt to approach the limit of the strength of carboxyl/tertiary amine association. FIG. 34 shows the results of 1 wt % CDD solutions of the corresponding polymers (230K di-DE, 230K di-DA, and 250K di-DB 1,4-PBs) and the 1:1 (w/w) DA/DB mixture. Surprisingly, strong enhancement in shear viscosity induced by complementary DA/DB association was still observed in the 1:1 mixture. While only insignificant difference in shear viscosity was observed between the 1 wt % CDD solution of 230K di-DA 1,4-PB and that of the non-associative 230K di-DE 1,4-PB, the considerable increase in viscosity due to DA/DB complementary end-association reaffirmed the promising strength of carboxyl/tertiary amine interaction.

Figure 35:
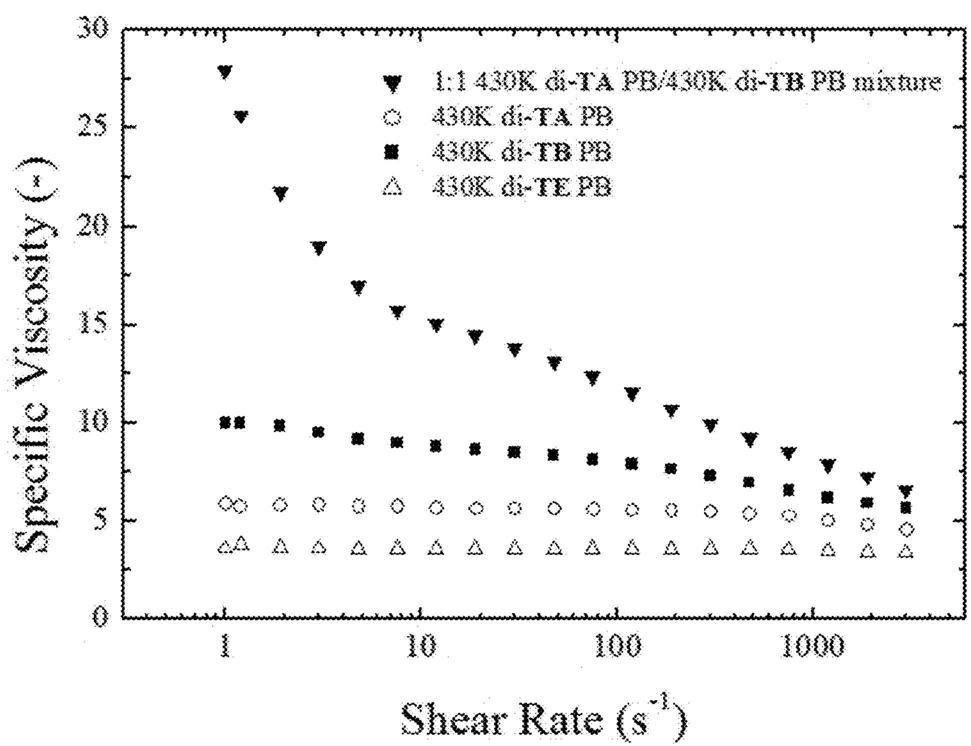
FIG. 35 shows a plot of specific viscosity (25° C.) of 1 wt % Jet-A solutions of 430K di-TE 1,4-PB, 430K di-TA 1,4-PB, 430K di-TB 1,4-PB, and the 1:1 (w/w) mixture of 430K di-TA 1,4-PB and 430K di-TB 1,4-PB at shear rates 1-3000 $s^{-1}$.

The final part of the shear viscometric study of carboxyl/tertiary amine pairs was to investigate if the TA/TB complementary end-association was effective in Jet-A when the $M_w$ of the 1,4-PB backbone increased to 430,000 g/mol, and the results are shown in FIG. 35. Strong enhancement in shear viscosity due to TA/TB complementary association was observed: At 1 wt %, the 1:1 mixture of 430K di-TA and 430K di-TB 1,4-PBs in Jet-A was found significantly more viscous than the Jet-A solutions of the individual polymers. These results indicate that when used in dendritic configurations, carboxyl/tertiary amine pair is suitable for building complementary pairs of telechelic associative polymers as mist-control additives for fuels.

Example 21

A.1 Measurements of Polymer Molecular Weights

The determination of molecular weight and molecular weight distribution is of central interest in polymer analysis, as the molecular weight of a polymer directly relates to its physical properties.[Ref 35] Take telechelic associative polymers as mist-control additives for kerosene for example, their efficacy in providing fire protection and resistance to shear degradation rely on proper choice of backbone length, which falls in the range $M_w = 5\times10^5$-$10^6$ g/mol. Table 8, which shows molecular weight measurement methods, summarizes common characterization methods for determining different average molecular weights (MWs) and molecular weight distributions (MWDs) of polymers [Ref 16, 35, 36].

TABLE 8

| Method | Absolute | Relative | $M_n$ | $M_w$ | Range (g/mol) |
|---|---|---|---|---|---|
| Proton NMR end-group analysis | × | | × | | $M_n < 2.5 \times 10^4$ |
| Vapor pressure osmometry | × | | × | | $M_n < 3 \times 10^4$ |
| Ebulliometry | × | | × | | $M_n < 3 \times 10^4$ |
| Light Scattering (LS) | × | | | × | $10^4 < M_w \times 10^7$ |
| Intrinsic Viscosity | | × | | | $M < 10^6$ |
| GPC[a] with concentration detectors | | × | × | × | $10^3 < M_w \times 10^7$ |
| GPC[a] with concentration and LS detectors | × | | × | × | $10^4 < M_w < 10^7$ |
| MALDI-TOF-MS[b] | × | | × | × | $M < 3 \times 10^4$ |

[a]GPC, gel permeation chromatography.

[b]MALDI-TOF-MS, matrix-assisted laser desorption/ionization time-of-flight mass spectroscopy Among the methods in Table 8, GPC with concentration and LS (light scattering) detectors (referred to as "GPC-LS" herein) was chosen in the present study for determining MW and the MWD of telechelic associative 1,4-PBs due to the following reasons: (1) it allows measurements of absolute weight-average MWs and corresponding MWDs; (2) it has a wide applicable range ($10^4$-$10^7$ g/mol) which covers the MW range of interest ($5\times10^5$-$10^6$ g/mol) for mist-control applications; (3) it is comparatively easy to implement. Although MALDI-TOF-MS is capable of measuring absolute MWs and MWDs of polymers with more accuracy than GPC-LS, it is not as useful in analyzing polymers of MW>30,000 g/mol [Ref 37]; selection of matrix compounds, sample preparation and interpretation of the mass spectra become difficult in the case of synthetic polymers of MW>30,000 g/mol and thus detract from the benefits associated with the unrivalled accuracy provided by MALDI-TOF-MS [Ref 35, 36, 38]. Given that many associative polymers as herein described are telechelic 1,4-PBs of MW>>30,000 g/mol, it is clear that GPC-LS can be a better option to measure MWs than MALDI-TOF-MS in the present study. The same rationale also applies to the other competing method, proton NMR end-group analysis, which has been widely used in determining number-average MWs (i.e., Mn) of synthetic polymers via comparing the integration values of signals of backbone protons to those of the end-group protons [Ref 35, 39, 40]. The implementation of proton NMR end-group analysis can be straightforward: the $M_n$ value of a polymer can be derived from its $^1$H NMR spectrum without any additional experimental work. However, the determination of $M_n$ by proton NMR end-group analysis for polymers of MW>25,000 g/mol loses its accuracy due to a diminished resolution resulting from the inherent detection limit of proton NMR spectroscopy, and the uncertainty in the Mn values becomes greater for polymers of higher MWs [Ref 35]. The other issue of this method is that it lacks the ability to measure molecular weight distributions (MWDs) of polymers. These shortcomings render proton NMR end-group analysis a less effective method to characterize high-MW (i.e., MW>100,000 g/mol) telechelic 1,4-PBs as potential mist-control additives for kerosene.

In the case that associative groups are attached onto the chain ends of telechelic 1,4-PBs, measuring of MWs and MWDs of such polymers by GPC-LS becomes challenging, since the associative chain ends could possibly interact with the column packing, or drive the formation of supramolecular aggregates in THF, leading to false reading of MWs and MWDs. It was found that compared to the non-associative 230K di-TE 1,4-PB, the apparent $M_w$ of 230K di-TA 1,4-PB was found to behigher by 63% (see Table 9, which shows molecular weight and PDI (polydispersity index) data of tert-butyl ester- and carboxyl-terminated telechelic 1,4-PBs, and FIG. 23).

TABLE 9

| | | N = 1 | N = 2 | N = 4 | N = 8 | N = 4 |
|---|---|---|---|---|---|---|
| Before TFA Hydrolysis | $M_w$ (kg/mol)[a] | 226 | 230 | 230 | 207 | 430 |
| | PDI[b] | 1.43 | 1.53 | 1.50 | 1.43 | 1.49 |
| After TFA Hydrolysis | $M_w$ (kg/mol)[a] | 276 | 299 | 375 | 304 | 510 |
| | PDI | 1.56 | 1.73 | 1.72 | 1.51 | 1.61 |
| Increase in $M_w$ (%) | | 22.12 | 30.00 | 63.04 | 46.86 | 18.60 |

[a,b]determined by GPC-LS

Figure 36:
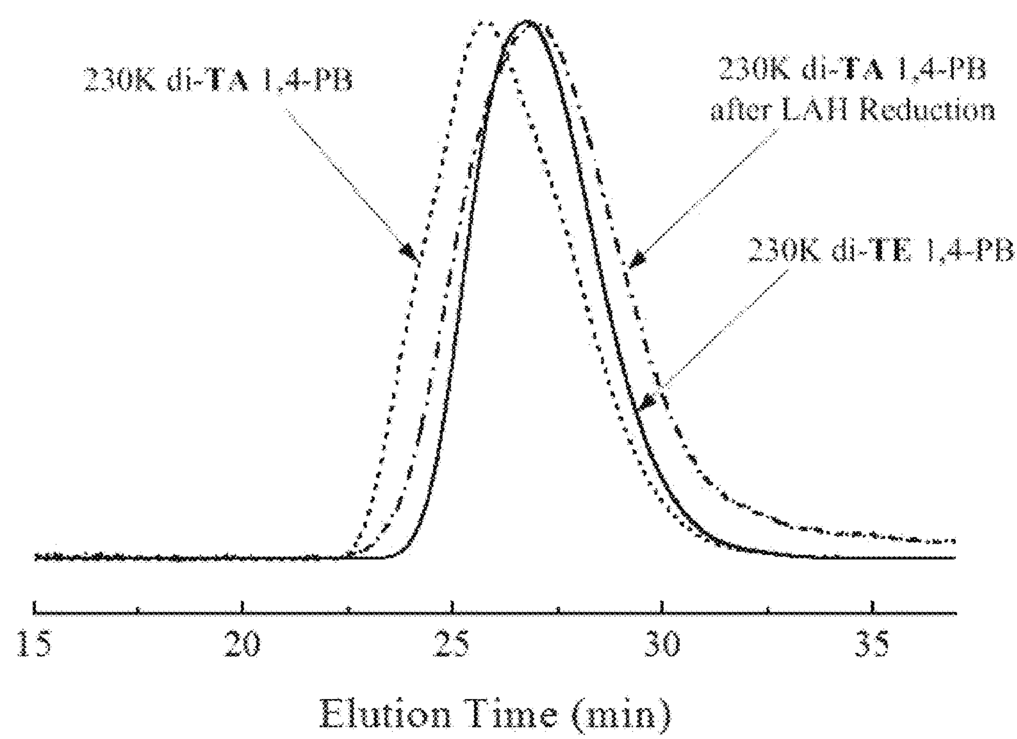
FIG. 36 shows GPC-LS (THF, 35° C.) traces of 230K di-TE 1,4-PB, 230K di-TA 1,4-PB and the resultant polymer of LAH reduction of 230K di-TA 1,4-PB.

It was hypothesized that the apparent increase in $M_w$ resulted from the aggregate of associative TA end groups in THF, rather than crosslinking of 1,4-PB backbone during TFA hydrolysis of tert-butyl ester groups. To test the hypothesis, 230K di-TA 1,4-PB was treated with $LiAlH_4$ in THF so as to reduce the highly associative carboxyl groups to less associative hydroxyl groups. The GPC-LS result of the resultant hydroxyl-terminated 230K telechelic 1,4-PB, as shown in FIG. 36, virtually overlaps with that of 230K di-TE 1,4-PB, although the former seems slightly broadened compared to the latter. Comparison of the three GPC-LS traces in FIG. 36 verified the hypothesis: the apparent increase in $M_w$ after TFA hydrolysis of 230K di-TE 1,4-PB was due to aggregation of associative TA end groups, since the increase in $M_w$ disappeared after the carboxyl groups on polymer chain ends were reduced to hydroxyl groups. It also suggests that the mild condition of TFA hydrolysis does not cause appreciable amount of crosslinking of 1,4-PB backbone. As for the broadening of GPC-LS trace of hydroxyl-terminated 230K telechelic 1,4-PB, it is thought to result from interaction of hydroxyl-terminated chain ends with column packing. The results in FIG. 36 also reveal the importance of interpreting GPC-LS results of telechelic associative polymers with scrutiny, since association of chain ends and chain-end/column interaction can both result in false reading of MWs and MWDs. In other words, using the non-associative forms of telechelic associative polymers in GPC-LS analysis yields more accurate information concerning the MWs and MWDs of polymer backbones on the condition that the transformation of associative chain ends to non-associative counterparts does not damage the backbones.

Example 22

Effect of COD Purity on the Proceeding of ROMP with CTAs

It was found that the purity of VCH (4-vinylcyclohexene)-free COD has a profound effect on the synthesis of telechelic 1,4-1,4-PBs via ROMP of COD using Grubbs II: peroxides and n-butanol (introduced during $BH_3$·THF treatment of COD according to the Macosko protocol) can also adversely affect the metathetical activity of Grubbs II by reacting with it and irreversibly transforming it into inactive species. In response to the issues associated with peroxides and n-butanol, a multi-stage process (Section 2.2.3) was developed to rigorously purify COD.

In particular, in an exemplary purification procedure, redistilled cis, cis-1,5-cyclooctadiene (COD, 72.3 g, 0.67 mol) was syringe-transferred to a 250 ml Schlenk flask in an ice bath at 0° C. under argon atmosphere. Under argon flow, 1M borane-THF complex in THF ($BH_3$·THF, 108 mL, 0.11 mol) was then slowly added into the flask over a 10-min period. The flask was taken out of the ice bath, and left to stir under argon atmosphere at room temperature for 2 h. THF was evaporated under reduced pressure at room temperature to an extent that the concentration of residual THF in the mixture was below 300 ppm (verified by $^1$H NMR analysis). The monomer was vacuum distilled from the mixture at 40° C., 100 mTorr into a 100 mL Schlenk flask (loaded with 9 g of MAGNESOL® xl and a magnetic stir bar) in a dry-ice tub. The mixture was stirred under argon atmosphere at room temperature overnight. The monomer was vacuum distilled again at 45° C. and 100 mTorr from the mixture into a 100 mL Schlenk flask (loaded with 10 g of calcium hydride ($CaH_2$) and a stir bar) in a dry-ice tub in order to remove moisture introduced by MAGNESOL® xl. After stirring at room temperature for 3 h under argon flow, the monomer was once again vacuum distilled (45° C., 100 mTorr) from the mixture into a 100 mL Schlenk flask in a dry-ice tub. After warmed to ambient temperature, the flask was sealed with a SUBA-SEAL® rubber septum while argon stream was flowing, and placed in a freezer at −30° C. for storage of purified COD (40.0 g, 55.3% yield). The purified monomer was vacuum-distilled again at 35° C. prior to use.

Figure 37:
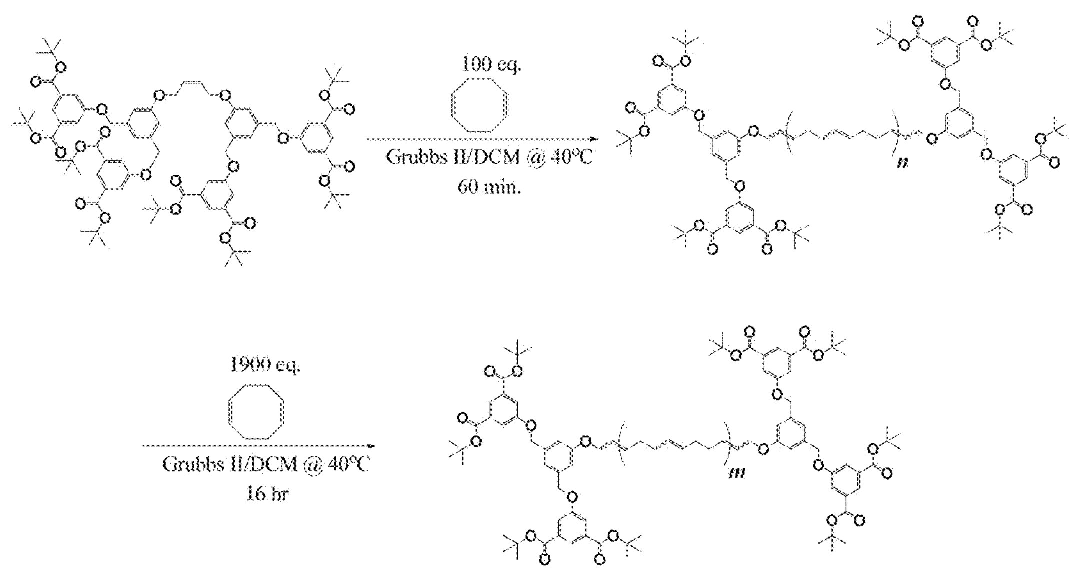
FIG. 37 shows a schematic illustration of a synthesis of di-TE 1,4-PB via two-stage ROMP of COD as the benchmark reaction for the influence of the purity of VCH-free COD.
Figure 46A:
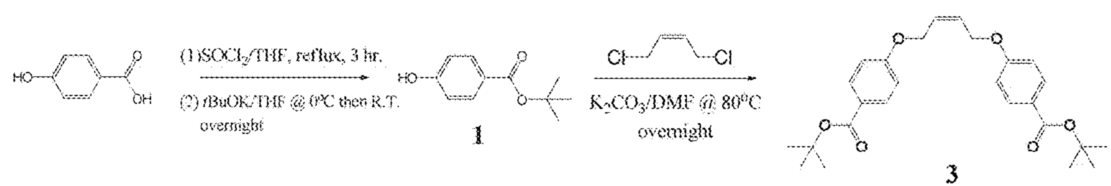
FIG. 46A and FIG. 46B show a schematic representation of a synthesis of bis-dendritic, tert-butyl ester-terminated chain transfer agents (CTA).
Figure 46B:
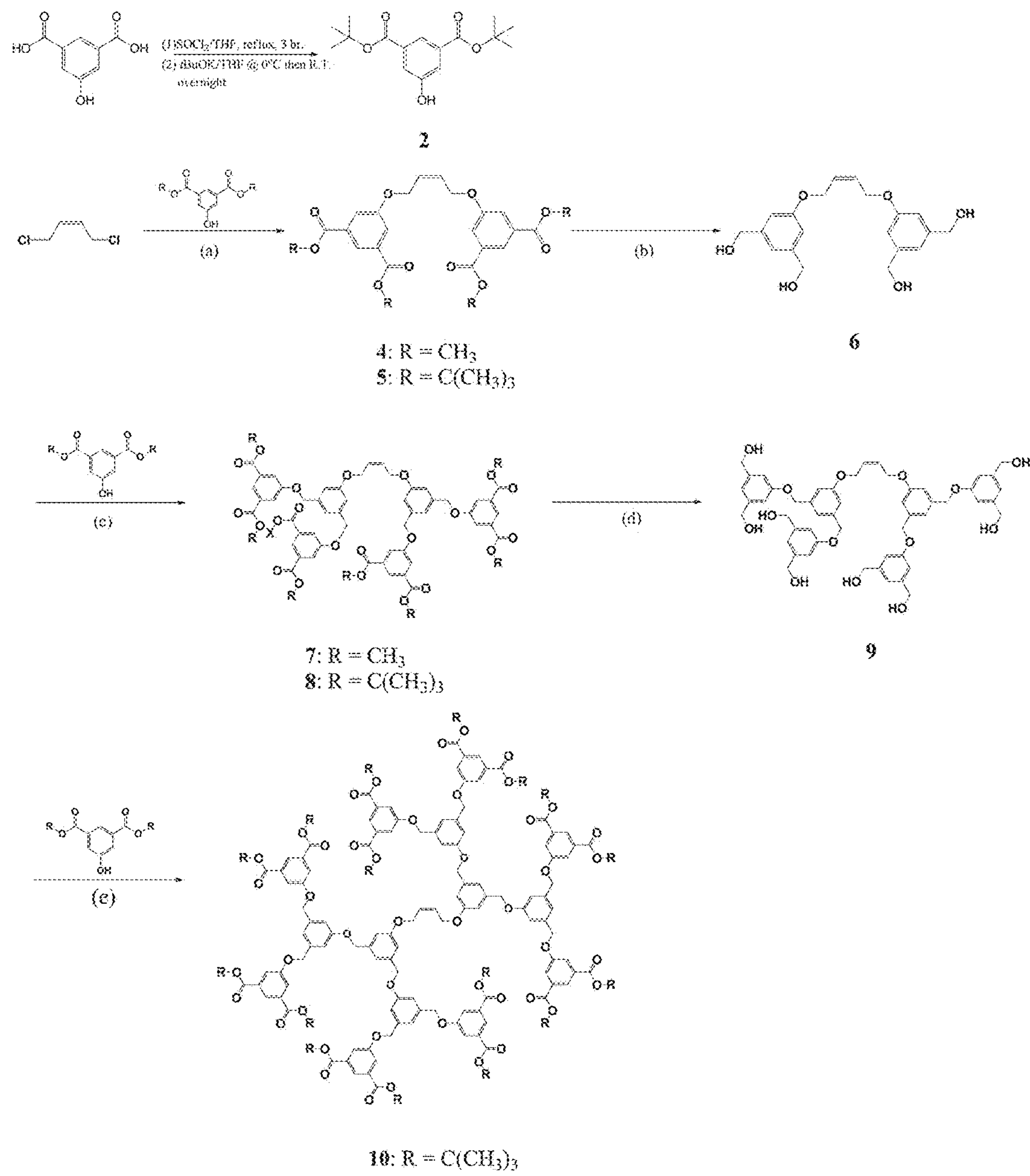

To illustrate the influence of the purity of VCH-free COD on the preparation of telechelic 1,4-PBs via ROMP of COD, the synthesis of di-TE 1,4-PB via the two-stage ROMP of COD with octa-functional tert-butyl ester-terminated bis-dendritic CTA (compound 8 in FIG. 46B) was chosen as the benchmark reaction (FIG. 37). Two different batches of VCH-free COD were prepared: the first (i.e., the control, COD I) was afforded via purification according to only the Macosko protocol, whereas the second one (COD II) was prepared according to the purification procedure described above. The implementation of two-stage ROMP using both batches of COD was the same as the purification procedure described above, in which the total monomer: CTA ratio was 2000:1, and 100 eq of COD was used in the first stage of ROMP; the load of Grubbs II was 1/30 eq of the CTA. Here the following properties to quantitate the effect of the purity of COD were chosen: (1) the period of time during which the reaction mixture develops enough viscosity to stop the magnetic stir bar from moving after the addition of 1900 eq of COD ($t_v$) (2) the overall conversion of COD ($X_f$, measured by $^1$H NMR analysis of the aliquot of reaction mixture) (3) the cis/trans ratio of the polymeric species in the aliquot (measure by $^1$H NMR analysis) (4) $M_w$ of the resultant polymer (measured by GPC-LS). The results for COD I and COD II were summarized in Table 10, which shows the results of synthesis of di-TE 1,4-PB via ROMP of batch 1 and batch 2 VCH-free COD.

TABLE 10

| | COD I | COD II |
|---|---|---|
| $t_v$ (min) | 40.0 | 1.5 |
| $X_f$ (mol %) | 85.0 | 97.6 |
| cis/trans ratio | 2.20 | 1.73 |
| $M_w$ (kg/mol) | 264 | 142 |
| PDI | 1.58 | 1.43 |

Table 10 shows that the second stage of ROMP of COD II proceeded significantly faster ($t_v$=1.5 min) compared to that of COD I ($t_v$=40 min); the conversion of COD II was nearly quantitative ($X_f$=97.6%), whereas the reaction stopped at $X_f$=85% in the case of COD I. In addition, $^1$H NMR analysis of aliquots taken in the end of polymerization reactions also revealed that the use of COD II led to a lower cis/trans ratio (1.73) compared to the case of COD I (2.20). The $M_w$ of the resultant polymer of ROMP of COD II (142,000 g/mol), as revealed by GPC-LS analysis, was found significantly lower than that of ROMP of COD I (264,000 g/mol). When considered as a whole, these results indicate that Grubbs II possesses a higher metathetical activity (or a higher turnover number) when impurities in VCH-free COD that can interfere with Grubbs II are removed. This explains the much faster reaction rate of the second stage of ROMP of COD II. Similarly, Grubbs II in the presence of COD II can perform more cycles of metathesis reactions compared to in COD I, and thus a nearly quantitative $X_f$=97.6% was achieved in the case of COD II. The low cis/trans ratio (1.73) and $M_w$ (142,000 g/mol) resulting from ROMP of COD II suggest that a considerable fraction of ruthenium complexes on polymer chain ends remained metathetically active when COD II was mostly consumed, and as a result they continued to react with available C═C bonds present in the reaction mixture (in this case, C═C on polymer backbones) till they reached their maximum turnover number. The consumption of backbone by active ruthenium centers on chain ends (i.e., back-biting) led to the decreases in cis/trans ratio and $M_w$.

In sum, the enhanced activity of Grubbs II observed above validates the multi-stage purification procedure of COD described above.

Example 23

Example of Controlling Drag Reduction

In some embodiments, the associative polymers described herein can be used to provide a composition in which the property controlled is drag reduction. In particular, using the methods described herein, the composition can have a more than 10% reduction in the pressure drop required to drive a given volumetric flow rate through a given pipeline.

In particular, a skilled person can identify the non-polar host to be transported in which the drag is desired to be reduced.

The skilled person can then use published solubility parameters to estimate the solubility parameter of the identified non-polar host, or in the alternative, the skilled person can use literature on polymer solubility in similar liquids, and use this information to identify polymers that would be expected to dissolve in the non-polar host, for use as backbones of the associative polymers. The solubility can be confirmed by the skilled person by using techniques identifiable to the skilled person, for example by dissolving a sample of the polymer in the host and determining if it is homogeneous (e.g., by performing light-scattering measurements).

The skilled person can then use published dielectric constants to estimate the dielectric constant of the host liquid, and determine the kind of associative interaction of the FGs would be most suitable. For example, if the dielectric constant is less than or approximately 2, there are a wide range of suitable associative groups, including ordinary hydrogen bonding moieties (e.g. Hamilton receptor/cyanuric acid pairs, thymine/diacetamidopyridine pairs, and other identifiable to a skilled person) and charge transfer complexing moieties (e.g. dinitrophenyl/carbazole pairs and other identifiable to a skilled person). As the dielectric constant increases, the range of viable associative moieties decreases. For example, in chlorododecane (dielectric constant of 4.2 at 25° C.), charge-assisted hydrogen bonding moieties perform better than ordinary hydrogen-bond moieties. If there are organic acids (such as, Butyric acid, isobutyric acid, valeric acid, isovaleric acid, Heptanoic acid, and others identifiable to a skilled person) or organic bases (trimethylamine, diethylamine, diisopropylamine, Triethylamine, Diisobutylamine, diisoamylamine, diphenylamine, and others identifiable to a skilled person) present in the host composition, ionic interactions or ligand-metal interactions (a type of Bronsted/Lewis acid/base interaction) can be more suitable than charge-assisted hydrogen bond association. Therefore, some additional optimization can be performed as described below.

The additional optimization can be performed by preparing several telechelic polymers with backbone degree of polymerization of at least 200 and with candidate associative groups at their ends (e.g. ordinary hydrogen bonding moieties and/or charge transfer complexing moieties), and dissolving them in the host liquid using polymer concentration approximately equal to the overlap concentration for the backbone polymer and length used in the trial polymers (e.g., by calculating c * as described herein). The polymers that do not dissolve can be identified, and their corresponding associative end groups can be designated as being unsuitable, to thereby identify the suitable associative groups. If the viscosity of the non-polar composition is not greater than it would be for a solution of a non-associative polymer of the same backbone, length and concentration, the associative end groups can be modified by increasing the number of associative moieties in each group (i.e., increase the strength of association using polyvalent interactions).

Figure 40:
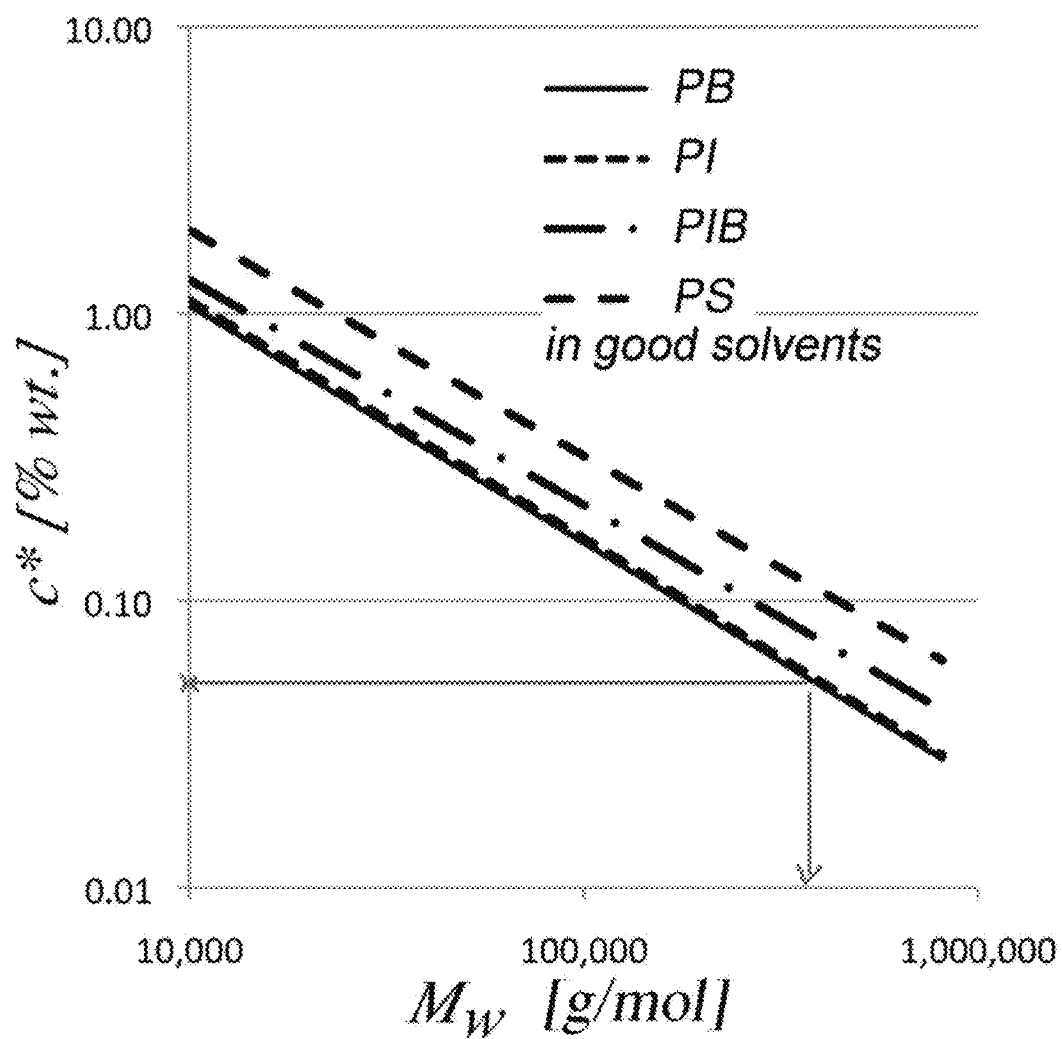
FIG. 40 shows a plot of an exemplary relationship between c* and $M_w$ that can be generalized to be used to select a desired $M_w$ of a backbone in an associative polymer as herein described based on the desired concentration of the associative polymer relative to c*.

Using one or more of the combinations of polymer backbone structure and end-group structure identified above, the skilled person can then estimate the backbone length that is compatible with a desirable or acceptable polymer concentration in the host. For example, if the backbone is determined to be polybutadiene, and the associative polymer concentration needs to be kept down to 0.8% or less (the "x" marked on the vertical axis of FIG. 40), then the minimum polybutadiene backbone can be read off a graph of the relationship between the overlap concentration and the weight-average molecular weight (as shown by the horizontal line from the "x" on the vertical axis to the corresponding point on the c* vs $M_w$ relationship for polybutadiene and the vertical line from that point down to the horizontal axis in FIG. 40), leading to a value of $M_w$ of about 400,000 g/mol.

A skilled person can then use experiments to refine the choice of backbone, backbone length, and FGs by preparing candidate polymers with the most promising backbone, backbone length, and FGs, then subjecting them to a limited set of experiments to validate their performance in both reducing turbulent drag (e.g., measuring the flow rate of the non-polar composition though a conduit, or measuring the change in pressure of the non-polar composition flowing through a conduit) and, if desired, resisting degradation due to turbulent flow (e.g. by measuring changes in viscosity of the non-polar composition after transportation through a conduit). If the required concentration is found by the skilled person to be too high (e.g. the amount of polymer required would be too costly), then the skilled person can prepare another polymer with the same, but longer, backbone and repeat the process until the polymer shows efficacy at an acceptably low concentration. This exemplary procedure is expected to give a drag reduction in turbulent pipe flow of at least 10%. If the extent of drag reduction is less than 30%, the skilled person can improve drag reduction up to 30% by increasing the strength of association, for example by increasing the number of associative moieties per associative group (e.g., using end groups with four carboxyl groups rather than two) or by using a stronger type of association (e.g., using charge-assisted hydrogen bonding-that is, a hydrogen bond formed between a hydrogen bond donor and hydrogen bond acceptor where the hydrogen bond donor is more acidic than the conjugate acid of the hydrogen bond acceptor by at least about 4 pKa units—rather than ordinary hydrogen bonding—that is, a hydrogen bond formed between a hydrogen bond donor and hydrogen bond acceptor where the hydrogen bond donor is less acidic than the conjugate acid of the hydrogen bond acceptor).

Example 24

Use of Associative Polymers in a Fuel in an Engine while Maintaining Engine Performance In this example, an exemplary self-associative polymers were incorporated in fuel at a level that is appropriate for drag reduction and/or mist control for improved fire safety. 430K di-TA PB was selected as the test polymer along with diesel as the base fuel; a polymer concentration of 0.1wt % in diesel was subsequently chosen. A concentrated 1 wt % stock solution of the exemplary associative polymer was prepared by mixing the polymer with diesel under oxygen-free condition at 120° C. for 12 hours, and two identical 0.1 wt % diesel solutions of the polymer with a volume of 1.3 liters were prepared by diluting the 1 wt % stock solution with the same base fuel at room temperature. Test samples comprised the two 0.1 wt % solutions and two 1.3-liter bottles of unmodified base fuel as controls. A 3.75 kW diesel generator connected to a Simplex Swift-e load bank and a Fluke 434 Series II Energy Analyzer was used as the test apparatus, and the tests were performed at the Vehicle Emission Research Laboratory (VERL) of the Center for Environmental Research & Technology (CE-CERT), University of California at Riverside. A sequence of generator load/operating time comprising the following stages was used to carry out the tests: 2000 Watts (~53% of its rated power)/9 min, 3000 Watts (~80% of the rated power)/9 min, 3500 Watts (~93% of the rated power)/6 min, 3000 Watts/9 min, and 2000 Watts/9 min. Between samples the fuel supply to the engine was switched to a reservoir filled with the reference fuel (the same diesel fuel that was used to prepare the samples with inventive polymer) to keep the generator operating. The AC output from the generator was recorded continuously by the Energy Analyzer, and the emissions were analyzed using gas analysis of an isothermal stream of precisely calibrated dilution of the exhaust gas; quantitative values for carbon dioxide ($CO_2$), carbon monoxide (CO), mono-nitrogen oxide ($NO_x$), methane ($CH_4$) and total hydrocarbons (THC) were continuously monitored. Samples were run in a blind randomized sequence and the results were quantitatively analyzed prior to unmasking the sample identification. The results show no decrease in power output at any of the three loads to within the uncertainty of the power measurement. The results showed no adverse effects on engine emissions (Table 11). For the composition used in this example, it was not possible to identify the time at which the fuel supply to the engine was switched between the reference fuel, since none of the measured quantities changed at or near the time the valve was switched. The emissions of CO and THC were reduced (11), while the power output was the same (to within the uncertainty of the measurement) as for untreated diesel.

TABLE 11

| Condition | % change A #29[a] |
|---|---|
| $CO_2$ | |
| Sample-Diesel 2 kW | 2.03 |
| Sample-Diesel 3 kW | −0.09 |
| Sample-Diesel 3.5 kW | 0.43 |
| Sample-Diesel 3 kW | 1.56 |
| Sample-Diesel 2 kW | 1.46 |
| CO | |
| Sample-Diesel 2 kW | 5.63 |
| Sample-Diesel 3 kW | −4.34 |
| Sample-Diesel 3.5 kW | −10.20 |
| Sample-Diesel 3 kW | −1.93 |
| Sample-Diesel 2 kW | 8.87 |
| THC | |
| Sample-Diesel 2 kW | −15.54 |
| Sample-Diesel 3 kW | −13.04 |
| Sample-Diesel 3.5 kW | −11.54 |
| Sample-Diesel 3 kW | −8.73 |
| Sample-Diesel 2 kW | −0.68 |
| $NO_x$ | |
| Sample-Diesel 2 kW | 4.30 |
| Sample-Diesel 3 kW | 2.81 |
| Sample-Diesel 3.5 kW | 3.76 |
| Sample-Diesel 3 kW | 4.13 |
| Sample-Diesel 2 kW | 5.96 |

[a]A#29 is diesel treated with 0.1 wt % di-TA PB

Example 25

Reduction of Emissions in Fuels Comprising Associative Polymers

In this example, exemplary donor-acceptor polymers are incorporated in fuel at a level that is appropriate for drag reduction and/or mist control for improved fire safety, with the additional benefit that emissions from the engine are reduced. A 1:1 (w/w) mixture of 630K di-DA PB and 540K di-DB PB was selected as an exemplary donor-acceptor polymer pair along with diesel as the base fuel; a total polymer concentration of 0.1 wt % in diesel was subsequently chosen. A concentrated 1 wt % stock solution of the donor-acceptor pair was prepared by mixing the pair with diesel at room temperature for 12 hours and at 70° C. for 7 hours, and two identical 0.1 wt % diesel solutions of the pair with a volume of 1.3 liters were prepared by diluting the 1 wt % stock solution with the same base fuel at room temperature. Test samples comprised the two 0.1 wt % solutions and two 1.3-liter bottles of unmodified base fuel as controls. The Same apparatuses, procedures, and characterizations described in Example 24 were used in this example. Samples were run in a blind randomized sequence and the results were quantitatively analyzed prior to unmasking the sample identification. The results showed no decrease in power output at any of the three loads to within the uncertainty of the power measurement. For the composition used in this example, the emissions of CO and THC were reduced (Table 12), while the power output was the same (to within the uncertainty of the measurement) as for untreated diesel.

TABLE 12

| Condition | % change AB #90[a] | AB #8[a] | AB averaged |
|---|---|---|---|
| | $CO_2$ | | |
| Sample-Diesel 2 kW | 0.68 | 0.95 | 0.81 |
| Sample-Diesel 3 kW | −1.74 | 1.40 | −0.17 |
| Sample-Diesel 3.5 kW | 0.71 | 0.92 | 0.82 |
| Sample-Diesel 3 kW | 0.19 | −0.43 | −0.12 |
| Sample-Diesel 2 kW | 0.09 | 1.09 | 0.59 |
| | CO | | |
| Sample-Diesel 2 kW | −13.89 | −10.99 | −12.44 |
| Sample-Diesel 3 kW | −15.81 | −12.52 | −14.16 |
| Sample-Diesel 3.5 kW | −14.36 | −16.31 | −15.33 |
| Sample-Diesel 3 kW | −10.79 | −14.91 | −12.85 |
| Sample-Diesel 2 kW | −11.79 | −12.49 | −12.14 |
| | THC | | |
| Sample-Diesel 2 kW | −25.12 | −23.83 | −24.47 |
| Sample-Diesel 3 kW | −14.39 | −16.65 | −15.52 |
| Sample-Diesel 3.5 kW | −10.13 | −12.63 | −11.38 |
| Sample-Diesel 3 kW | −11.75 | −12.50 | −12.12 |
| Sample-Diesel 2 kW | −12.27 | −13.37 | −12.82 |
| | $NO_x$ | | |
| Sample-Diesel 2 kW | −1.29 | 0.77 | −0.26 |
| Sample-Diesel 3 kW | −3.16 | −0.35 | −1.76 |
| Sample-Diesel 3.5 kW | −2.17 | −0.59 | −1.38 |
| Sample-Diesel 3 kW | −1.95 | −0.43 | −1.19 |
| Sample-Diesel 2 kW | 0.77 | 2.70 | 1.73 |

[a]AB #90 is a first sample of 0.1 wt % 1:1 di-DA PB/di-DB PB; AB #90 is a second sample of 0.1 wt % 1:1 di-DA PB/di-DB PB Based on the observed reductions of THC and CO, a corresponding increase in fuel efficiency occurred.

Example 26

Improvement of Fuel Efficiency with Self-Associative Polymers

The emissions data discussed for Example 24 (0.1 wt % diesel solution of 430K di-TA PB) show a reduction in THC and CO emissions compared to the diesel reference sample, indicating a more efficient burning of the fuel.

Example 27

Improvement of Fuel Efficiency with Donor-Acceptor Associative Polymers

The emissions data discussed for example 25 (0.1 wt % diesel solution of 630K di-DA PB/540K di-DB PB 1:1 mixture) show a reduction in THC and CO emissions compared to the diesel reference sample, indicating a more efficient burning of the fuel.

Example 28

Additional Improvement of Fuel Efficiency with Donor-Acceptor Associative Polymers The exhaust gas temperatures for untreated diesel and the sample described in Example 25 (0.1 wt % diesel solution of 630K di-DA PB/540K di-DB PB 1:1 mixture) were measured by a thermal couple immediately after the exhaust was diluted with an isothermal stream of carrier gas (hence, the temperature of the actual exhaust gas was considerably higher that reported here after dilution). The results revealed a 5° C. reduction for the exhaust corresponding to example 25, indicating a more efficient burning and conversion of fuel energy to useful power in the engine for this example.

The examples set forth above are provided to give those of ordinary skill in the art a complete disclosure and description of how to make and use the embodiments of the associative polymers, materials, compositions, systems and methods of the disclosure, and are not intended to limit the scope of what the inventors regard as their disclosure. All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Unless otherwise indicated, the term "alkyl" as used herein refers to a linear, branched, or cyclic saturated hydrocarbon group typically although not necessarily containing 1 to about 15 carbon atoms, or 1 to about 6 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 15 carbon atoms. The term "cycloalkyl" intends a cyclic alkyl group, typically having 4 to 8, or 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

Unless otherwise indicated, the term "hydrocarbyl" as used herein refers to any univalent radical, derived from a hydrocarbon, such as, for example, methyl or phenyl. The term "hydrocarbylene" refers to divalent groups formed by removing two hydrogen atoms from a hydrocarbon, the free valencies of which may or may not be engaged in a double bond, typically but not necessarily containing 1 to 20 carbon atoms, in particular 1 to 12 carbon atoms and more particularly 1 to 6 carbon atoms which includes but is not limited to linear cyclic, branched, saturated and unsaturated species, such as alkylene, alkenylene alkynylene and divalent aryl groups, e.g., 1,3 -phenylene, —$CH_2CH_2CH_2$-propane-1,3-diyl, —$CH_2$-methylene, —CH═CH—CH═CH—. The term "hydrocarbyl" as used herein refers to univalent groups formed by removing a hydrogen atom from a hydrocarbon, typically but not necessarily containing 1 to 20 carbon atoms, in particular 1 to 12 carbon atoms and more particularly 1 to 6 carbon atoms, including but not limited to linear cyclic, branched, saturated and unsaturated species, such as univalent alkyl, alkenyl, alkynyl and aryl groups e.g. ethyl and phenyl groups.

Unless otherwise indicated, the term "heteroatom-containing" as in a "heteroatom-containing alky group" refers to a alkyl group in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, and others known to a skilled person., and examples of heteroatom-containing alicyclic groups are pyrrolidino, morpholino, piperazino, piperidino, and other known to a skilled person.

Unless otherwise indicated, the term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

Unless otherwise indicated, the term "alkylamino" as used herein intends an alkyl group bound through a single terminal amine linkage; that is, an "alkylamino" may be represented as —NH-alkyl where alkyl is as defined above. A "lower alkylamino" intends an alkylamino group containing 1 to 6 carbon atoms. The term "dialkylamino" as used herein intends two identical or different bound through a common amine linkage; that is, a "dialkylamino" may be represented as —N(alkyl)2 where alkyl is as defined above. A "lower dialkylamino" intends an alkylamino wherein each alkyl group contains 1 to 6 carbon atoms. Analogously, "alkenylamino", "lower alkenylamino", "alkynylamino", and "lower alkynylamino" respectively refer to an alkenyl, lower alkenyl, alkynyl and lower alkynyl bound through a single terminal amine linkage; and "dialkenylamino", "lower dialkenylamino", "dialkynylamino", "lower dialkynylamino" respectively refer to two identical alkenyl, lower alkenyl, alkynyl and lower alkynyl bound through a common amine linkage. Similarly, "alkenylalkynylamino", "alkenylalkylamino", and "alkynylalkylamino" respectively refer to alkenyl and alkynyl, alkenyl and alkyl, and alkynyl and alkyl groups bound through a common amine linkage.

Unless otherwise indicated, the term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Aryl groups can contain 5 to 24 carbon atoms, or aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

Unless otherwise indicated, the term "arene", as used herein, refers to an aromatic ring or multiple aromatic rings that are fused together. Exemplary arenes include, for example, benzene, naphthalene, anthracene, and the like. The term "heteroarene", as used herein, refers to an arene in which one or more of the carbon atoms has been replaced by a heteroatom (e.g. O, N, or S). Exemplary heteroarenes include, for example, indole, benzimidazole, thiophene, benzthiazole, and the like. The terms "substituted arene" and "substituted heteroarene", as used herein, refer to arene and heteroarene molecules in which one or more of the carbons and/or heteroatoms are substituted with substituent groups.

Unless otherwise indicated, the terms "cyclic", "cyclo-", and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

Unless otherwise indicated, the terms "halo", "halogen", and "halide" are used in the conventional sense to refer to a chloro, bromo, fluoro or iodo substituent or ligand.

Unless otherwise indicated, the term "substituted" as in "substituted alkyl," "substituted aryl," and the like, is meant that in the, alkyl, aryl, or other moiety, at least one hydrogen atom bound to a carbon (or other) atom is replaced with one or more non-hydrogen substituents.

Examples of such sub stituents can include, without limitation: functional groups such as halo, hydroxyl, sulfhydryl, C1-C24 alkoxy, C2-C24 alkenyloxy, C2-C24 alkynyloxy, C5-C24 aryloxy, C6-C24 aralkyloxy, C6-C24 alkaryloxy, acyl (including C2-C24 alkylcarbonyl (—CO-alkyl) and C6-C24 arylcarbonyl (—CO-aryl)), acyloxy (—O-acyl, including C2-C24 alkylcarbonyloxy (—O—CO-alkyl) and C6-C24 arylcarbonyloxy (—O—CO -aryl)), C2-C24 alkoxycarbonyl (—(CO)—O-alkyl), C6-C24 aryloxycarbonyl (—(CO)—O-aryl), halocarbonyl (—CO)—X where X is halo), C2-C24 alkylcarbonato (—O—(CO)—O-alkyl), C6-C24 arylcarbonato (—O—(CO)—O-aryl), carboxy (—COOH), carboxylato ($COO^-$), carbamoyl (—(CO)—$NH_2$), mono-(C1-C24 alkyl)-substituted carbamoyl (—(CO)—NH(C1-C24 alkyl)), di-(C1-C24 alkyl)-substituted carbamoyl (-(CO)—N(C1-C24 alkyl)$_2$), mono-(C5-C24 aryl)-substituted carbamoyl (—(CO)—NH-aryl), di-(C5-C24 aryl)-substituted carbamoyl (—(CO)—N(C5-C24 aryl)2), di-N-(C1-C24 alkyl),N-(C5-C24 aryl)-substituted carbamoyl, thiocarbamoyl (—(CS)—NH2), mono-(C1-C24 alkyl)-substituted thiocarbamoyl (—(CO)—NH(C1-C24 alkyl)), di-(C1-C24 alkyl)-substituted thiocarbamoyl (—(CO)-N(C1-C24 alkyl)$_2$), mono-(C5-C24 aryl)-substituted thiocarbamoyl (—(CO)—NH-aryl), di-(C5-C24 aryl)-substituted thiocarbamoyl (—(CO)—N(C5-C24 aryl)2), di-N-(C1-C24 alkyl),N-(C5-C24 aryl)-substituted thiocarbamoyl, carbamido (—NH—(CO)—$NH_2$), cyano(—C≡N), cyanato (—O—C≡N), thiocyanato (—S—C≡N), formyl (—(CO)—H), thioformyl ((CS)—H), amino (—NH2), mono-(C1-C24 alkyl)-substituted amino, di-(C1-C24 alkyl)-substituted amino, mono-(C5-C24 aryl)-substituted amino, di-(C5-C24 aryl)-substituted amino, C2-C24 alkylamido (—NH—(CO)-alkyl), C6-C24 arylamido (—NH—(CO)-aryl), imino (—CR═NH where R=hydrogen, C1-C24 alkyl, C5-C24 aryl, C6-C24 alkaryl, C6-C24 aralkyl, and others known to a skilled person), C2-C20 alkylimino (CR═N (alkyl), where R=hydrogen, C1-C24 alkyl, C5-C24 aryl, C6-C24 alkaryl, C6-C24 aralkyl, and others known to a skilled person), arylimino (—CR═N(aryl), where R=hydrogen, C1-C20 alkyl, C5-C24 aryl, C6-C24 alkaryl, C6-C24 aralkyl, and others known to a skilled person), nitro (—NO2), nitroso (—NO), sulfo (—SO2-OH), sulfonato (—SO2-$O^-$), C1-C24 alkylsulfanyl (—S-alkyl; also termed " alkylthio"), C5-C24 aryl sulfanyl (—S-aryl; also termed "arylthio"), C1-C24 alkylsulfinyl (—(SO)-alkyl), C5-C24 arylsulfinyl (—(SO)-aryl), C1-C24 alkylsulfonyl (—$SO_2$-alkyl), C5-C24 arylsulfonyl (—$SO_2$-aryl), boryl (—BH2), borono (—$B(OH)_2$), boronato (—$B(OR)_2$ where R is alkyl or other hydrocarbyl), phosphono (—$P(O)(OH)_2$), phosphonato (—$P(O)(O^-)_2$), phosphinato (—$P(O)(O^-)$, phospho (—$PO_2$), phosphino (—$PH_2$), silyl (—$SiR_3$ wherein R is hydrogen or hydrocarbyl), and silyloxy (—O-silyl); and the hydrocarbyl moieties C1-C24 alkyl (e.g. C1-C12 alkyl and C1-C6 alkyl), C2-C24 alkenyl (e.g. C2-C12 alkenyl and C2-C6 alkenyl), C2-C24 alkynyl (e.g. C2-C12 alkynyl and C2-C6 alkynyl), C5-C24 aryl (e.g. C5-C14 aryl), C6-C24 alkaryl (e.g. C6-C16 alkaryl), and C6-C24 aralkyl (e.g. C6-C16 aralkyl).

Unless otherwise indicated, the term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl, and "aralkyl" are as defined above.

Unless otherwise indicated, the term "alkaryl" refers to an aryl group with an alkyl substituent, and the term "aralkyl" refers to an alkyl group with an aryl substituent, wherein "aryl" and "alkyl" are as defined above. In some embodiments, alkaryl and aralkyl groups contain 6 to 24 carbon atoms, and particularly alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to sub stituents of the formula —OR wherein R is alkaryl or aralkyl, respectively, as just defined.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

REFERENCES

1. Brandrup, J., et al., "Polymer handbook". Vol. 1999. 1999: Wiley New York.
2. Maurer-Chronakis, K. "Synthesis of cyanuric acid and Hamilton receptor functionalized tetraphenylporphyrins:

investigation on the chiroptical and photophysical properties of their self-assembled superstructures with depsipeptide and fullerene dendrimers." Ph.D. Dissertation, Erlangen, Nürnberg, Univ., 2010

3. Larock, R. C., "Comprehensive organic transformations: a guide to functional group preparations, 2nd Ed.". 1999: Wiley-vch New York.
4. Ying, Q., et al., "Overlap concentration of macromolecules in solution." Macromolecules 1987 20(2): 362-366.
5. Colby, R. H., et al., "Two-parameter scaling for polymers in θ solvents." *Macromolecules* 1990 23(10): 2753-2757.
6. Fetters, L., et al., "Molecular Weight Dependence of Hydrodynamic and Thermodynamic Properties for Well-Defined Linear Polymers in Solution." *Journal of physical and chemical reference data* 1994 23(4): 619-640.
7. Rubinstein, M., et al., "Polymer physics". 2003: OUP Oxford.
8. Ke, F.-y., et al., "Effect of Overlap Concentration and Persistence Length on DNA Separation in Polymer Solutions by Electrophoresis." *Chinese Journal of Polymer Science* 2009 27(5): 601-610.
9. Thordarson, P., "Determining association constants from titration experiments in supramolecular chemistry." *Chem Soc Rev* 2011 40(3): 1305-1323.
10. Grubbs, R., "Handbook of Metathesis, vol. 3". 2003: Wiley-VCH, Weinheim.
11. Tasdelen, M. A., et al., "Telechelic polymers by living and controlled/living polymerization methods." *Progress in Polymer Science* 2011 36(4): 455-567.
12. Goethals, E., "Telechelic polymers: Synthesis and applications". 1989: CRC Press (Boca Raton, Fla.).
13. Nese, A., et al., "Synthesis of Poly (vinyl acetate) Molecular Brushes by a Combination of Atom Transfer Radical Polymerization (ATRP) and Reversible Addition—Fragmentation Chain Transfer (RAFT) Polymerization." *Macromolecules* 2010 43(9): 4016-4019.
14. Park, T., et al., "A supramolecular multi-block copolymer with a high propensity for alternation." *J Am Chem Soc* 2006 128(43): 13986-13987.
15. "Polymer Solutions: Solvents and Solubility Parameters." [Accessed Jan. 25, 2012]; Available from:http://www.sigmaaldrich.com/etc/medialib/docs/Aldrich/General_Information/polymer_solutions.Par.0001.File.tmp/polymer_solutions.pdf.
16. Rubinstein, M., et al., "Polymer physics". 2003, Oxford; New York: Oxford University Press. xi, 440 p.
17. Chang, S. K., et al., "Molecular Recognition of Biologically Interesting Substrates—Synthesis of an Artificial Receptor for Barbiturates Employing 6 Hydrogen-Bonds." *Journal of the American Chemical Society* 1988 110(4): 1318-1319.
18. Beijer, F. H., et al., "Hydrogen-bonded complexes of diaminopyridines and diaminotriazines: Opposite effect of acylation on complex stabilities (vol 61, pg 6374, 1996)." *Journal of Organic Chemistry* 1996 61(26): 9636-9636.
19. Higley, M. N., et al., "A modular approach toward block copolymers." *Chemistry-a European Journal* 2005 11(10): 2946-2953.
20. Burd, C., et al., "Self-sorting in polymers." *Macromolecules* 2005 38(17): 7225-7230.
21. Stubbs, L. P., et al., "Towards a universal polymer backbone: Design and synthesis of polymeric scaffolds containing terminal hydrogen-bonding recognition motifs at each repeating unit." *Chemistry-a European Journal* 2003 9(4): 992-999.
22. Cheng, C. C., et al., "New self-assembled supramolecular polymers formed by self-complementary sextuple hydrogen bond motifs." *Rsc Advances* 2012 2(26): 9952-9957.
23. Park, T., et al., "A highly stable quadruply hydrogen-bonded heterocomplex useful for supramolecular polymer blends." *Journal of the American Chemical Society* 2005 127(18): 6520-6521.
24. Altintas, O., et al., "Bioinspired dual self-folding of single polymer chains via reversible hydrogen bonding." *Polymer Chemistry* 2012 3(3): 640-651.
25. Altintas, O., et al., "Star and miktoarm star block (co)polymers via self-assembly of ATRP generated polymer segments featuring Hamilton wedge and cyanuric acid binding motifs. " *Polymer Chemistry* 2011 2(5): 1146-1155.
26. Yang, S. K., et al., "Supramolecular ABC Triblock Copolymers via One-Pot, Orthogonal Self-Assembly." *Journal of the American Chemical Society* 2010 132(5): 1637-1645.
27. Burd, C., et al., "Solvent influence on the orthogonality of noncovalently functionalized terpolymers." *Journal of Polymer Science Part a-Polymer Chemistry* 2008 46(6): 1936-1944.
28. Kolomiets, E., et al., "Structure and properties of supramolecular polymers generated from heterocomplementary monomers linked through sextuple hydrogen-bonding arrays." *Macromolecules* 2006 39(3): 1173-1181.
29. Berl, V., et al., "Supramolecular polymers generated from heterocomplementary monomers linked through multiple hydrogen-bonding arrays—Formation, characterization, and properties." *Chemistry-a European Journal* 2002 8(5): 1227-1244.
30. Hietala, S., et al., "Rheological Properties of Associative Star Polymers in Aqueous Solutions: Effect of Hydrophobe Length and Polymer Topology." *Macromolecules* 2009 42(5): 1726-1732.
31. Stavrouli, N., et al., "Rheological properties of ABA telechelic polyelectrolyte and ABA polyampholyte reversible hydrogels: A comparative study." *Polymer* 2008 49(5): 1249-1256.
32. Suzuki, S., et al., "Nonlinear Rheology of Telechelic Associative Polymer Networks: Shear Thickening and Thinning Behavior of Hydrophobically Modified Ethoxylated Urethane (HEUR) in Aqueous Solution." *Macromolecules* 2012 45(2): 888-898.
33. Chassenieux, C., et al., "Rheology of associative polymer solutions." *Current Opinion in Colloid & Interface Science* 2011 16(1): 18-26.
34. Li, H. K., et al., "Metal-free click polymerization of propiolates and azides: facile synthesis of functional poly(aroxycarbonyltriazole)s." *Polymer Chemistry* 2012 3(4): 1075-1083.
35. Izunobi, J. U., et al., "Polymer Molecular Weight Analysis by H-1 NMR Spectroscopy." *Journal of Chemical Education* 2011 88(8): 1098-1104.
36. Nielen, M. W. F., "Maldi time-of-flight mass spectrometry of synthetic polymers." *Mass Spectrometry Reviews* 1999 18(5): 309-344.
37. Meyers, R. A., "Encyclopedia of analytical chemistry : applications, theory, and instrumentation". 2000, Chichester ; New York: Wiley.
38. Yalcin, T., et al., "Matrix-assisted laser desorption ionization time-of-flight mass spectrometry for the analysis of polydienes." *Journal of the American Society for Mass Spectrometry* 1997 8(12): 1220-1229.

39. Pitet, L. M., et al., "Carboxy-Telechelic Polyolefins by ROMP Using Maleic Acid as a Chain Transfer Agent." *Macromolecules* 2011 44(7): 2378-2381.

40. Morita, T., et al., "A ring-opening metathesis polymerization (ROMP) approach to carboxyl- and amino-terminated telechelic poly(butadiene)s." *Macromolecules* 2000 33(17): 6621-6623.

The invention claimed is:

1. A method to control a physical and/or chemical property in a non-polar composition comprising providing a host composition having a dielectric constant equal to or less than about 5;

providing at least one associative polymer soluble in the host composition;

determining an overlap concentration c*for the at least one associative polymer wherein $$c^* = \frac{3M_w}{4\pi(R_g^2)^{3/2}\ N_a},$$

wherein $M_w$ is the weight averaged molecular weight, $R_g$ is the radius of gyration, and $N_a$ is Avogadro's constant;

determining a concentration c of the at least one associative polymer in the host composition, the concentration c selected between from about 0.05 c*to about 10 c* depending a physical and/or chemical property to be controlled; and combining the host composition and the at least one associative polymer herein described at the selected concentration c;

wherein the at least one associative polymer comprises:

a linear, branched, or hyperbranched polymer backbone having at least two ends and a functional group presented at two or more ends of the at least two ends of the backbone:

wherein the linear, branched, or hyperbranched polymer backbone is substantially soluble in the host composition, and the functional group is capable of undergoing an associative interaction with another functional group with an association constant (k) of from $0.1<\log_{10}k<18$.

2. The method of claim 1 wherein the concentration c is between 0.5 c* to 2 c* and the physical and/or chemical property is mist control.

3. The method of claim 1 wherein the concentration c is less than approximately c*and the physical and/or chemical property is fuel efficiency.

4. The method of claim 1 wherein the concentration c is between 0.1 c*and 0.5 c* and the physical and/or chemical property is fuel efficiency.

5. The method of claim 1 wherein the concentration c is below or approximately equal c* and the physical and/or chemical property is drag reduction and/or enhanced lubrication.

6. The method of claim 1 wherein the concentration c is between 0.05 c*to c* and the physical and/or chemical property is drag reduction and/or enhanced lubrication.

7. The method of claim 1 wherein the concentration c is greater than c* and the physical and/or chemical property is converting a liquid into a gel.

8. The method of claim 1 wherein the concentration c is between 2 c* to 10 c* and the physical and/or chemical property is converting a liquid into a gel.

9. The method of claim 1, wherein the at least one associative polymer has a weight averaged molecular weight equal to or lower than about 2,000,000 g/mol.

10. The method of claim 1, wherein the at least one associative polymer has a weight averaged molecular weight is equal to or lower than about 2,000,000 g/mol and/or a $M_w$ equal to or higher than about 100,000 g/mol.

11. The method of claim 1, wherein the at least one associative polymer has a weight averaged molecular weight is between about 100,000 g/mol and about 1,000,000 g/mol.

12. The method of claim 1, wherein the functional group is a carboxylic acid and the other functional group is a carboxylic acid, or the functional group is a carboxylic acid and the other functional group is an amine, or the functional group is an alcohols and the other functional group is an amine, or the functional group is an alcohol and the another functional group is a carboxylic acid, or the functional group is a diacetamidopyridine and the another functional group is a thymine, or the functional group is a Hamilton Receptor and the another functional group is a cyanuric acid.

13. The method of claim 1, wherein the another functional groups is presented at least one end of the at least two ends of a same associative polymer.

14. The method of claim 1, wherein the another functional groups is presented at least one end of a different associative polymer.

15. The method of claim 1, having a structural unit of formula [[FG-chain [node] (I) and optionally the structural unit of formula node chain] (II)

wherein:

FG is a functional group, which can comprise one or more associative moieties such that the functional group are capable of undergoing an associative interaction with another functional group with an association constant (k) in a range from $0.1<\log_{10} k<18$;

chain is a non-polar polymer substantially soluble in a non-polar composition, the polymer having formula (III):

$$R_1\text{-}[A]_nR_2 \qquad \text{(III)}$$

in which:

A is a chemical moiety;

$R_1$ and $R_2$ are independently selected from any carbon based or organic group;

and n is an integer ≥1;

node is a covalently linked moiety linking one of $R_1$ and $R_2$ of at least one first chain with one of the $R_1$ and $R_2$ of at least one second chain;

and wherein the FG, chain and node of different structural units of the polymer can be the same or different.

16. The method of claim 15, wherein the functional group is selected from diacetamidopyridine group, thymine group, Hamilton Receptor group, cyanuric acid group, carboxylic acid group, primary secondary or tertiary amine group, primary secondary and tertiary alcohol group.

17. The method of claim 15, wherein A is be a diene, olefin, styrene, acrylonitrile, methyl methacrylate, vinyl acetate, dichlorodimethylsilane, tetrafluoroethylene, acids, esters, amides, amines, glycidyl ethers, and isocyanates.

18. The method of claim 15, wherein n is equal to or greater than 200 or equal to or greater than 800.

19. The method of claim 18, wherein $R_1$ and $R_2$ are independently substituted or unsubstituted methine or methylene groups.

20. The method of claim 1, wherein the host composition is a hydrocarbon composition, a fluorocarbon composition or a silicone composition.

21. The method of claim 1, wherein the host composition is crude oil.

22. The method of claim 1, wherein the host composition is pentane, hexane, cyclohexane, benzene, toluene, chloroform and diethyl ether, liquefied petroleum gas, liquid methane, butane, gasoline, kerosene, jet fuel and diesel fuel.

23. The method of claim 1, wherein the host composition is a lubricant.

* * * * *

UNITED STATES PATENT AND TRADEMARK OFFICE
CERTIFICATE OF CORRECTION

PATENT NO. : 10,494,509 B2
APPLICATION NO. : 16/120065
DATED : December 3, 2019
INVENTOR(S) : Julia A. Kornfield et al.

It is certified that error appears in the above-identified patent and that said Letters Patent is hereby corrected as shown below:

In the Specification

In Column 1, Line 13, add the following header and paragraph before the "FIELD" header:
-- STATEMENT REGARDING FEDERALLY SPONSORED RESEARCH OR DEVELOPMENT
This invention was made with government support under Grant Number 80NMO0018D0004, awarded by NASA (JPL). The government has certain rights in the invention. --

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*